(12) United States Patent
Holt

(10) Patent No.: US 8,028,299 B2
(45) Date of Patent: Sep. 27, 2011

(54) COMPUTER ARCHITECTURE AND METHOD OF OPERATION FOR MULTI-COMPUTER DISTRIBUTED PROCESSING WITH FINALIZATION OF OBJECTS

(75) Inventor: John Matthew Holt, Dun Laoghaire (IE)

(73) Assignee: Waratek Pty, Ltd., Lindfield, NSW (AU)

( * ) Notice: Subject to any disclaimer, the term of this patent is extended or adjusted under 35 U.S.C. 154(b) by 1006 days.

(21) Appl. No.: 11/259,762

(22) Filed: Oct. 25, 2005

(65) Prior Publication Data

US 2006/0265705 A1   Nov. 23, 2006

Related U.S. Application Data

(63) Continuation-in-part of application No. 11/111,757, filed on Apr. 22, 2005, which is a continuation-in-part of application No. 11/111,778, filed on Apr. 22, 2005, which is a continuation-in-part of application No. 11/111,779, filed on Apr. 22, 2005, which is a continuation-in-part of application No. 11/111,781, filed on Apr. 22, 2005, which is a continuation-in-part of application No. 11/111,946, filed on Apr. 22, 2005, which is a continuation-in-part of application No. 10/830,042, filed on Apr. 23, 2004.

(51) Int. Cl.
*G06F 9/44* (2006.01)
*G06F 9/45* (2006.01)

(52) U.S. Cl. ........ 719/320; 717/119; 717/148; 717/149; 718/105

(58) Field of Classification Search .................. 710/244; 707/206, 200; 711/119, 135; 717/148, 162
See application file for complete search history.

(56) References Cited

U.S. PATENT DOCUMENTS

| 4,068,298 A | 1/1978 | Dechant et al. |
| 4,780,821 A * | 10/1988 | Crossley ........................ 718/100 |

(Continued)

FOREIGN PATENT DOCUMENTS

EP    0969377    1/2000

(Continued)

OTHER PUBLICATIONS

Bal et al., "A Distributed Implementation of the Shared Data-Object Model", Proc. USENIX Workshop on Experiences with Distributed and Multiprocessor Systems pp. 1-19 (1989).

(Continued)

*Primary Examiner* — Andy Ho
*Assistant Examiner* — Tuan Dao
(74) *Attorney, Agent, or Firm* — Pillsbury Winthrop Shaw Pittman LLP

(57) ABSTRACT

The present invention discloses a modified computer architecture (50, 71, 72) which enables an applications program (50) to be run simultaneously on a plurality of computers (M1, . . . Mn). Shared memory at each computer is updated with amendments and/or overwrites so that all memory read requests are satisfied locally. During initial program loading (75), or similar, instructions which result in memory being re-written or manipulated are identified (92). Additional instructions are inserted (103) to cause the equivalent memory locations at all computers to be updated. In particular, the finalization of JAVA language classes and objects is disclosed (162, 163) so finalization only occurs when the last class or object present on all machines is no longer required.

51 Claims, 14 Drawing Sheets

U.S. PATENT DOCUMENTS

| | | | |
|---|---|---|---|
| 4,969,092 A | 11/1990 | Shorter | |
| 5,053,943 A | 10/1991 | Yokoyama | |
| 5,214,776 A | 5/1993 | Bagnoli et al. | |
| 5,291,597 A | 3/1994 | Shorter et al. | |
| 5,418,966 A | 5/1995 | Madduri | |
| 5,434,994 A | 7/1995 | Shaheen et al. | |
| 5,488,723 A | 1/1996 | Baradel et al. | |
| 5,544,345 A | 8/1996 | Carpenter et al. | |
| 5,568,605 A | 10/1996 | Clouston et al. | |
| 5,568,609 A | 10/1996 | Sugiyama et al. | |
| 5,612,865 A | 3/1997 | Dasgupta | |
| 5,692,193 A * | 11/1997 | Jagannathan et al. | 718/106 |
| 5,719,872 A | 2/1998 | Dubberly et al. | |
| 5,754,207 A | 5/1998 | Gragg et al. | |
| 5,802,585 A | 9/1998 | Scales et al. | |
| 5,809,543 A * | 9/1998 | Byers et al. | 711/162 |
| 5,918,248 A | 6/1999 | Newell et al. | |
| 5,960,087 A | 9/1999 | Tribble et al. | |
| 6,010,210 A | 1/2000 | Wilson et al. | |
| 6,017,118 A | 1/2000 | Gasvoda et al. | |
| 6,049,809 A | 4/2000 | Raman et al. | |
| 6,101,527 A | 8/2000 | Lejeune et al. | |
| 6,148,377 A | 11/2000 | Carter et al. | |
| 6,163,801 A | 12/2000 | O'Donnell et al. | |
| 6,192,514 B1 | 2/2001 | Lurndal | |
| 6,216,262 B1 | 4/2001 | Martin | |
| 6,264,316 B1 | 7/2001 | Chino | |
| 6,266,747 B1 | 7/2001 | Dahl et al. | |
| 6,312,115 B1 | 11/2001 | Hara et al. | |
| 6,314,558 B1 | 11/2001 | Angel et al. | |
| 6,318,850 B1 | 11/2001 | Childers et al. | |
| 6,324,587 B1 | 11/2001 | Trenbeath et al. | |
| 6,327,630 B1 | 12/2001 | Carroll et al. | |
| 6,370,625 B1 | 4/2002 | Carmean et al. | |
| 6,386,675 B2 | 5/2002 | Wilson et al. | |
| 6,389,423 B1 | 5/2002 | Sakakura | |
| 6,425,016 B1 | 7/2002 | Banavar et al. | |
| 6,449,734 B1 | 9/2002 | Shrivastava et al. | |
| 6,460,051 B1 | 10/2002 | LaRue et al. | |
| 6,473,773 B1 | 10/2002 | Cheng et al. | |
| 6,496,871 B1 * | 12/2002 | Jagannathan et al. | 719/317 |
| 6,571,278 B1 | 5/2003 | Negishi et al. | |
| 6,574,628 B1 | 6/2003 | Kahn et al. | |
| 6,574,674 B1 | 6/2003 | May et al. | |
| 6,578,068 B1 * | 6/2003 | Bowman-Amuah | 709/203 |
| 6,585,359 B1 | 7/2003 | Gasvoda et al. | |
| 6,611,955 B1 | 8/2003 | Logean et al. | |
| 6,625,751 B1 | 9/2003 | Starovic et al. | |
| 6,633,577 B1 | 10/2003 | Nyu | |
| 6,637,872 B2 | 10/2003 | Ara et al. | |
| 6,662,359 B1 | 12/2003 | Berry et al. | |
| 6,668,260 B2 | 12/2003 | Zoltan | |
| 6,668,312 B2 * | 12/2003 | Aubury | 711/170 |
| 6,682,608 B2 | 1/2004 | Abrams et al. | |
| 6,725,014 B1 | 4/2004 | Voegele | |
| 6,757,896 B1 | 6/2004 | Cohen et al. | |
| 6,760,903 B1 | 7/2004 | Morshed et al. | |
| 6,775,831 B1 | 8/2004 | Carrasco et al. | |
| 6,779,093 B1 | 8/2004 | Gupta | |
| 6,782,492 B1 | 8/2004 | Nakaso | |
| 6,823,511 B1 | 11/2004 | McKenney et al. | |
| 6,826,570 B1 * | 11/2004 | Eshel et al. | 707/8 |
| 6,862,608 B2 | 3/2005 | Buhlman et al. | |
| 6,865,585 B1 * | 3/2005 | Dussud | 707/206 |
| 6,922,685 B2 * | 7/2005 | Greene et al. | 707/1 |
| 6,954,794 B2 | 10/2005 | Rudd et al. | |
| 6,968,372 B1 | 11/2005 | Thompson et al. | |
| 7,004,575 B2 | 2/2006 | Inoue et al. | |
| 7,010,576 B2 | 3/2006 | Bae | |
| 7,020,736 B1 | 3/2006 | Cherukuri | |
| 7,031,989 B2 * | 4/2006 | Elmendorf et al. | 707/206 |
| 7,047,341 B2 | 5/2006 | Jung | |
| 7,047,521 B2 | 5/2006 | Bunnell | |
| 7,058,826 B2 | 6/2006 | Fung | |
| 7,082,604 B2 | 7/2006 | Schneiderman | |
| 7,149,866 B2 * | 12/2006 | Blandy | 711/170 |
| 7,200,734 B2 | 4/2007 | Hyser | |
| 7,206,827 B2 | 4/2007 | Viswanath et al. | |
| 7,380,039 B2 * | 5/2008 | Miloushev et al. | 710/244 |
| 7,412,580 B1 * | 8/2008 | Garthwaite | 711/165 |
| 7,437,516 B2 | 10/2008 | Wintergerst et al. | |
| 7,451,240 B2 * | 11/2008 | Wu et al. | 709/250 |
| 7,549,149 B2 | 6/2009 | Childress et al. | |
| 7,581,069 B2 | 8/2009 | Holt | |
| 7,639,656 B2 | 12/2009 | Dooley | |
| 7,647,454 B2 | 1/2010 | Aguilera | |
| 7,660,960 B2 | 2/2010 | Holt | |
| 7,712,081 B2 | 5/2010 | Biberstein et al. | |
| 7,739,349 B2 | 6/2010 | Holt | |
| 7,761,670 B2 | 7/2010 | Holt | |
| 7,788,314 B2 | 8/2010 | Holt | |
| 2002/0087925 A1 | 7/2002 | Hayden et al. | |
| 2002/0138551 A1 | 9/2002 | Ericson | |
| 2002/0161848 A1 | 10/2002 | Willman et al. | |
| 2002/0169644 A1 * | 11/2002 | Greene | 705/7 |
| 2002/0199172 A1 | 12/2002 | Bunnell | |
| 2003/0004924 A1 | 1/2003 | Williams | |
| 2003/0005407 A1 | 1/2003 | Hines | |
| 2003/0012197 A1 | 1/2003 | Yazaki et al. | |
| 2003/0067912 A1 | 4/2003 | Mead et al. | |
| 2003/0105816 A1 | 6/2003 | Goswani | |
| 2003/0208658 A1 | 11/2003 | Magoshi | |
| 2004/0073828 A1 | 4/2004 | Bronstein | |
| 2004/0093588 A1 | 5/2004 | Gschwind et al. | |
| 2004/0142655 A1 | 7/2004 | Voegele | |
| 2004/0158819 A1 | 8/2004 | Cuomo et al. | |
| 2004/0163077 A1 | 8/2004 | Dimpsey et al. | |
| 2004/0196842 A1 | 10/2004 | Hara et al. | |
| 2005/0010683 A1 | 1/2005 | Moleyar et al. | |
| 2005/0027789 A1 * | 2/2005 | Luo et al. | 709/200 |
| 2005/0039171 A1 | 2/2005 | Avakian et al. | |
| 2005/0044545 A1 * | 2/2005 | Childress et al. | 717/177 |
| 2005/0086384 A1 | 4/2005 | Ernst | |
| 2005/0108481 A1 | 5/2005 | Iyengar et al. | |
| 2005/0114848 A1 * | 5/2005 | Choi et al. | 717/148 |
| 2005/0228957 A1 | 10/2005 | Satoyama et al. | |
| 2005/0240737 A1 | 10/2005 | Holt | |
| 2005/0240907 A1 * | 10/2005 | Renouf | 717/136 |
| 2005/0257219 A1 | 11/2005 | Holt | |
| 2005/0262313 A1 | 11/2005 | Holt | |
| 2005/0262513 A1 | 11/2005 | Holt | |
| 2006/0015665 A1 | 1/2006 | Illowsky et al. | |
| 2006/0020913 A1 | 1/2006 | Holt | |
| 2006/0041823 A1 | 2/2006 | Wolfgang et al. | |
| 2006/0070051 A1 | 3/2006 | Kuck et al. | |
| 2006/0080389 A1 | 4/2006 | Powers et al. | |
| 2006/0095483 A1 | 5/2006 | Holt | |
| 2006/0143350 A1 * | 6/2006 | Miloushev et al. | 710/242 |
| 2006/0161897 A1 * | 7/2006 | Biberstein et al. | 717/124 |
| 2006/0167878 A1 | 7/2006 | Hartman | |
| 2006/0242464 A1 | 10/2006 | Holt | |
| 2006/0253844 A1 * | 11/2006 | Holt | 717/148 |
| 2006/0265703 A1 * | 11/2006 | Holt | 717/169 |
| 2006/0265704 A1 * | 11/2006 | Holt | 717/169 |
| 2006/0265705 A1 | 11/2006 | Holt | |
| 2007/0100828 A1 | 5/2007 | Holt | |
| 2007/0101080 A1 | 5/2007 | Holt | |
| 2007/0126750 A1 | 6/2007 | Holt | |
| 2007/0147168 A1 | 6/2007 | Pinto et al. | |
| 2007/0174734 A1 | 7/2007 | Holt | |
| 2007/0233967 A1 | 10/2007 | Rangarajan et al. | |
| 2008/0072238 A1 | 3/2008 | Monnie et al. | |
| 2008/0114853 A1 | 5/2008 | Holt | |
| 2008/0114896 A1 | 5/2008 | Holt | |
| 2008/0114899 A1 | 5/2008 | Holt | |
| 2008/0114943 A1 | 5/2008 | Holt | |
| 2008/0114944 A1 | 5/2008 | Holt | |
| 2008/0114945 A1 | 5/2008 | Holt | |
| 2008/0114962 A1 | 5/2008 | Holt | |
| 2008/0120475 A1 | 5/2008 | Holt | |
| 2008/0120477 A1 | 5/2008 | Holt | |
| 2008/0120478 A1 | 5/2008 | Holt | |
| 2008/0123642 A1 | 5/2008 | Holt | |
| 2008/0126322 A1 | 5/2008 | Holt | |
| 2008/0126372 A1 | 5/2008 | Holt | |
| 2008/0126502 A1 | 5/2008 | Holt | |
| 2008/0126503 A1 | 5/2008 | Holt | |

| | | | |
|---|---|---|---|
| 2008/0126504 | A1 | 5/2008 | Holt |
| 2008/0126505 | A1 | 5/2008 | Holt |
| 2008/0126506 | A1 | 5/2008 | Holt |
| 2008/0126516 | A1 | 5/2008 | Holt |
| 2008/0126572 | A1 | 5/2008 | Holt |
| 2008/0126703 | A1 | 5/2008 | Holt |
| 2008/0126721 | A1 | 5/2008 | Holt |
| 2008/0127213 | A1 | 5/2008 | Holt |
| 2008/0127214 | A1 | 5/2008 | Holt |
| 2008/0130631 | A1 | 6/2008 | Holt |
| 2008/0130652 | A1 | 6/2008 | Holt |
| 2008/0133688 | A1 | 6/2008 | Holt |
| 2008/0133689 | A1 | 6/2008 | Holt |
| 2008/0133690 | A1 | 6/2008 | Holt |
| 2008/0133691 | A1 | 6/2008 | Holt |
| 2008/0133692 | A1 | 6/2008 | Holt |
| 2008/0133694 | A1 | 6/2008 | Holt |
| 2008/0133711 | A1 | 6/2008 | Holt |
| 2008/0133859 | A1 | 6/2008 | Holt |
| 2008/0133861 | A1 | 6/2008 | Holt |
| 2008/0133862 | A1 | 6/2008 | Holt |
| 2008/0133869 | A1 | 6/2008 | Holt |
| 2008/0189700 | A1 | 8/2008 | Schmidt et al. |

FOREIGN PATENT DOCUMENTS

| | | |
|---|---|---|
| WO | WO 95/08809 | 3/1995 |
| WO | WO 98/58330 | 12/1998 |
| WO | WO02/44835 | 6/2002 |
| WO | WO03/083614 | 10/2003 |
| WO | WO03084116 | 10/2003 |
| WO | WO2005/103924 | 11/2005 |
| WO | WO2005/103925 | 11/2005 |
| WO | WO2005/103926 | 11/2005 |
| WO | WO2005/103927 | 11/2005 |
| WO | WO2005/103928 | 11/2005 |
| WO | WO2006/110937 | 10/2006 |
| WO | WO2006/110957 | 10/2006 |

OTHER PUBLICATIONS

Bal et al., "Experience with Distributed Programming in Orca", Proc. *IEEE CS International Conference on Computer Languages*, pp. 79-89 (1990).

Bal et al., "Object Distribution in ORCA Using Compile-Time and Run_Time Techniques", Proc. Conference on Object-Oriented Programming Systems, Languages and Applications pp. 162-177 (1993).

Bal et al., "Orca: A Language for Paralell Programming of Distributed Systems", *IEEE Transactions on Software Engineering*, 18(3):190-205 (2002).

Bal et al., "Replication Techniques for Speeding up Parallel Applications on Distributed Sysytems", *Concurrency Practice & Experience*, 4(5):337-355 (1992).

Bressoud, T.C. TFT: "A Software System for Application-Transparent Fault Tolerance. Proc.", 28$^{th}$ Annual International Symposium on Fault-Tolerant Computing, pp. 128-137 (1998).

Abdullahi, et al., "Garbage Collection for Internet: A Survey of Distributed Garbage Collection", ACM Computing Surveys [Online], vol. 30, No. 3, Sep. 1998, pp. 330-373, XP002504741 ISSN:0360-0300 Retrieved from the Internet URL:http://portal.acm.org/citation.cfm?doid=292469.292471>.

Aridor, et al. "cJVM: a single System Image of a JVM on a Cluster" Proceedings of the International Conference on Parallel Processing, pp. 21-24, Sep. 21-24, 1999.

Bal, et al., "A Distributed Implementation of the Shared Data-Object Model", Proc. USENIX Workshop on Experiences with Distributed and Multiprocessor Systems pp. 1-19, Oct. 1998, Fort Lauderdale, FL.

Bal, et al., "Experience with Distributed Programming in Orca", *IEEE CS International Conference on Computer Languages*, pp. 1-23, Mar. 1990, New Orleans, Louisiana.

Bal, et al., "Object Distribution in ORCA Using Compile-Time and Run-Time Techniques", Proc. Conference on Object-Oriented Programming, Systems, Languages and Applications pp. 162-177, Sep. 26-Oct. 1, 1993.

Bal, et al., "Orca: A Language for Paralell Programming of Distributed Systems", *IEEE Transactions on Software Engineering*, 18(3): pp. 1-33, Oct. 1989.

Bal, et al., "Replication Techniques for Speeding Up Parallel Applications On Distributed Systems", *Concurrency Practice & Experience*, 4(5):337-355 (1992).

Bellew, et al., "Update propagation in distributed memory hierarchy." Data Engr. 1990. Proc. 6th Int'l Conf., pp. 521-528, Feb. 1990.

Bennett, et al. "Munin: Distributed Shared Memory Based on Type Specific Memory Coherence." Dept. Elec & Computer Engr. pp. 1-9 ACM, PPOPP' 90, Feb. 1990.

Bressoud, T.C. TFT: "A Software System for Application-Transparent Fault Tolerance. Proc.", 28$^{th}$ Annual International Symposium on Fault-Tolerant Computing, pp. 128-137, Jun. 1998, Munich, Germany.

Chen, et al., "Multi-Jay: a distributed shared memory system based on multiple Java virtual machines." Proc. of Conf. on Parallel & Distrib. Proc. Techn. & Appls., Las Vegas, NV, Jun. 1998.

Dasilva, et al. "An evaluation of cJava system architecture." IEEE Prc. 15th Symposium on Computer Architecture & High Performance Computing, pp. 1-9, Nov. 10-12, 2003, San Paulo, Brazil.

Dmitriev, "Profiling Java applications using code hotswapping and dynamic call graph revelation.", Jan. 14-16, 2004, ACM WOSP '04, pp. 139-150.

Dwarkadas, et al., "Evaluation of Release Consistent Software Distributed Shared Memory on Emerging Network Technology", Proc of the 20th Annual International Symposium on Computer Architecture (ISCA'93), pp. 144-155, May 16-19, 1993, San Diego, CA.

Goethe, et al. "The Distributed Ada Run-Time System DARTS." Software Prac. & Experience, vol. 21, No. 1, pp. 1249-1263, Aug. 4, 1989.

Haumacher, et al. "Transparent distributed threads for Java," Parallel & Distributed Proc. Symposium 2003. Proc. Int'l. pp. 22-26, Apr. 2003.

Puatu, "Distributed Garbage Collection of Active Objects with No Global Synchronisation"—Lecture Notes in Computer Science, Memory Management [online], XP008098868 ISSN: 0302-9743 ISBN: 978-3-540-55940-5- Retreived from the internet URL:http://www.springerlink.com/content/5v 028411810p6m700/>, vol. 637, pp. 148-1694 Sep. 17-19, 1992, IWMM 92, St. Malo, France.

Larus, et al. "EEL: machine-independent executable editing. 1995 ACM SIGGPLAN '95." pp. 291-300 Jun. 21-22, 1995.

Little, et al., "Maintaining Information About Persistent Replicated Objects in a Distributed System", Processing of the International Conference on Distributed Computing Systems. Pittsburgh, May 25-28, 1993 [Proceedings of the International Conference on Distributed Computing Systems], Los Alamitos, IEEE Comp Soc Press US, vol. CONF. 13, May 25, 1993, pp. 491-498, WP010095684 ISBN:978-0-8186-3770-4.

Radovic, et al., Removing the overhead from software-based shared memory. Prc. 2001 ACM/IEEE Conf. Supercomputine (CDrom), Denver CO, Nov. 10-16, 2001, Supercomuting '01. ACM Press. NY.

Russ, et al. "The hector distributed run-time environment", IEEEE Transactions on Parallel and Distributed Systems, vol. 9, No. 111998, May 22, 1998.

Sanchez, et al. "Distributed Garbage Collection for Wide Area Replicated Memory", Proceedings of the 6th Conference on Usenix Conference on Object-Oriented Technologies and Systems [On Line], vol. 6, Jun. 29, 2001, pp. 1-14, P1-14XP002502672 Retrieved from the Internet URL:http://portal.acm.org/citation.cfm?id=1268246. http://citeseerx.ist.psu.edu/viewdoc/summary?doi=10.1.1.10.5675 http://www.gsd.inesc-id.pt/ {veiga/papers/dgcwarm-coots-2001.pdf>.

Shapiro, et al., "A Distributed Shared Memory and its Garbage Collector", Lecture notes in Computer Science, vol. 972, Proceedings of the 9th International Workshop on Distributed Algorithms, pp. 198-214, Sep. 13-15, 1995.

Supplementary European Search Report EP 06 79 0317 Dated Mar. 5, 2009.

* cited by examiner

# COMPUTER ARCHITECTURE AND METHOD OF OPERATION FOR MULTI-COMPUTER DISTRIBUTED PROCESSING WITH FINALIZATION OF OBJECTS

RELATED APPLICATIONS

This application claims benefit under 35 U.S.C. 120 as a Continuation-in-part of the following copending U.S. application Ser. Nos.:

11/111,757 filed on Apr. 22, 2005, which is a Continuation-in-Part of pending U.S. application Ser. No. 10/830,042, filed on Apr. 23, 2004;
11/111,778 filed on Apr. 22, 2005, which is a Continuation-in-Part of pending U.S. application Ser. No. 10/830,042, filed on Apr. 23, 2004;
11/111,779 filed on Apr. 22, 2005, which is a Continuation-in-Part of pending U.S. application Ser. No. 10/830,042, filed on Apr. 23, 2004;
11/111,781 filed on Apr. 22, 2005, which is a Continuation-in-Part of pending U.S. application Ser. No. 10/830,042, filed on Apr. 23, 2004;
11/111,946 filed on Apr. 22, 2005, which is a Continuation-in-Part of pending U.S. application Ser. No. 10/830,042, filed on Apr. 23, 2004.

This application claims priority under 35 U.S.C. 119(a)-(d) to the following Australian provisional applications:

2005 902 023, filed on Apr. 21, 2005;
2005 902 024, filed on Apr. 21, 2005;
2005 902 025, filed on Apr. 21, 2005;
2005 902 026, filed on Apr. 21, 2005; and
2005 902 027, filed on Apr. 21, 2005.

This application also claims priority under 35 U.S.C. §119(a)-(d) to each of the following copending International applications filed under the PCT:

PCT/AU05/000578 filed on Apr. 22, 2005;
PCT/AU05/000579 filed on Apr. 22, 2005;
PCT/AU05/000580 filed on Apr. 22, 2005;
PCT/AU05/000581 filed on Apr. 22, 2005; and
PCT/AU05/000582 filed on Apr. 22, 2005.

This application is also related to the following concurrently-filed U.S. non-provisional applications:

Ser. No. 11/259,634 filed on Oct. 25, 2005;
Ser. No. 11/259,744 filed on Oct. 25, 2005;
Ser. No. 11/259,761 filed on Oct. 25, 2005; and
Ser. No. 11/259,885 filed on Oct. 25, 2005.

The entire contents of each of these above-identified applications are incorporated herein by reference.

FIELD OF THE INVENTION

The present invention relates to computers and other computing machines and information appliances, in particular, to a modified computer architecture and program structure which enables the operation of an application program concurrently or simultaneously on a plurality of computers interconnected via a communications link using a distributed runtime and enables improved performance to be achieved.

BACKGROUND OF THE INVENTION

Ever since the advent of computers, and computing, software for computers has been written to be operated upon a single machine. As indicated in FIG. 1, that single prior art machine 1 is made up from a central processing unit, or CPU, 2 which is connected to a memory 3 via a bus 4. Also connected to the bus 4 are various other functional units of the single machine 1 such as a screen 5, keyboard 6 and mouse 7.

A fundamental limit to the performance of the machine 1 is that the data to be manipulated by the CPU 2, and the results of those manipulations, must be moved by the bus 4. The bus 4 suffers from a number of problems including so called bus "queues" formed by units wishing to gain an access to the bus, contention problems, and the like. These problems can, to some extent, be alleviated by various stratagems including cache memory, however, such stratagems invariably increase the administrative overhead of the machine 1.

Naturally, over the years various attempts have been made to increase machine performance. One approach is to use symmetric multi-processors. This prior art approach has been used in so called "super" computers and is schematically indicated in FIG. 2. Here a plurality of CPU's 12 are connected to global memory 13. Again, a bottleneck arises in the communications between the CPU's 12 and the memory 13. This process has been termed "Single System Image". There is only one application and one whole copy of the memory for the application which is distributed over the global memory. The single application can read from and write to, (i.e. share) any memory location completely transparently.

Where there are a number of such machines interconnected via a network, this is achieved by taking the single application written for a single machine and partitioning the required memory resources into parts. These parts are then distributed across a number of computers to form the global memory 13 accessible by all CPU's 12. This procedure relies on masking, or hiding, the memory partition from the single running application program. The performance degrades when one CPU on one machine must access (via a network) a memory location physically located in a different machine.

Although super computers have been technically successful in achieving high computational rates, they are not commercially successful in that their inherent complexity makes them extremely expensive not only to manufacture but to administer. In particular, the single system image concept has never been able to scale over "commodity" (or mass produced) computers and networks. In particular, the Single System Image concept has only found practical application on very fast (and hence very expensive) computers interconnected by very fast (and similarly expensive) networks.

A further possibility of increased computer power through the use of a plural number of machines arises from the prior art concept of distributed computing which is schematically illustrated in FIG. 3. In this known arrangement, a single application program (Ap) is partitioned by its author (or another programmer who has become familiar with the application program) into various discrete tasks so as to run upon, say, three machines in which case n in FIG. 3 is the integer 3. The intention here is that each of the machines M1 ... M3 runs a different third of the entire application and the intention is that the loads applied to the various machines be approximately equal. The machines communicate via a network 14 which can be provided in various forms such as a communications link, the internet, intranets, local area networks, and the like. Typically the speed of operation of such networks 14 is an order of magnitude slower than the speed of operation of the bus 4 in each of the individual machines M1, M2, ..., Mn.

Distributed computing suffers from a number of disadvantages. Firstly, it is a difficult job to partition the application and this must be done manually. Secondly, communicating data, partial results, results and the like over the network 14 is an administrative overhead. Thirdly, the need for partitioning makes it extremely difficult to scale upwardly by utilising more machines since the application having been partitioned into, say three, does not run well upon four machines. Fourthly, in the event that one of the machines should become disabled, the overall performance of the entire system is substantially degraded.

A further prior art arrangement is known as network computing via "clusters" as is schematically illustrated in FIG. 4. In this approach, the entire application is loaded onto each of the machines M1, M2, . . . , Mn. Each machine communicates with a common database but does not communicate directly with the other machines. Although each machine runs the same application, each machine is doing a different "job" and uses only its own memory. This is somewhat analogous to a number of windows each of which sell train tickets to the public. This approach does operate, is scalable and mainly suffers from the disadvantage that it is difficult to administer the network.

In computer languages such as for example JAVA and MICROSOFT.NET there are two major types of constructs with which programmers deal. In the JAVA language these are known as objects and classes. More generally they may be referred to as assets. Every time an object (or other asset) is created there is an initialization routine run known as an object initialization (e.g., "<init>") routine. Similarly, every time a class is loaded there is a class initialization routine known as "<clinit>". Other languages use different terms but utilize a similar concept. In either case, however, there is no equivalent "clean up" or deletion routine to delete an object or class (or other asset) once it is no longer required. Instead, this "clean up" happens unobtrusively in a background mode.

Furthermore, in any computer environment it is necessary to acquire and release a lock to enable the use of such objects, classes, assets, resources or structures to avoid different parts of the application program from attempting to use the same objects, classes, assets, resources or structures at the one time. In the JAVA environment this is known as synchronization. Synchronization more generally refers to the exclusive use of an object, class, resource, structure, or other asset to avoid contention between and among computers or machines. This is achieved in JAVA by the "monitor enter" and "monitor exit" instructions or routines. Other languages use different terms but utilize a similar concept.

Unfortunately, conventional computing systems, architectures, and operating schemes do not provide for computing environments and methods in which an application program can operate simultaneously on an arbitrary plurality of computers where the environment and operating scheme ensure that the abovementioned memory management, initialization, clean up and synchronization procedures operate in a consistent and coordinated fashion across all the computing machines.

SUMMARY

The present invention discloses a computing environment in which an application program operates simultaneously on a plurality of computers. In such an environment it is advantageous to ensure that the abovementioned asset initialization, clean-up and synchronization procedures operate in a consistent and coordinated fashion across all the machines.

In accordance with a first aspect of the present invention there is disclosed a multiple computer system having at least one application program each written to operate on only a single computer but running simultaneously on a plurality of computers interconnected by a communications network, wherein different portions of said application program(s) execute substantially simultaneously on different ones of said computers, wherein each computer has an independent local memory accessible only by the corresponding portion of said application program(s) and wherein for each said portion a like plurality of substantially identical objects are created, each in the corresponding computer.

In accordance with a second aspect of the present invention there is disclosed A plurality of computers interconnected via a communications link and each having an independent local memory and substantially simultaneously operating a different portion at least one application program each written to operate on only a single computer, each local memory being accessible only by the corresponding portion of said application program.

In accordance with a third aspect of the present invention there is disclosed a method of running simultaneously on a plurality of computers at least one application program each written to operate on only a single computer, said computers being interconnected by means of a communications network and each having an independent local memory, said method comprising the step of: (i) executing different portions of said application program(s) on different ones of said computers and for each said portion creating a like plurality of substantially identical objects each in the corresponding computer and each accessible only by the corresponding portion of said application program.

In accordance with a fourth aspect of the present invention there is disclosed a method of loading an application program written to operate only on a single computer onto each of a plurality of computers, the computers being interconnected via a communications link, and different portions of said application program(s) being substantially simultaneously executable on different computers with each computer having an independent local memory accessible only by the corresponding portion of said application program(s), the method comprising the step of modifying the application before, during, or after loading and before execution of the relevant portion of the application program.

In accordance with a fifth aspect of the present invention there is disclosed a method of operating simultaneously on a plurality of computers all interconnected via a communications link at least one application program each written to operate on only a single computer, each of said computers having at least a minimum predetermined local memory capacity, different portions of said application program(s) being substantially simultaneously executed on different ones of said computers with the local memory of each computer being only accessible by the corresponding portion of said application program(s), said method comprising the steps of: (i) initially providing each local memory in substantially identical condition, (ii) satisfying all memory reads and writes generated by each said application program portion from said corresponding local memory, and (iii) communicating via said communications link all said memory writes at each said computer which take place locally to all the remainder of said plurality of computers whereby the contents of the local memory utilised by each said computer, subject to an updating data transmission delay, remains substantially identical.

In accordance with a sixth aspect of the present invention there is disclosed A method of compiling or modifying an application program written to operate on only a single computer but to run simultaneously on a plurality of computers interconnected via a communications link, with different portions of said application program(s) executing substantially simultaneously on different ones of said computers each of which has an independent local memory accessible only by the corresponding portion of said application program, said method comprising the steps of: (i) detecting instructions which share memory records utilizing one of said computers, (ii) listing all such shared memory records and providing a naming tag for each listed memory record, (iii) detecting those instructions which write to, or manipulate the contents of, any of said listed memory records, and (iv) activating an updating propagation routine following each said detected write or manipulate instruction, said updating propagation routine forwarding the re-written or manipulated contents and name tag of each said re-written or manipulated listed memory record to the remainder of said computers.

In accordance with a seventh aspect of the present invention there is disclosed in a multiple thread processing computer operation in which individual threads of a single application program written to operate on only a single computer are simultaneously being processed each on a different corresponding one of a plurality of computers each having an independent local memory accessible only by the corresponding thread and each being interconnected via a communications link, the improvement comprising communicating changes in the contents of local memory physically associated with the computer processing each thread to the local memory of each other said computer via said communications link.

The present invention further discloses a computing environment in which an application program operates simultaneously on a plurality of computers. In such an environment it is advantageous to ensure that the "clean up" (or deletion or finalisation) operates in a consistent fashion across all the machines. It is this goal of consistent finalization that is the genesis of the present invention.

In accordance with a eighth aspect of the present invention there is disclosed a multiple computer system having at least one application program each written to operate only on a single computer but running simultaneously on a plurality of computers interconnected by a communications network, wherein different portions of said application program(s) execute substantially simultaneously on different ones of said computers and for each said portion a like plurality of substantially identical objects are created, each in the corresponding computer and each having a substantially identical name, and wherein all said identical objects are collectively deleted when each one of said plurality of computers no longer needs to refer to their corresponding object.

In accordance with a ninth aspect of the present invention there is disclosed a plurality of computers interconnected via a communications link and operating simultaneously at least one application program each written to operate only on a single computer, wherein each said computer substantially simultaneously executes a different portion of said application program(s), each said computer in operating its application program portion needs, or no longer needs to refer to an object only in local memory physically located in each said computer, the contents of the local memory utilized by each said computer is fundamentally similar but not, at each instant, identical, and every one of said computers has a finalization routine which deletes a non-referenced object only if each one of said plurality of computers no longer needs to refer to their corresponding object.

In accordance with a tenth aspect of the present invention there is disclosed a method of running simultaneously on a plurality of computers at least one application program each written to operate only on a single computer, said computers being interconnected by means of a communications network, said method comprising the steps of: (i) executing different portions of said application program(s) on different ones of said computers and for each said portion creating a like plurality of substantially identical objects each in the corresponding computer and each having a substantially identical name, and (ii) deleting all said identical objects collectively when all of said plurality of computers no longer need to refer to their corresponding object.

In accordance with an eleventh aspect of the present invention there is disclosed a method of ensuring consistent finalization of an application program written to operate only on a single computer but different portions of which are to be executed substantially simultaneously each on a different one of a plurality of computers interconnected via a communications network, said method comprising the steps of: (i) scrutinizing said application program at, or prior to, or after loading to detect each program step defining an finalization routine, and (ii) modifying said finalization routine to ensure collective deletion of corresponding objects in all said computers only when each one of said computers no longer needs to refer to their corresponding object.

In accordance with a twelfth aspect of the present invention there is disclosed a method a multiple thread processing computer operation in which individual threads of a single application program written to operate only on a single computer are simultaneously being processed each on a corresponding different one of a plurality of computers interconnected via a communications link, and in which objects in local memory physically associated with the computer processing each thread have corresponding objects in the local memory of each other said computer, the improvement comprising collectively deleting all said corresponding objects when each one of said plurality of computers no longer needs to refer to their corresponding object.

In accordance with a thirteenth aspect of the present invention there is disclosed a computer program product comprising a set of program instructions stored in a storage medium and operable to permit a plurality of computers to carry out the abovementioned methods.

In accordance with a fourteenth aspect of the invention there is disclosed a distributed run time and distributed run time system adapted to enable communications between a plurality of computers, computing machines, or information appliances.

In accordance with a fifteenth aspect of the invention there is disclosed a modifier, modifier means, and modifier routine for modifying an application program written to execute on a single computer or computing machine at a time to execute simultaneously on a plurality of networked computers or computing machines distributed run time and distributed run time system adapted to enable communications between a plurality of computers, computing machines, or information appliances.

In accordance with a sixteenth aspect of the present invention there is disclosed a computer program and computer program product written to operate on only a single computer but product comprising a set of program instructions stored in a storage medium and operable to permit a plurality of computers to carry out the abovementioned procedures, routines, and methods.

BRIEF DESCRIPTION OF THE DRAWINGS

Embodiments of the present invention are now described with reference to the drawings in which.

Figure 1:
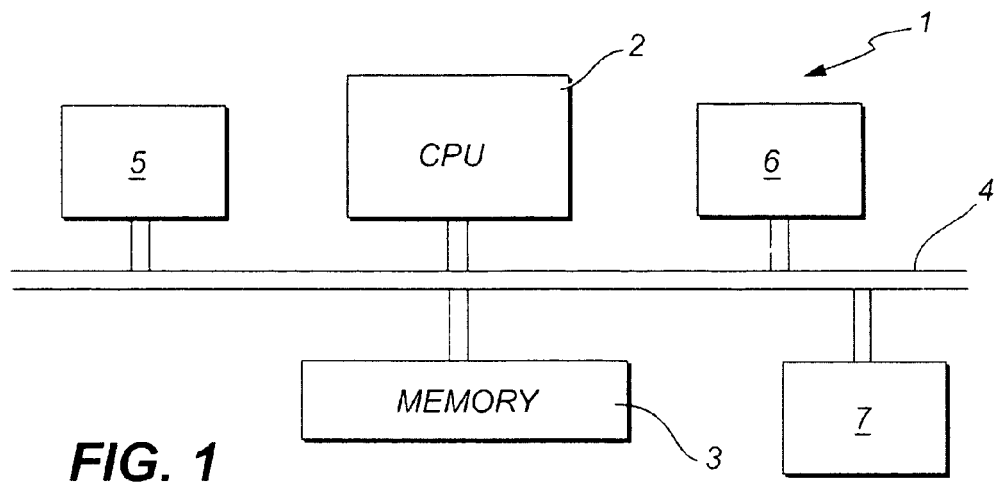
FIG. 1 is a schematic view of the internal architecture of a conventional computer.

The specification includes Annexures A and C which provide actual code fragments which implement various aspects of the described embodiments. Annexure A relates to fields and Annexure C to finalization.

REFERENCE TO ANNEXES

Although the specification provides a complete and detailed description of the several embodiments of the invention such that the invention may be understood and implemented without reference to other materials, the specification does includes Annexures A and C which provide exemplary actual program or code fragments which implement various aspects of the described embodiments. Although aspects of the invention are described throughout the specification including the Annexes, drawings, and claims, it may be appreciated that Annexure A relates primarily to fields and Annexure C relates primarily to finalization.

It will be appreciated in light of the description provided here that the categorization of the Annexures as well as the use of other headings and subheadings in this description is intended as an aid to the reader and is not to be used to limit the scope of the invention in any way.

DETAILED DESCRIPTION OF EMBODIMENTS OF THE INVENTION

The present invention discloses a modified computer architecture which enables an applications program to be run simultaneously on a plurality of computers in a manner that overcomes the limitations of the aforedescribed conventional architectures, systems, methods, and computer programs.

In one aspect, shared memory at each computer may be updated with amendments and/or overwrites so that all memory read requests are satisfied locally. Before, during or after program loading, but before execution of relevant portions of the program code are executed, or similar, instructions which result in memory being re-written or manipulated are identified. Additional instructions are inserted into the program code (or other modification made) to cause the equivalent memory locations at all computers to be updated. While the invention is not limited to JAVA language or virtual machines, exemplary embodiments are described relative to the JAVA language and standards.

In another aspect, the initialization of JAVA language classes and objects (or other assets) are provided for so all memory locations for all computers are initialized in the same manner. In another aspect, the finalization of JAVA language classes and objects is also provide so finalization only occurs when the last class or object present on all machines is no longer required. In still another aspect, synchronization is provided such that instructions which result in the application program acquiring (or releasing) a lock on a particular asset (synchronization) are identified. Additional instructions are inserted (or other code modifications performed) to result in a modified synchronization routine with which all computers are updated.

As will become more apparent in light of the further description provided herein, one of the features of the invention is to make it appear that one common application program or application code and its executable version (with likely modification) is simultaneously or concurrently executing across a plurality of computers or machines M1, . . . , Mn. As will be described in considerable detail hereinafter, the instant invention achieves this by running the same application program (for example, Microsoft Word or Adobe Photoshop CS2) on each machine, but modifying the executable code of that application program on each machine as necessary such that each executing instance ('copy') on each machine coordinates its local operations on any particular machine with the operations of the respective instances on the other machines such that they all function together in a consistent, coherent and coordinated manner and give the appearance of being one global instance of the application (i.e., a "meta-application").

In accordance with embodiments of the present invention a single application code 50 (sometimes more informally referred to as the application or the application program) can be operated simultaneously on a number of machines M1, M2 . . . Mn interconnected via a communications network or other communications link or path 53. The communications network or path may be any electronic signaling, data, or digital communications network or path and may advantageously be a relatively slow speed communications path, such as a network connection over the Internet or any common networking configurations known or available as of the date or this applications, and extensions and improvements, thereto.

By way of example but not limitation, one application code or program 50 may be a single application on the machines, such as Microsoft Word, as opposed to different applications on each machine, such as Microsoft Word on machine M1, and Microsoft PowerPoint on machine M2, and Netscape Navigator on machine M3 and so forth. Therefore the terminology "one" application code or program and a "common" application code or program is used to try and capture this situation where all machines M1, . . . , Mn are operating or executing the same program or code and not different (and unrelated) programs. In other words copies or replicas of same or substantially the same application code is loaded onto each of the interoperating and connected machines or computers. As the characteristics of each machine or computer may differ, the application code 50 may be modified before loading, during the loading process, and with some restrictions after the loading process to provide a customization or modification of the code on each machine. Some dissimilarity between the programs may be permitted so long as the other requirements for interoperability, consistency, and coherency as described herein can be maintain. As it will become apparent hereafter, each of the machines M1, M2 . . . Mn operates with the same application code 50 on each machine M1, M2 . . . Mn and thus all of the machines M1, M2, . . . , Mn have the same or substantially the same application code 50 usually with a modification that may be machine specific.

Similarly, each of the machines M1, M2, . . . , Mn operates with the same (or substantially the same or similar) modifier 51 (in some embodiments implemented as a distributed run time or DRT 71) on each machine M1, M2, . . . , Mn and thus all of the machines M1, M2 . . . Mn have the same (or substantially the same or similar) modifier 51 for each modification required. Different modification for example may be required for memory management and replication, initialization, finalization, and/or synchronization (though not all of these modification types may be required for all embodiments).

In addition, during the loading of, or at any time preceding the execution of, the application code 50 (or relevant portion thereof) on each machine M1, M2 . . . Mn, each application code 50 has been modified by the corresponding modifier 51 according to the same rules (or substantially the same rules since minor optimizing changes are permitted within each modifier 51/1, 51/2, . . . , 51/n).

With reference to the finalization modifier that may be present, such finalization modifier 51-F or DRT 71-F or other code modifying means is responsible for modifying the application code 50 so that the code may execute finalization clean-up, or other memory reclamation, recycling, deletion or finalization operations, such as for example finalization methods in the JAVA language and virtual machine environment, in a coordinated, coherent and consistent manner across the plurality of individual machines M1, M2, . . . , Mn.

These structures and procedures when applied in combination when required, maintain a computing environment where memory locations, address ranges, objects, classes, assets, resources, or any other procedural or structural aspect of a computer or computing environment are where required created, maintained, operated, and deactivated or deleted in a coordinated, coherent, and consistent manner across the plurality of individual machines M1, M2 . . . Mn.

Attention is now directed to the particulars of several aspects of the invention that may be utilised alone or in any combination.

Figure 5:
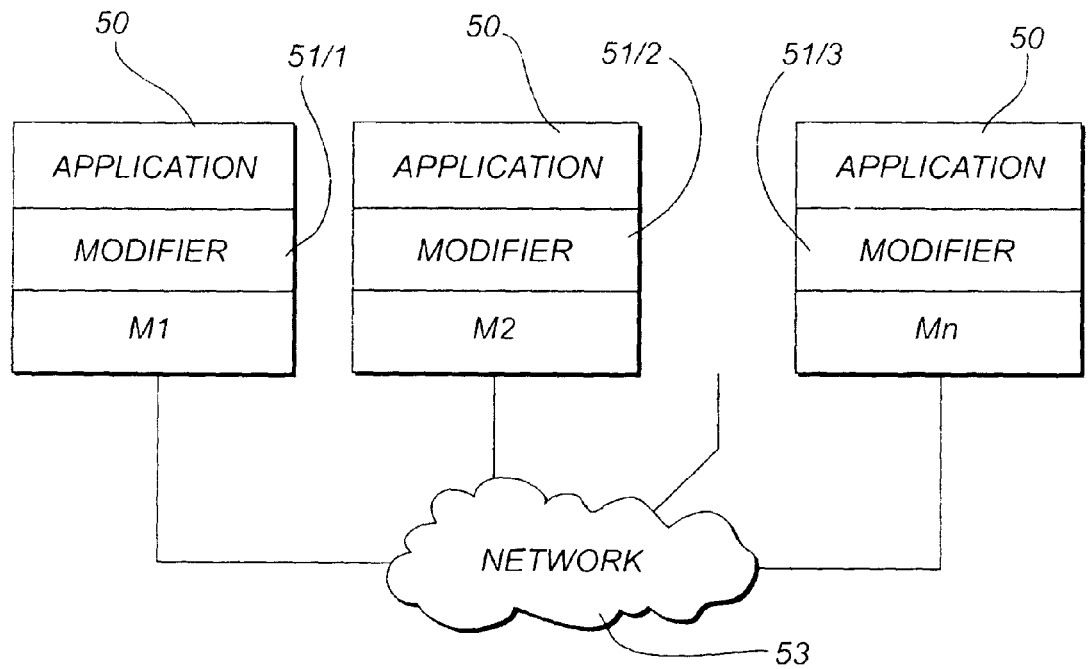
FIG. 5 is a schematic block diagram of a plurality of machines operating the same application program in accordance with a first embodiment of the present invention.

In connection with FIG. 5, in accordance with a preferred embodiment of the present invention a single application code 50 (sometimes more informally referred to as the application or the application program) can be operated simultaneously on a number of machines M1, M2 . . . Mn interconnected via a communications network or other communications link or path 53. By way of example but not limitation, one application code or program 50 would be a single common application program on the machines, such as Microsoft Word, as opposed to different applications on each machine, such as Microsoft Word on machine M1, and Microsoft PowerPoint on machine M2, and Netscape Navigator on machine M3 and so forth. Therefore the terminology "one", "single", and "common" application code or program is used to try and capture this situation where all machines M1, . . . , Mn are operating or executing the same program or code and not different (and unrelated) programs. In other words copies or replicas of same or substantially the same application code is loaded onto each of the interoperating and connected machines or computers. As the characteristics of each machine or computer may differ, the application code 50 may be modified before loading, during the loading process, or after the loading process to provide a customization or modification of the code on each machine. Some dissimilarity between the programs may be permitted so long as the other requirements for interoperability, consistency, and coherency as described herein can be maintain. As it will become apparent hereafter, each of the machines M1, M2 . . . Mn operates with the same application code 50 on each machine M1, M2 . . . Mn and thus all of the machines M1, M2, . . . , Mn have the same or substantially the same application code 50 usually with a modification that may be machine specific.

Similarly, each of the machines M1, M2, . . . , Mn operates with the same (or substantially the same or similar) modifier 51 on each machine M1, M2, . . . , Mn and thus all of the machines M1, M2 . . . Mn have the same (or substantially the same or similar) modifier 51 with the modifier of machine M1 being designated 51/1 and the modifier of machine M2 being designated 51/2, etc. In addition, before or during the loading of, or preceding the execution of, or even after execution has commenced, the application code 50 on each machine M1, M2 . . . Mn is modified by the corresponding modifier 51 according to the same rules (or substantially the same rules since minor optimizing changes are permitted within each modifier 51/1, 51/2, . . . , 51/n).

As will become more apparent in light of the further description provided herein, one of the features of the invention is to make it appear that one application program instance of application code 50 is executing simultaneously across all of the plurality of machines M1, M2, . . . , Mn. As will be described in considerable detail hereinafter, the instant invention achieves this by running the same application program code (for example, Microsoft Word or Adobe Photoshop CS2) on each machine, but modifying the executable code of that application program on each machine such that each executing occurrence (or 'local instance') on each one of the machines M1 . . . Mn coordinates its local operations with the operations of the respective occurrences on each one of the other machines such that each occurrence on each one of the plurality of machines function together in a consistent, coherent and coordinated manner so as to give the appearance of being one global instance (or occurrence) of the application program and program code (i.e., a "meta-application").

As a consequence of the above described arrangement, if each of the machines M1, M2, . . . , Mn has, say, an internal memory capability of 10 MB, then the total memory available to each application code 50 is not necessarily, as one might expect the number of machines (n) times 10 MB, or alternatively the additive combination of the internal memory capability of all n machines, but rather or still may only be 10 MB. In the situation where the internal memory capacities of the machines are different, which is permissible, then in the case where the internal memory in one machine is smaller than the internal memory capability of at least one other of the machines, then the size of the smallest memory of any of the machines may be used as the maximum memory capacity of the machines when such memory (or a portion thereof) is to be treated as a 'common' memory (i.e. similar equivalent memory on each of the machines M1 . . . Mn) or otherwise used to execute the common application code.

However, even though the manner that the internal memory of each machine is treated may initially appear to be a possible constraint on performance, how this results in improved operation and performance will become apparent hereafter. Naturally, each machine M1, M2 . . . Mn has an private (i.e. 'non-common') internal memory capability. The private internal memory capability of the machines M1, M2, . . . , Mn are normally approximately equal but need not be. It may also be advantageous to select the amounts of internal memory in each machine to achieve a desired performance level in each machine and across a constellation or network of connected or coupled plurality of machines, computers, or information appliances M1, M2, . . . , Mn. Having described these internal and common memory considerations, it will be apparent in light of the description provided herein that the amount of memory that can be common between machines is not a limitation of the invention.

Figure 6:
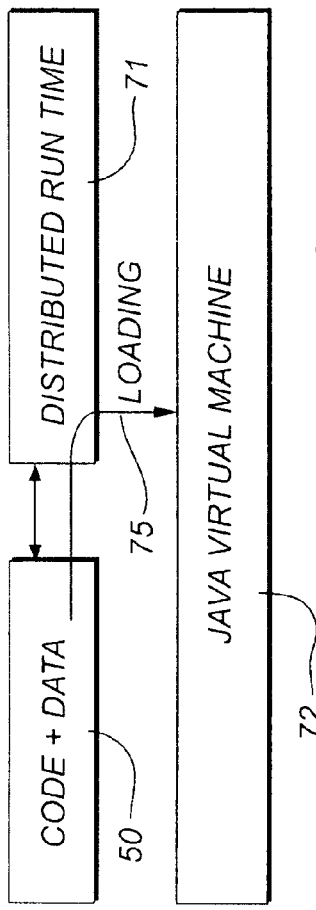
FIG. 6 is a schematic illustration of a prior art computer arranged to operate JAVA code and thereby constitute a JAVA virtual machine.

It is known from the prior art to operate a single computer or machine (produced by one of various manufacturers and having an operating system operating in one of various different languages) in a particular language of the application, by creating a virtual machine as schematically illustrated in FIG. 6. The code and data and virtual machine configuration or arrangement of FIG. 6 takes the form of the application code 50 written in the Java language and executing within a Java Virtual Machine 61. Thus, where the intended language of the application is the language JAVA, a JAVA virtual machine is used which is able to operate code in JAVA irrespective of the machine manufacturer and internal details of the machine. For further details see "The JAVA Virtual Machine Specification" $2^{nd}$ Edition by T. Lindholm & F. Yellin of Sun Microsystems Inc. of the USA, which is incorporated by reference herein.

Figure 7:
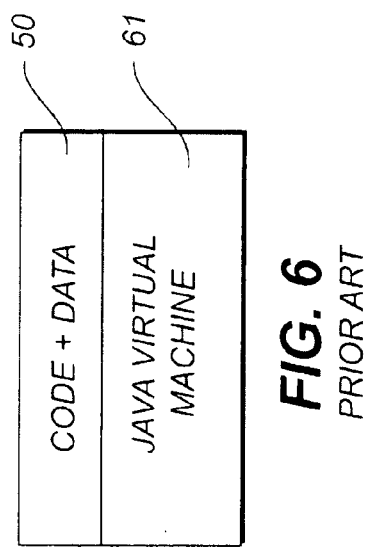
FIG. 7 is a drawing similar to FIG. 6 but illustrating the initial loading of code in accordance with the preferred embodiment.

This conventional art arrangement of FIG. 6 is modified in accordance with embodiments of the present invention by the provision of an additional facility which is conveniently termed "distributed run time" or "distributed run time system" DRT 71 and as seen in FIG. 7.

In FIG. 7, the application code 50 is loaded onto the Java Virtual Machine 72 in cooperation with the distributed runtime system 71, through the loading procedure indicated by arrow 75. As used herein the terms distributed runtime and the distributed run time system are essentially synonymous, and by means of illustration but not limitation are generally understood to include library code and processes which support software written in a particular language running on a particular platform. Additionally, a distributed runtime system may also include library code and processes which support software written in a particular language running within a particular distributed computing environment. The runtime system typically deals with the details of the interface between the program and the operation system such as system calls, program start-up and termination, and memory management. For purposes of background, a conventional Distributed Computing Environment (DCE) that does not provide the capabilities of the inventive distributed run time or distributed run time system 71 required in the invention is available from the Open Software Foundation. This Distributed Computing Environment (DCE) performs a form of computer-to-computer communication for software running on the machines, but among its many limitations, it is not able to implement the modification or communication operations of this invention. Among its functions and operations, the inventive DRT 71 coordinates the particular communications between the plurality of machines M1, M2, . . . , Mn. Moreover, the inventive distributed runtime 71 comes into operation during the loading procedure indicated by arrow 75 of the JAVA application 50 on each JAVA virtual machine 72 of machines JVM#1, JVM#2, . . . JVM#n. The sequence of operations during loading will be described hereafter in relation to FIG. 9. It will be appreciated in light of the description provided herein that although many examples and descriptions are provided relative to the JAVA language and JAVA virtual machines so that the reader may get the benefit of specific examples, the invention is not restricted to either the JAVA language or JAVA virtual machines, or to any other language, virtual machine, machine, or operating environment.

Figure 8:
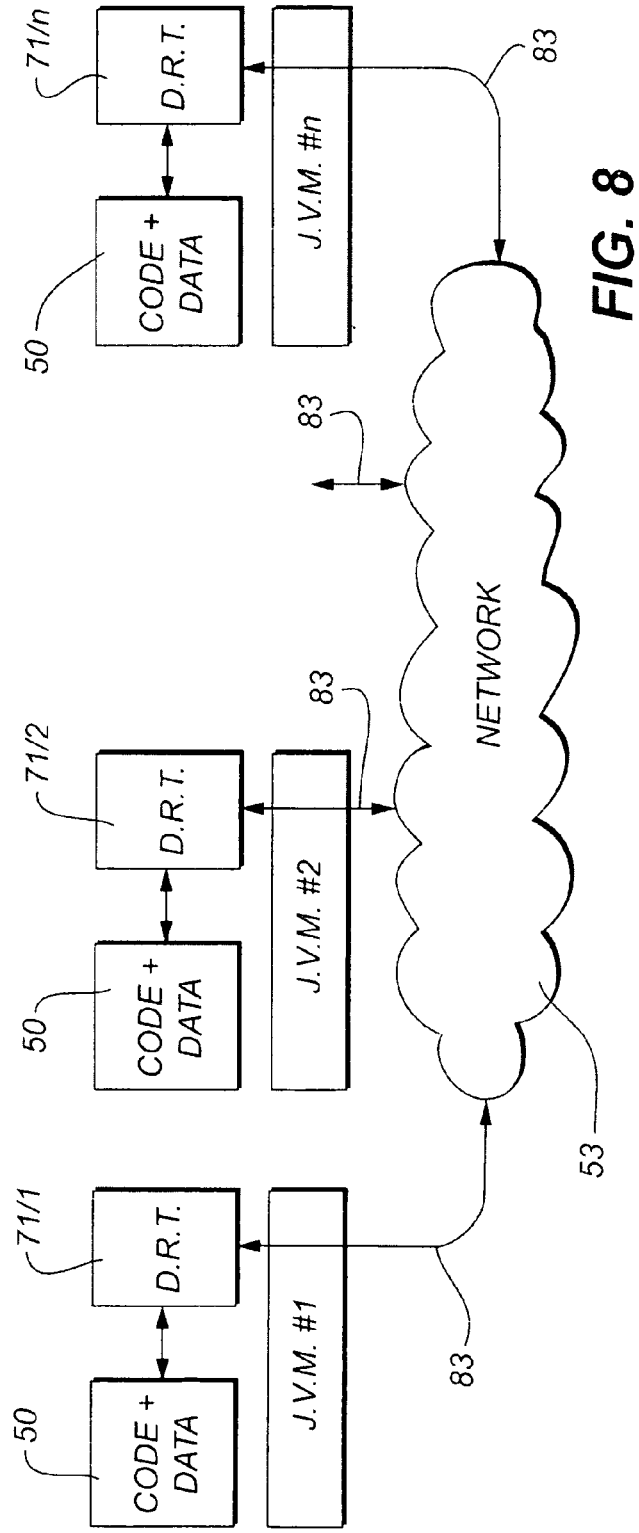
FIG. 8 is a drawing similar to FIG. 5 but illustrating the interconnection of a plurality of computers each operating JAVA code in the manner illustrated in FIG. 7.

FIG. 8 shows in modified form the arrangement of FIG. 5 utilising JAVA virtual machines, each as illustrated in FIG. 7. It will be apparent that again the same application code 50 is loaded onto each machine M1, M2 . . . Mn. However, the communications between each machine M1, M2, . . . , Mn, and indicated by arrows 83, although physically routed through the machine hardware, are advantageously controlled by the individual DRT's 71/1 . . . 71/n within each machine. Thus, in practice this may be conceptionalised as the DRT's 71/1, . . . , 71/n communicating with each other via the network or other communications link 73 rather than the machines M1, M2, . . . , Mn communicating directly with themselves or each other. Actually, the invention contemplates and included either this direct communication between machines M1, M2, . . . , Mn or DRTs 71/1, 71/2, . . . , 71/n or a combination of such communications. The inventive DRT 71 provides communication that is transport, protocol, and link independent.

It will be appreciated in light of the description provided herein that there are alternative implementations of the modifier 51 and the distributed run time 71. For example, the modifier 51 may be implemented as a component of or within the distributed run time 71, and therefore the DRT 71 may implement the functions and operations of the modifier 51. Alternatively, the function and operation of the modifier 51 may be implemented outside of the structure, software, firmware, or other means used to implement the DRT 71. In one embodiment, the modifier 51 and DRT 71 are implemented or written in a single piece of computer program code that provides the functions of the DRT and modifier. The modifier function and structure therefore maybe subsumed into the DRT and considered to be an optional component. Independent of how implemented, the modifier function and structure is responsible for modifying the executable code of the application code program, and the distributed run time function and structure is responsible for implementing communications between and among the computers or machines. The communications functionality in one embodiment is implemented via an intermediary protocol layer within the computer program code of the DRT on each machine. The DRT may for example implement a communications stack in the JAVA language and use the Transmission Control Protocol/Internet Protocol (TCP/IP) to provide for communications or talking between the machines. Exactly how these functions or operations are implemented or divided between structural and/or procedural elements, or between computer program code or data structures within the invention are less important than that they are provided.

However, in the arrangement illustrated in FIG. 8, (and also in FIGS. 31-32), a plurality of individual computers or machines M1, M2, . . . , Mn are provided, each of which are interconnected via a communications network 53 or other communications link and each of which individual computers or machines provided with a modifier 51 (See in FIG. 5) and realised by or in for example the distributed run time (DRT) 71 (See FIG. 8) and loaded with a common application code 50. The term common application program is to be understood to mean an application program or application program code written to operate on a single machine, and loaded and/or executed in whole or in part on each one of the plurality of computers or machines M1, M2 . . . Mn, or optionally on each one of some subset of the plurality of computers or machines M1,M2 . . . Mn. Put somewhat differently, there is a common application program represented in application code 50, and this single copy or perhaps a plurality of identical copies are modified to generate a modified copy or version of the application program or program code, each copy or instance prepared for execution on the plurality of machines. At the point after they are modified they are common in the sense that they perform similar operations and operate consistently and coherently with each other. It will be appreciated that a plurality of computers, machines, information appliances, or the like implementing the features of the invention may optionally be connected to or coupled with other computers, machines, information appliances, or the like that do not implement the features of the invention.

Essentially in at least one embodiment the modifier 51 or DRT 71 or other code modifying means is responsible for modifying the application code 50 so that it may execute memory manipulation operations, such as memory putstatic and putfield instructions in the JAVA language and virtual machine environment, in a coordinated, consistent, and coherent manner across and between the plurality of individual machines M1 . . . Mn. It follows therefore that in such a computing environment it is necessary to ensure that each of memory location is manipulated in a consistent fashion (with respect to the others).

In some embodiments, some or all of the plurality of individual computers or machines may be contained within a single housing or chassis (such as so-called "blade servers" manufactured by Hewlett-Packard Development Company, Intel Corporation, IBM Corporation and others) or implemented on a single printed circuit board or even within a single chip or chip set.

A machine (produced by any one of various manufacturers and having an operating system operating in any one of various different languages) can operate in the particular language of the application program code 50, in this instance the JAVA language. That is, a JAVA virtual machine 72 is able to operate application code 50 in the JAVA language, and utilize the JAVA architecture irrespective of the machine manufacturer and the internal details of the machine.

When implemented in a non-JAVA language or application code environment, the generalized platform, and/or virtual machine and/or machine and/or runtime system is able to operate application code 50 in the language(s) (possibly including for example, but not limited to any one or more of source-code languages, intermediate-code languages, object-code languages, machine-code languages, and any other code languages) of that platform, and/or virtual machine and/or machine and/or runtime system environment, and utilize the platform, and/or virtual machine and/or machine and/or runtime system and/or language architecture irrespective of the machine manufacturer and the internal details of the machine. It will also be appreciated in light of the description provided herein that platform and/or runtime system may include virtual machine and non-virtual machine software and/or firmware architectures, as well as hardware and direct hardware coded applications and implementations.

For a more general set of virtual machine or abstract machine environments, and for current and future computers and/or computing machines and/or information appliances or processing systems, and that may not utilize or require utilization of either classes and/or objects, the inventive structure, method, and computer program and computer program product are still applicable. Examples of computers and/or computing machines that do not utilize either classes and/or objects include for example, the x86 computer architecture manufactured by Intel Corporation and others, the SPARC computer architecture manufactured by Sun Microsystems, Inc and others, the PowerPC computer architecture manufactured by International Business Machines Corporation and others, and the personal computer products made by Apple Computer, Inc., and others. For these types of computers, computing machines, information appliances, and the virtual machine or virtual computing environments implemented thereon that do not utilize the idea of classes or objects, may be generalized for example to include primitive data types (such as integer data types, floating point data types, long data types, double data types, string data types, character data types and Boolean data types), structured data types (such as arrays and records) derived types, or other code or data structures of procedural languages or other languages and environments such as functions, pointers, components, modules, structures, references and unions.

Figure 9:
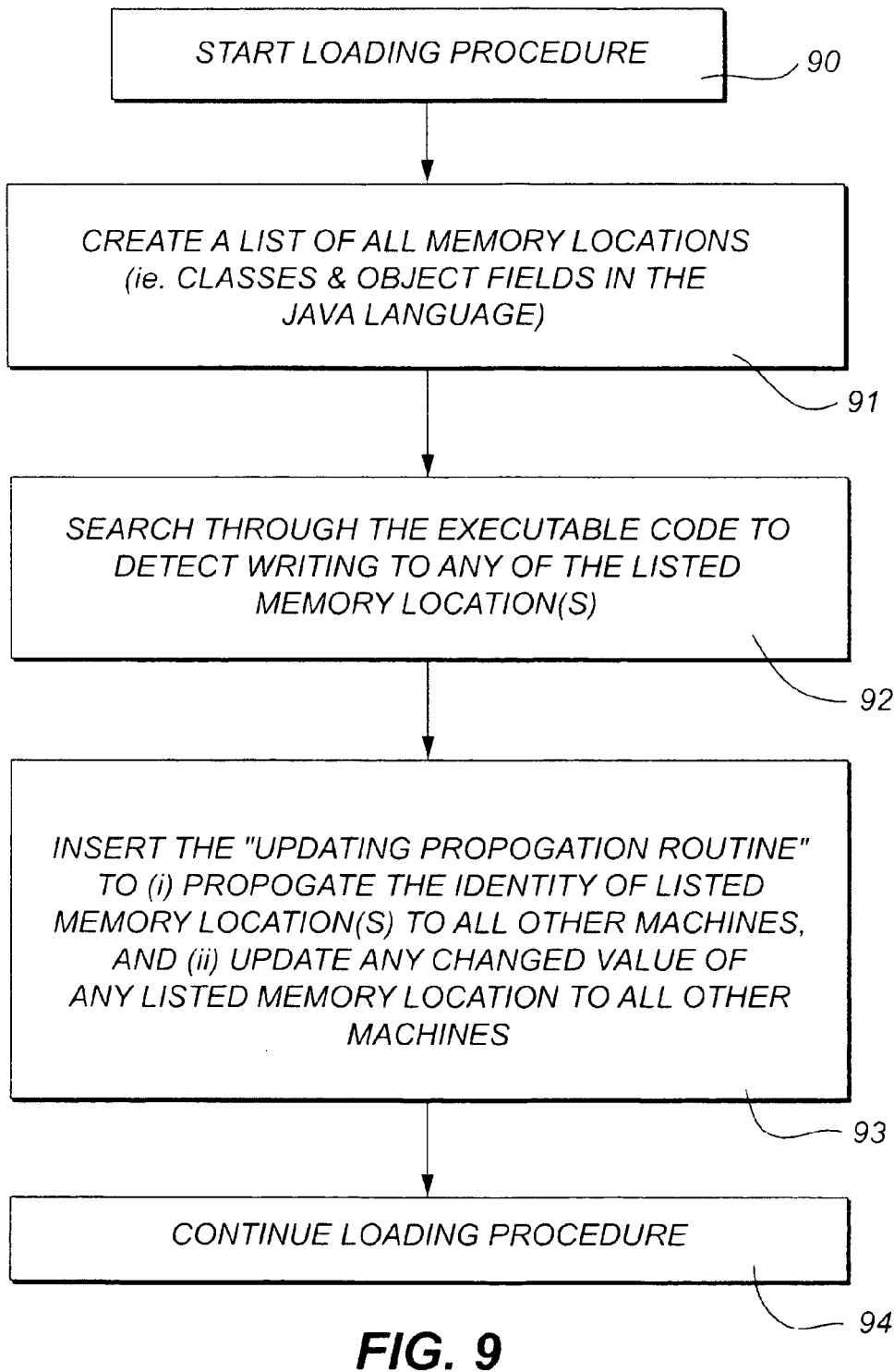
FIG. 9 is a flow chart of the procedure followed during loading of the same application on each machine in the network.

Turning now to FIGS. 7 and 9, during the loading procedure 75, the application code 50 being loaded onto or into each JAVA virtual machine 72 is modified by DRT 71. This modification commences at Step 90 in FIG. 9 and involves the initial step 91 of preferably scrutinizing or analysing the code and detecting all memory locations addressable by the application code 50, or optionally some subset of all memory locations addressable by the application code 50; such as for example named and unnamed memory locations, variables (such as local variables, global variables, and formal arguments to subroutines or functions), fields, registers, or any other address space or range of addresses which application code 50 may access. Such memory locations in some instances need to be identified for subsequent processing at steps 92 and 93. In some embodiments, where a list of detected memory locations is required for further processing, the DRT 71 during the loading procedure 75 creates a list of all the memory locations thus identified. In one embodiment, the memory locations in the form of JAVA fields are listed by object and class, however, the memory locations, fields, or the like may be listed or organized in any manner so long as they comport with the architectural and programming requirements of the system on which the program is to be used and the principles of the invention described herein. This detection is optional and not required in all embodiments of the invention. It may be noted that the DRT is at least in part fulfilling the roll of the modifier 51.

The next phase (designated Step 92 in FIG. 9) [Step 92] of the modification procedure is to search through the application code 50 in order to locate processing activity or activities that manipulate or change values or contents of any listed memory location (for example, but not limited to JAVA fields) corresponding to the list generated at step 91 when required. Preferably, all processing activities that manipulate or change any one or more values or contents of any one or more listed memory locations, are located.

When such a processing activity or operation (typically "putstatic" or "putfield" in the JAVA language, or for example, a memory assignment operation, or a memory write operation, or a memory manipulation operation, or more generally operations that otherwise manipulate or change value(s) or content(s) of memory or other addressable areas), is detected which changes the value or content of a listed or detected memory location, then an "updating propagation routine" is inserted by step 93 in the application code 50 corresponding to the detected memory manipulation operation, to communicate with all other machines in order to notify all other machines of the identity of the manipulated memory location, and the updated, manipulated or changed value(s) or content(s) of the manipulated memory location. The inserted "updating propagation routine" preferably takes the form of a method, function, procedure, or similar subroutine call or operation to a network communications library of DRT 71. Alternatively, the "updating propagation routine" may take the optional form of a code-block (or other inline code form) inserted into the application code instruction stream at, after, before, or otherwise corresponding to the detected manipulation instruction or operation. And preferably, in a multi-tasking or parallel processing machine environment (and in some embodiments inclusive or exclusive of operating system), such as a machine environment capable of potentially simultaneous or concurrent execution of multiple or different threads or processes, the "updating propagation routine" may execute on the same thread or process or processor as the detected memory manipulation operation of step 92. Thereafter, the loading procedure continues, by loading the modified application code 50 on the machine 72 in place of the unmodified application code 50, as indicated by step 94 in FIG. 9.

Figure 10:
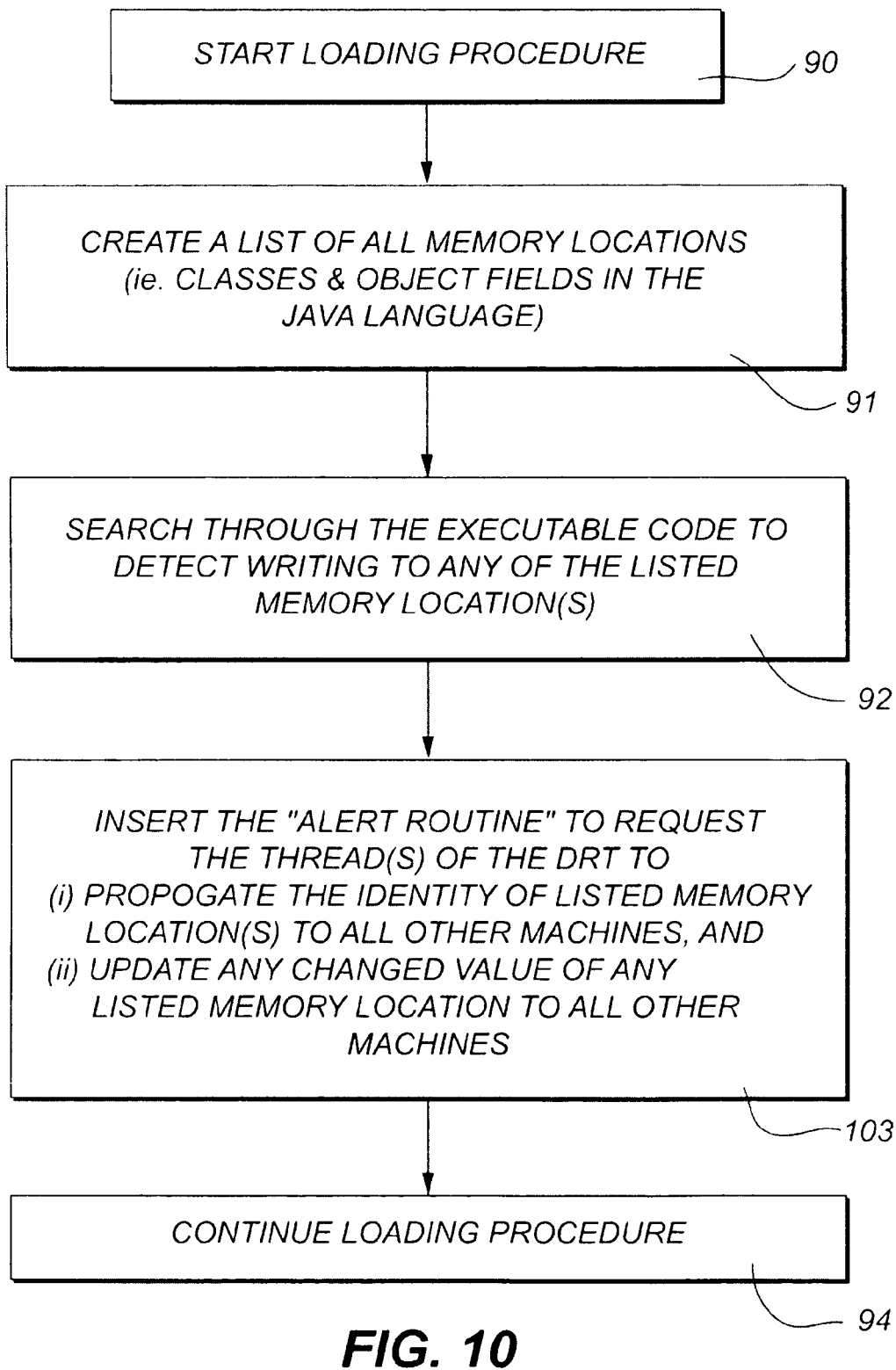
FIG. 10 is a flow chart showing a modified procedure similar to that of FIG. 9.

An alternative form of modification during loading is illustrated in the illustration of FIG. 10. Here the start and listing steps 90 and 91 and the searching step 92 are the same as in FIG. 9. However, rather than insert the "updating propagation routine" into the application code 50 corresponding to the detected memory manipulation operation identified in step 92, as is indicated in step 93, in which the application code 50, or network communications library code 71 of the DRT executing on the same thread or process or processor as the detected memory manipulation operation, carries out the updating, instead an "alert routine" is inserted corresponding to the detected memory manipulation operation, at step 103. The "alert routine" instructs, notifies or otherwise requests a different and potentially simultaneously or concurrently executing thread or process or processor not used to perform the memory manipulation operation (that is, a different thread or process or processor than the thread or process or processor which manipulated the memory location), such as a different thread or process allocated to the DRT 71, to carry out the notification, propagation, or communication of all other machines of the identity of the manipulated memory location, and the updated, manipulated or changed value(s) or content(s) of the manipulated memory location.

Figure 11:
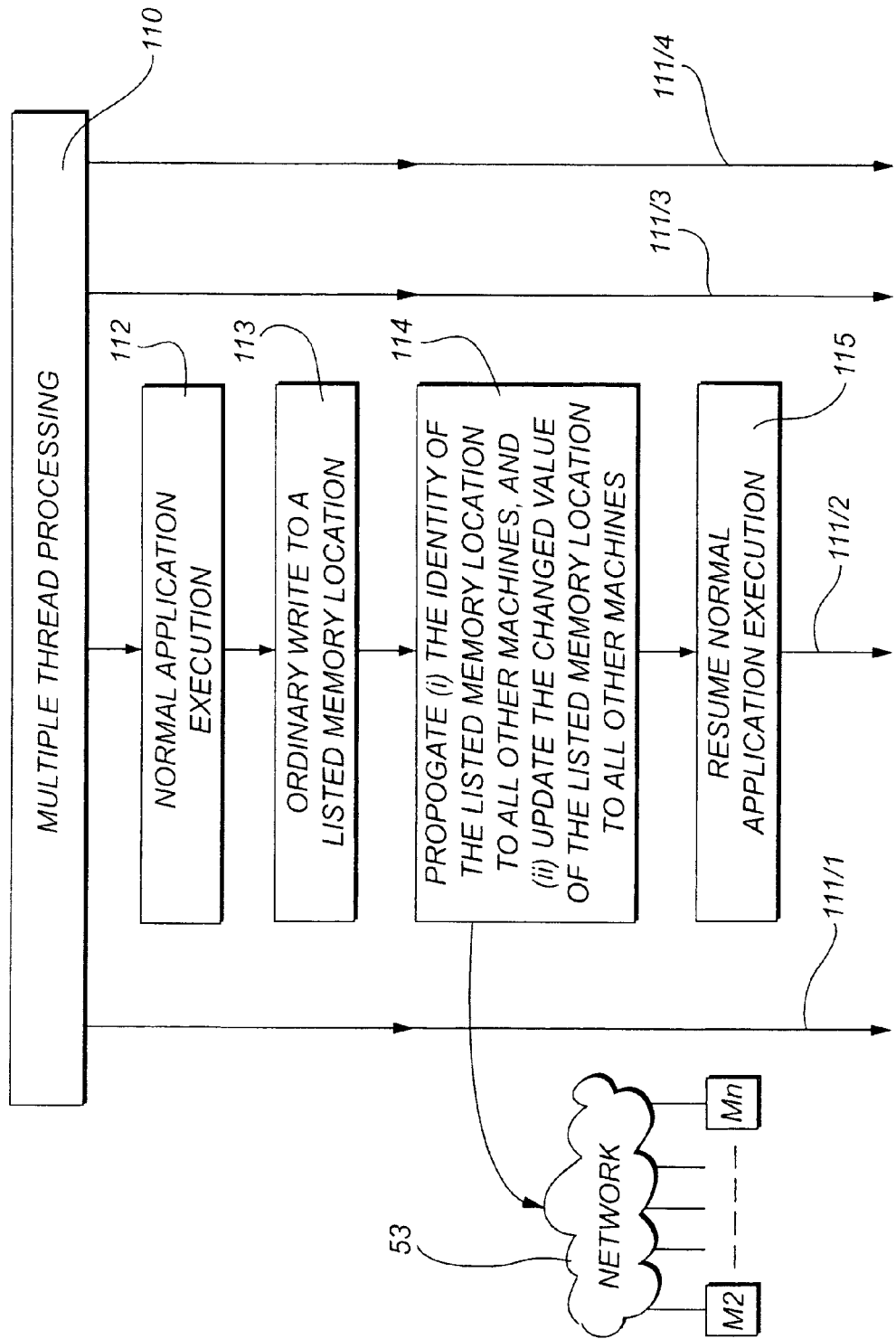
FIG. 11 is a schematic representation of multiple thread processing carried out on the machines of FIG. 8 utilizing a first embodiment of memory updating.
Figure 12:
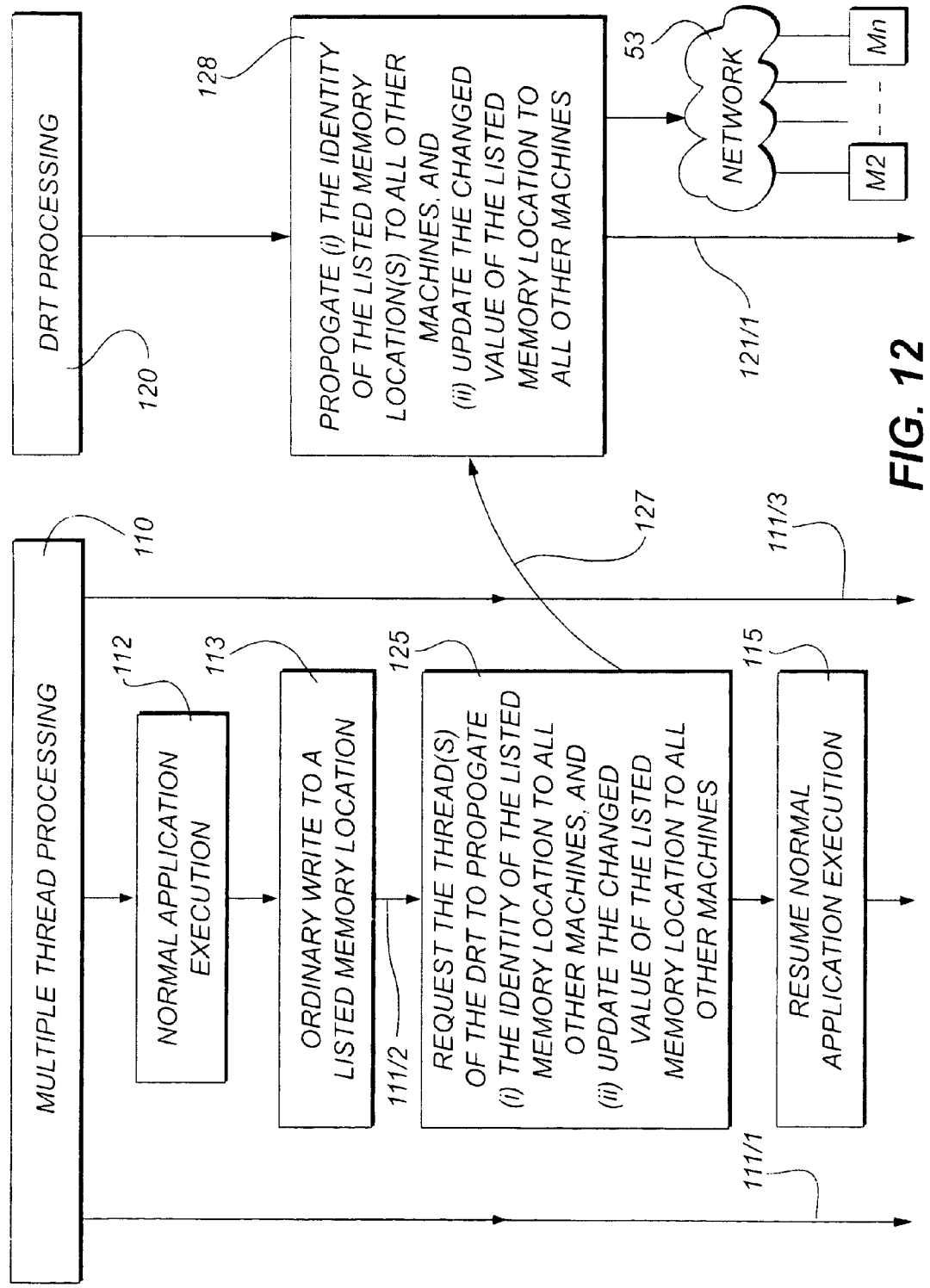
FIG. 12 is a schematic representation similar to FIG. 11 but illustrating an alternative embodiment.

Once this modification during the loading procedure has taken place and execution begins of the modified application code 50, then either the steps of FIG. 11 or FIG. 12 take place. FIG. 11 (and the steps 112, 113, 114, and 115 therein) correspond to the execution and operation of the modified application code 50 when modified in accordance with the procedures set forth in and described relative to FIG. 9. FIG. 12 on the other hand (and the steps 112, 113, 125, 127, and 115 therein) set forth therein correspond to the execution and operation of the modified application code 50 when modified in accordance with FIG. 10.

This analysis or scrutiny of the application code 50 can may take place either prior to loading the application program code 50, or during the application program code 50 loading procedure, or even after the application program code 50 loading procedure. It may be likened to an instrumentation, program transformation, translation, or compilation procedure in that the application code may be instrumented with additional instructions, and/or otherwise modified by meaning-preserving program manipulations, and/or optionally translated from an input code language to a different code language (such as for example from source-code language or intermediate-code language to object-code language or machine-code language), and with the understanding that the term compilation normally or conventionally involves a change in code or language, for example, from source code to object code or from one language to another language. However, in the present instance the term "compilation" (and its grammatical equivalents) is not so restricted and can also include or embrace modifications within the same code or language. For example, the compilation and its equivalents are understood to encompass both ordinary compilation (such as for example by way of illustration but not limitation, from source-code to object-code), and compilation from source-code to source-code, as well as compilation from object-code to object-code, and any altered combinations therein. It is also inclusive of so-called "intermediary-code languages" which are a form of "pseudo object-code".

By way of illustration and not limitation, in one embodiment, the analysis or scrutiny of the application code 50 may take place during the loading of the application program code such as by the operating system reading the application code from the hard disk or other storage device or source and copying it into memory and preparing to begin execution of the application program code. In another embodiment, in a JAVA virtual machine, the analysis or scrutiny may take place during the class loading procedure of the java.lang.ClassLoader loadClass method (e.g., "java.lang.ClassLoader.loadClass( )").

Alternatively, the analysis or scrutiny of the application code 50 may take place even after the application program code loading procedure, such as after the operating system has loaded the application code into memory, or optionally even after execution of the relevant corresponding portion of the application program code has started, such as for example after the JAVA virtual machine has loaded the application code into the virtual machine via the "java.lang.ClassLoader.loadClass( )" method and optionally commenced execution.

As seen in FIG. 11, a multiple thread processing machine environment 110, on each one of the machines M1, ..., Mn and consisting of threads 111/1 ... 111/4 exists. The processing and execution of the second thread 111/2 (in this example) results in that thread 111/2 manipulating a memory location at step 113, by writing to a listed memory location. In accordance with the modifications made to the application code 50 in the steps 90-94 of FIG. 9, the application code 50 is modified at a point corresponding to the write to the memory location of step 113, so that it propagates, notifies, or communicates the identity and changed value of the manipulated memory location of step 113 to the other machines M2, . . . , Mn via network 53 or other communication link or path, as indicated at step 114. At this stage the processing of the application code 50 of that thread 111/2 is or may be altered and in some instances interrupted at step 114 by the executing of the inserted "updating propagation routine", and the same thread 111/2 notifies, or propagates, or communicates to all other machines M2, . . . , Mn via the network 53 or other communications link or path of the identity and changed value of the manipulated memory location of step 113. At the end of that notification, or propagation, or communication procedure 114, the thread 111/2 then resumes or continues the processing or the execution of the modified application code 50 at step 115.

In the alternative arrangement illustrated in FIG. 12, a multiple thread processing machine environment 110 comprising or consisting of threads 111/1, . . . , 111/3, and a simultaneously or concurrently executing DRT processing environment 120 consisting of the thread 121/1 as illustrated, or optionally a plurality of threads, is executing on each one of the machines M1, . . . Mn. The processing and execution of the modified application code 50 on thread 111/2 results in a memory manipulation operation of step 113, which in this instance is a write to a listed memory location. In accordance with the modifications made to the application code 50 in the steps 90, 91, 92, 103, and 94 of FIG. 9, the application code 50 is modified at a point corresponding to the write to the memory location of step 113, so that it requests or otherwise notifies the threads of the DRT processing environment 120 to notify, or propagate, or communicate to the other machines M2, . . . , Mn of the identity and changed value of the manipulated memory location of step 113, as indicated at steps 125 and 128 and arrow 127. In accordance with this modification, the thread 111/2 processing and executing the modified application code 50 requests a different and potentially simultaneously or concurrently executing thread or process (such as thread 121/1) of the DRT processing environment 120 to notify the machines M2, . . . , Mn via network 53 or other communications link or path of the identity and changed value of the manipulated memory location of step 113, as indicated in step 125 and arrow 127. In response to this request of step 125 and arrow 127, a different and potentially simultaneously or concurrently executing thread or process 121/1 of the DRT processing environment 120 notifies the machines M2, . . . , Mn via network 53 or other communications link or path of the identity and changed value of the manipulated memory location of step 113, as requested of it by the modified application code 50 executing on thread 111/2 of step 125 and arrow 127.

Figure 2:
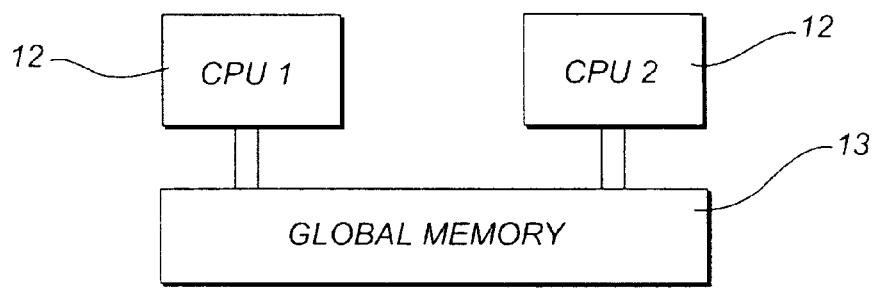
FIG. 2 is a schematic illustration showing the internal architecture of known symmetric multiple processors.

When compared to the earlier described step 114 of thread 111/2 of FIG. 11, step 125 of thread 111/2 of FIG. 12 can be carried out quickly, because step 114 of thread 111/2 must notify and communicate with machines M2, . . . , Mn via the relatively slow network 53 (relatively slow for example when compared to the internal memory bus 4 of FIG. 1 or the global memory 13 of FIG. 2) of the identity and changed value of the manipulated memory location of step 113, whereas step 125 of thread 111/2 does not communicate with machines M2, . . . , Mn via the relatively slow network 53. Instead, step 125 of thread 111/2 requests or otherwise notifies a different and potentially simultaneously or concurrently executing thread 121/1 of the DRT processing environment 120 to perform the notification and communication with machines M2, Mn via the relatively slow network 53 of the identify and changed value of the manipulated memory location of step 113, as indicated by arrow 127. Thus thread 111/2 carrying out step 125 is only interrupted momentarily before the thread 111/2 resumes or continues processing or execution of modified application code in step 115. The other thread 121/1 of the DRT processing environment 120 then communicates the identity and changed value of the manipulated memory location of step 113 to machines M2, . . . , Mn via the relatively slow network 53 or other relatively slow communications link or path.

This second arrangement of FIG. 12 makes better utilisation of the processing power of the various threads 111/1 . . . 111/3 and 121/1 (which are not, in general, subject to equal demands). Irrespective of which arrangement is used, the identity and change value of the manipulated memory location(s) of step 113 is (are) propagated to all the other machines M2 . . . Mn on the network 53 or other communications link or path.

Figure 13:
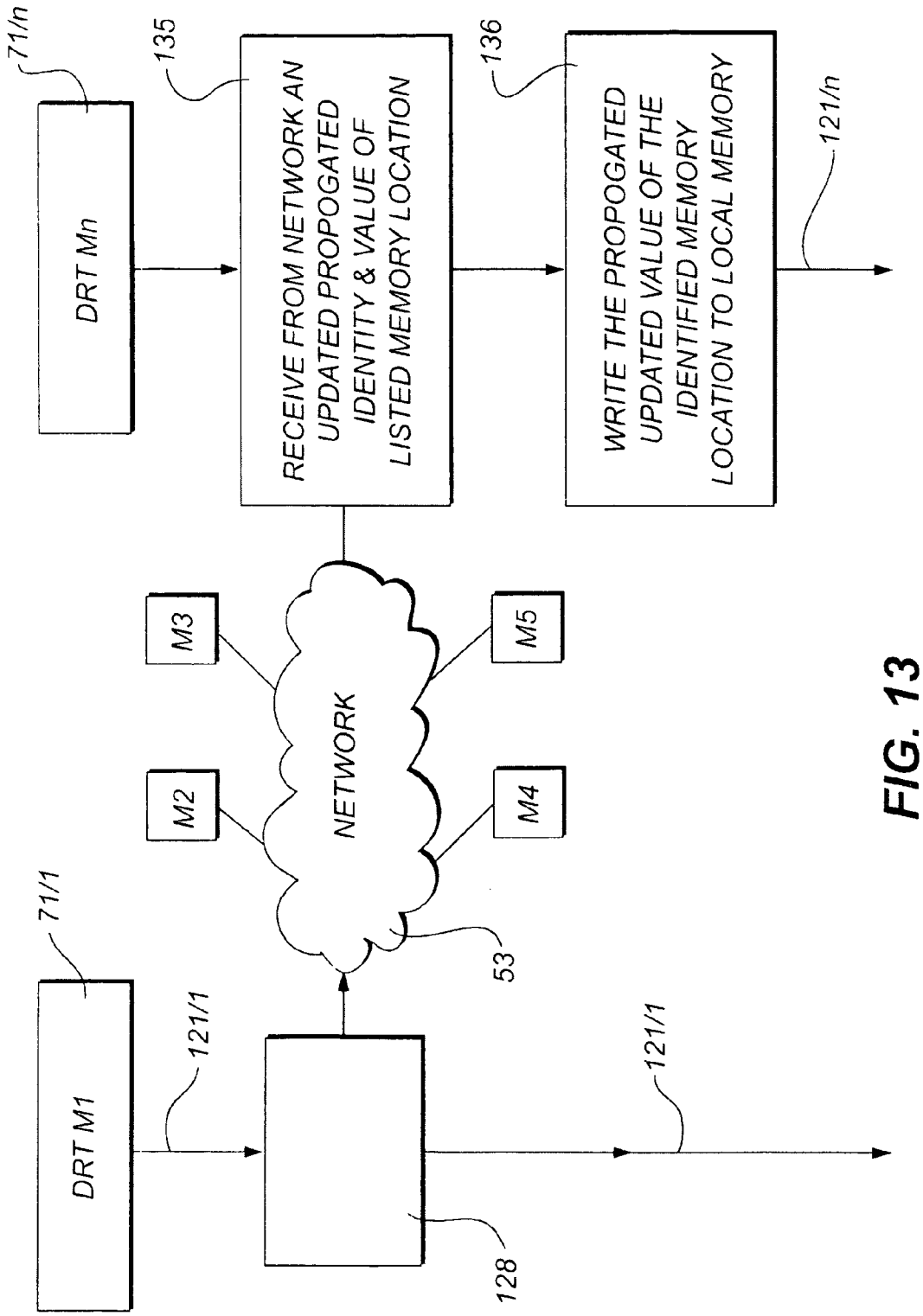
FIG. 13 illustrates multi-thread memory updating for the computers of FIG. 8.

This is illustrated in FIG. 13 where step 114 of FIG. 11, or the DRT 71/1 (corresponding to the DRT processing environment 120 of FIG. 12) and its thread 121/1 of FIG. 12 (represented by step 128 in FIG. 13), send, via the network 53 or other communications link or path, the identity and changed value of the manipulated memory location of step 113 of FIGS. 11 and 12, to each of the other machines M2, . . . , Mn.

With reference to FIG. 13, each of the other machines M2, . . . , Mn carries out the action of receiving from the network 53 the identity and changed value of, for example, the manipulated memory location of step 113 from machine M1, indicated by step 135, and writes the value received at step 135 to the local memory location corresponding to the identified memory location received at step 135, indicated by step 136.

Figure 3:
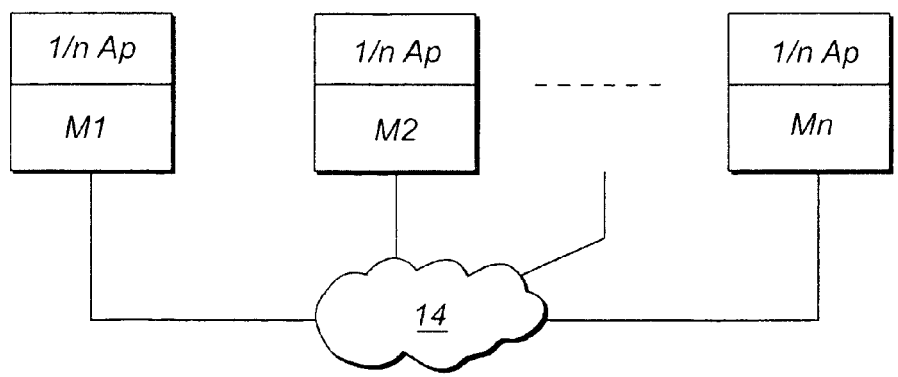
FIG. 3 is a schematic representation of prior art distributed computing.
Figure 4:
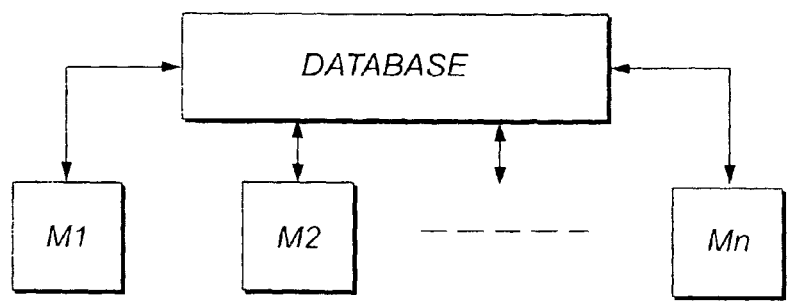
FIG. 4 is a schematic representation of a prior art network computing using clusters.

In the conventional arrangement in FIG. 3 utilising distributed software, memory access from one machine's software to memory physically located on another machine is permitted by the network interconnecting the machines. However, because the read and/or write memory access to memory physically located on another computer require the use of the slow network 14, in these configurations such memory accesses can result in substantial delays in memory read/write processing operation, potentially of the order of $10^6$-$10^7$ cycles of the central processing unit of the machine, but ultimately being dependant upon numerous factors, such as for example, the speed, bandwidth, and/or latency of the network 14. This in large part accounts for the diminished performance of the multiple interconnected machines in the prior art arrangement of FIG. 3.

However, in the present arrangement as described above in connection with FIG. 8, it will be appreciated that all reading of memory locations or data is satisfied locally because a current value of all (or some subset of all) memory locations is stored on the machine carrying out the processing which generates the demand to read memory.

Similarly, in the present arrangement as described above in connection with FIG. 8, it will be appreciated that all writing of memory locations or data may be satisfied locally because a current value of all (or some subset of all) memory locations is stored on the machine carrying out the processing which generates the demand to write to memory.

Such local memory read and write processing operation as performed according to the invention can typically be satisfied within $10^2$-$10^3$ cycles of the central processing unit. Thus, in practice, there is substantially less waiting for memory accesses which involves reads than the arrangement shown and described relative to FIG. 3. Additionally, in practice, there may be less waiting for memory accesses which involve writes than the arrangement shown and described relative to FIG. 3

It may be appreciated that most application software reads memory frequently but writes to memory relatively infrequently. As a consequence, the rate at which memory is being written or re-written is relatively slow compared to the rate at which memory is being read. Because of this slow demand for writing or re-writing of memory, the memory locations or fields can be continually updated at a relatively low speed via the possibly relatively slow and inexpensive commodity network 53, yet this possibly relatively slow speed is sufficient to meet the application program's demand for writing to memory. The result is that the performance of the FIG. 8 arrangement is superior to that of FIG. 3. It may be appreciated in light of the description provided herein that while a relatively slow network communication link or path 53 may advantageously be used because it provides the desired performance and low cost, the invention is not limited to a relatively low speed network connection and may be used with any communication link or path. The invention is transport, network, and communications path independent, and does not depend on how the communication between machines or DRTs takes place. In one embodiment, even electronic mail (email) exchanges between machines or DRTs may suffice for the communications.

In a further optional modification in relation to the above, the identity and changed value pair of a manipulated memory location sent over network 53, each pair typically sent as the sole contents of a single packet, frame or cell for example, can be grouped into batches of multiple pairs of identities and changed values corresponding to multiple manipulated memory locations, and sent together over network 53 or other communications link or path in a single packet, frame, or cell. This further modification further reduces the demands on the communication speed of the network 53 or other communications link or path interconnecting the various machines, as each packet, cell or frame may contain multiple identity and changed value pairs, and therefore fewer packets, frames, or cells require to be sent.

It may be apparent that in an environment where the application program code writes repeatedly to a single memory location, the embodiment illustrated of FIG. 11 of step 114 sends an updating and propagation message to all machines corresponding to every performed memory manipulation operation. In a still further optimal modification in relation to the above, the DRT thread 121/1 of FIG. 12 does not need to perform an updating and propagation operation corresponding to every local memory manipulation operation, but instead may send fewer updating and propagation messages than memory manipulation operations, each message containing the last or latest changed value or content of the manipulated memory location, or optionally may only send a single updating and propagation message corresponding to the last memory manipulation operation. This further improvement reduces the demands on the network 53 or other communications link or path, as fewer packets, frames, or cells require to be sent.

It will also be apparent to those skilled in the art in light of the detailed description provided herein that in a table or list or other data structure created by each DRT 71 when initially recording or creating the list of all, or some subset of all, memory-locations (or fields), for each such recorded memory location on each machine M1, . . . , Mn there is a name or identity which is common or similar on each of the machines M1, . . . , Mn. However, in the individual machines the local memory location corresponding to a given name or identity (listed for example, during step 91 of FIG. 9) will or may vary over time since each machine may and generally will store changed memory values or contents at different memory locations according to its own internal processes. Thus the table, or list, or other data structure in each of the DRTs will have, in general, different local memory locations corresponding to a single memory name or identity, but each global "memory name" or identity will have the same "memory value" stored in the different local memory locations.

It will also be apparent to those skilled in the art in light of the description provided herein that the abovementioned modification of the application program code 50 during loading can be accomplished in many ways or by a variety of means. These ways or means include, but are not limited to at least the following five ways and variations or combinations of these five, including by:

(i) re-compilation at loading,
(ii) by a pre-compilation procedure prior to loading,
(iii) compilation prior to loading,
(iv) a "just-in-time" compilation, or
(v) re-compilation after loading (but, or for example, before execution of the relevant or corresponding application code in a distributed environment).

Traditionally the term "compilation" implies a change in code or language, for example, from source to object code or one language to another. Clearly the use of the term "compilation" (and its grammatical equivalents) in the present specification is not so restricted and can also include or embrace modifications within the same code or language Given the fundamental concept of modifying memory manipulation operations to coordinate operation between and amongst a plurality of machines M1 . . . Mn, there are several different ways or embodiments in which this coordinated, coherent and consistent memory state and manipulation operation concept, method, and procedure may be carried out or implemented.

In the first embodiment, a particular machine, say machine M2, loads the asset (such as class or object) inclusive of memory manipulation operation(s), modifies it, and then loads each of the other machines M1, M3, . . . , Mn (either sequentially or simultaneously or according to any other order, routine or procedure) with the modified object (or class or other asset or resource) inclusive of the new modified memory manipulation operation. Note that there may be one or a plurality of memory manipulation operations corresponding to only one object in the application code, or there may be a plurality of memory manipulation operations corresponding to a plurality of objects in the application code. Note that in one embodiment, the memory manipulation operation(s) that is (are) loaded is binary executable object code. Alternatively, the memory manipulation operation(s) that is (are) loaded is executable intermediary code.

Figure 15:
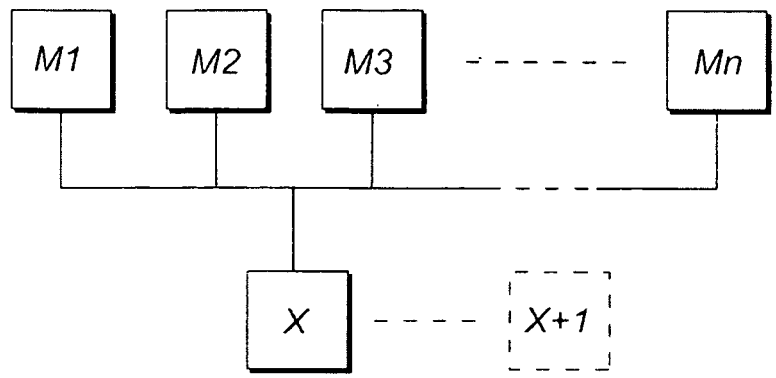
FIG. 15 is a schematic representation of n machines running the application program and serviced by an additional server machine X.

In this arrangement, which may be termed "master/slave" each of the slave (or secondary) machines M1, M3, . . . , Mn loads the modified object (or class), and inclusive of the new modified memory manipulation operation(s), that was sent to it over the computer communications network or other communications link or path by the master (or primary) machine, such as machine M2, or some other machine such as a machine X of FIG. 15. In a slight variation of this "master/slave" or "primary/secondary" arrangement, the computer communications network can be replaced by a shared storage device such as a shared file system, or a shared document/file repository such as a shared database.

Note that the modification performed on each machine or computer need not and frequently will not be the same or identical. What is required is that they are modified in a similar enough way that in accordance with the inventive principles described herein, each of the plurality of machines behaves consistently and coherently relative to the other machines to accomplish the operations and objectives described herein. Furthermore, it will be appreciated in light of the description provided herein that there are a myriad of ways to implement the modifications that may for example depend on the particular hardware, architecture, operating system, application program code, or the like or different factors. It will also be appreciated that embodiments of the invention may be implemented within an operating system, outside of or without the benefit of any operating system, inside the virtual machine, in an EPROM, in software, in firmware, or in any combination of these.

In a still further embodiment, each machine M1, . . . , Mn receives the unmodified asset (such as class or object) inclusive of one or more memory manipulation operation(s), but modifies the operations and then loads the asset (such as class or object) consisting of the now modified operations. Although one machine, such as the master or primary machine may customize or perform a different modification to the memory manipulation operation(s) sent to each machine, this embodiment more readily enables the modification carried out by each machine to be slightly different and to be enhanced, customized, and/or optimized based upon its particular machine architecture, hardware, processor, memory, configuration, operating system, or other factors, yet still similar, coherent and consistent with other machines with all other similar modifications and characteristics that may not need to be similar or identical.

In all of the described instances or embodiments, the supply or the communication of the asset code (such as class code or object code) to the machines M1, . . . , Mn, and optionally inclusive of a machine X of FIG. 15, can be branched, distributed or communicated among and between the different machines in any combination or permutation; such as by providing direct machine to machine communication (for example, M2 supplies each of M1, M3, M4, etc. directly), or by providing or using cascaded or sequential communication (for example, M2 supplies M1 which then supplies M3 which then supplies M4, and so on), or a combination of the direct and cascaded and/or sequential.

Reference is made to the accompanying Annexure A in which: Annexure A5 is a typical code fragment from a memory manipulation operation prior to modification (e.g., an exemplary unmodified routine with a memory manipulation operation), and Annexure A6 is the same routine with a memory manipulation operation after modification (e.g., an exemplary modified routine with a memory manipulation operation). These code fragments are exemplary only and identify one software code means for performing the modification in an exemplary language. It will be appreciated that other software/firmware or computer program code may be used to accomplish the same or analogous function or operation without departing from the invention.

Annexures A5 and A6 (also reproduced in part in Table VI and Table VII below) are exemplary code listings that set forth the conventional or unmodified computer program software code (such as may be used in a single machine or computer environment) of a routine with a memory manipulation operation of application program code 50 and a post-modification excerpt of the same routine such as may be used in embodiments of the present invention having multiple machines. The modified code that is added to the routine is highlighted in bold text.

TABLE I

Summary Listing of Contents of Annexure A
Annexure A includes exemplary program listings in the JAVA language to further illustrate features, aspects, methods, and procedures of described in the detailed description

| | |
|---|---|
| A1. | This first excerpt is part of an illustration of the modification code of the modifier 51 in accordance with steps 92 and 103 of FIG. 10. It searches through the code array of the application program code 50, and when it detects a memory manipulation instruction (i.e. a putstatic instruction (opcode 178) in the JAVA language and virtual machine environment) it modifies the application program code by the insertion of an "alert" routine. |
| A2. | This second excerpt is part of the DRT.alert( ) method and implements the step of 125 and arrow of 127 of FIG. 12. This DRT.alert( ) method requests one or more threads of the DRT processing environment of FIG. 12 to update and propagate the value and identity of the changed memory location corresponding to the operation of Annexure A1. |
| A3. | This third excerpt is part of the DRT 71, and corresponds to step 128 of FIG. 12. This code fragment shows the DRT in a separate thread, such as thread 121/1 of FIG. 12, after being notified or requested by step 125 and array 127, and sending the changed value and changed value location/identity across the network 53 to the other of the plurality of machines M1...Mn. |
| A4. | The fourth excerpt is part of the DRT 71, and corresponds to steps 135 and 136 of FIG. 13.This is a fragment of code to receive a propagated identity and value pair sent by another DRT 71 over the network, and write the changed value to the identified memory location. |
| A5. | The fifth excerpt is an disassembled compiled form of the example.java application of Annexure A7, which performs a memory manipulation operation (putstatic and putfield). |
| A6. | The sixth excerpt is the disassembled compiled form of the same example application in Annexure A5 after modification has been performed by FieldLoader.java of Annexure A11, in accordance with FIG. 9 of this invention. The modifications are highlighted in bold. |
| A7. | The seventh excerpt is the source-code of the example.java application used in excerpt A5 and A6.This example application has two memory locations (staticValue and instanceValue) and performs two memory manipulation operations. |
| A8. | The eighth excerpt is the source-code of FieldAlert.java which corresponds to step 125 and arrow 127 of FIG. 12, and which requests a thread 121/1 executing FieldSend.java of the "distributed run-time" 71 to propagate a changed value and identity pair to the other machines M1...Mn. |

TABLE I-continued

Summary Listing of Contents of Annexure A
Annexure A includes exemplary program listings in the JAVA language to further
illustrate features, aspects, methods, and procedures of described in the detailed description

| | |
|---|---|
| A9. | The ninth excerpt is the source-code of FieldSend.java which corresponds to step 128 of FIG. 12, and waits for a request/notification generated by FieldAlert.java of A8 corresponding to step 125 and arrow 127, and which propagates a changed value/identity pair requested of it by FieldAlert.java, via network 53. |
| A10. | The tenth excerpt is the source-code of FieldReceive.java, which corresponds to steps 135 and 136 of FIG. 13, and which receives a propagated changed value and identity pair sent to it over the network 53 via FieldSend.java of annexure A9. |
| A11. | FieldLoader.java. This excerpt is the source-code of FieldLoader.java, which modifies an application program code, such as the example.java application code of Annexure A7, as it is being loaded into a JAVA virtual machine in accordance with steps 90, 91, 92, 103, and 94 of FIG. 10. FieldLoader.java makes use of the convenience classes of Annexures A12 through to A36 during the modification of a compiled JAVA |
| A12. | Attribute_info.java<br>Convience class for representing attribute_info structures within ClassFiles. |
| A13. | ClassFile.java<br>Convience class for representing ClassFile structures. |
| A14. | Code_attribute.java<br>Convience class for representing Code_attribute structures within ClassFiles.<br>Annexure A includes exemplary program listings in the JAVA language to further illustrate features, aspects, methods, and procedures of described in the detailed description |
| A15. | CONSTANT_Class_info.java<br>Convience class for representing CONSTANT_Class_info structures within ClassFiles. |
| A16. | CONSTANT_Double_info.java<br>Convience class for representing CONSTANT_Double_info structures within ClassFiles. |
| A17. | CONSTANT_Fieldref_info.java<br>Convience class for representing CONSTANT_Fieldref_info structures within ClassFiles. |
| A18. | CONSTANT_Float_info.java<br>Convience class for representing CONSTANT_Float_info structures within Class Files. |
| A19. | CONSTANT_Integer_info.java<br>Convience class for representing CONSTANT_Integer_info structures within ClassFiles. |
| A20. | CONSTANT_InterfaceMethodref_info.java<br>Convience class for representing CONSTANT_InterfaceMethodref_info structures within ClassFiles. |
| A21. | CONSTANT_Long_info.java<br>Convience class for representing CONSTANT_Long_info structures within ClassFiles. |
| A22. | CONSTANT_Methodref_info.java<br>Convience class for representing CONSTANT_Methodref_info structures within ClassFiles. |
| A23. | CONSTANT_NameAndType_info.java<br>Convience class for representing CONSTANT_NameAndType_info structures within ClassFiles. |
| A24. | CONSTANT_String_info.java<br>Convience class for representing CONSTANT_String_info structures within ClassFiles. |
| A25. | CONSTANT_Utf8_info.java<br>Convience class for representing CONSTANT_Utf8_info structures within ClassFiles. |
| A26. | ConstantValue_attribute.java<br>Convience class for representing ConstantValue_attribute structures within ClassFiles. |
| A27. | cp_info.java<br>Convience class for representing cp_info structures within ClassFiles. |
| A28. | Deprecated_attribute.java<br>Convience class for representing Deprecated_attribute structures within ClassFiles. |
| A29. | Exceptions_attribute.java<br>Convience class for representing Exceptions_attribute structures within Class Files. |
| A30. | field_info.java<br>Convience class for representing field_info structures within ClassFiles. |
| A31. | InnerClasses_attribute.java<br>Convience class for representing InnerClasses_attribute structures within ClassFiles. |
| A32. | LineNumberTable_attribute.java<br>Convience class for representing LineNumberTable_attribute structures within ClassFiles. |
| A33. | LocalVariableTable_attribute.java<br>Convience class for representing LocalVariableTable_attribute structures within ClassFiles. |
| A34. | method_info.java<br>Convience class for representing method_info structures within ClassFiles. |
| A35. | SourceFile_attribute.java<br>Convience class for representing SourceFile_attribute structures within ClassFiles. |
| A36. | Synthetic_attribute.java<br>Convience class for representing Synthetic_attribute structures within ClassFiles. |

TABLE II

Exemplary code listing showing embodiment of modified code.
A1. This first excerpt is part of an illustration of the modification code of the modifier 51 in accordance with steps 92 and 103 of FIG. 10. It searches through the code array of the application program code 50, and when it detects a memory manipulation instruction (i.e. a putstatic instruction (opcode 178) in the JAVA language and virtual machine environment) it modifies the application program code by the insertion of an "alert" routine.

```
// START
byte[ ] code = Code_attribute.code;    // Bytecode of a given method in a
                                       // given classfile.
int code_length = Code_attribute.code_length;
int DRT = 99;     // Location of the CONSTANT_Methodref_info for the
                  // DRT.alert( ) method.
for (int i=0; i<code_length; i++) {
    if ((code[i] & 0xff) == 179) {    // Putstatic instruction.
        System.arraycopy (code, i+3, code, i+6, code_length- (i+3));
        code [i+3] = (byte) 184;       // Invokestatic instruction for the
                                       // DRT.alert( ) method.
        code [i+4] = (byte)((DRT >>> 8) & 0xff);
        code [i+5] = (byte)(DRT & 0xff);
    }
}
// END
```

TABLE III

Exemplary code listing showing embodiment of code for alert method
A2. This second excerpt is part of the DRT.alert( ) method and implements the step of 125 and arrow of 127 of FIG. 12. This DRT.alert( ) method requests one or more threads of the DRT processing environment of FIG. 12 to update and propagate the value and identity of the changed memory location corresponding to the operation of Annexure A1.

```
// START
public static void alert( ){
    synchronized (ALERT_LOCK){
        ALERT_LOCK.notify( ); // Alerts a waiting DRT thread
        in the background.
    }
}
// END
```

TABLE IV

Exemplary code listing showing embodiment of code for DRT
A3. This third excerpt is part of the DRT 71, and corresponds to step 128 of FIG. 12. This code fragment shows the DRT in a separate thread, such as thread 121/1 of FIG. 12, after being notified or requested by step 125 and array 127, and sending the changed value and changed value location/identity across the network 53 to the other of the plurality of machines M1...Mn.

```
// START
MulticastSocket ms = DRT.getMulticastSocket( );   // The multicast
                                                  // socket used by
                                                  // the DRT for
                                                  // communication.
byte nameTag = 33;   // This is the "name tag" on the network for
                     // this field.
Field field =                                     // Stores
modifiedClass.getDeclaredField("myField1");       // the field
                                                  // from the
                                                  // modified
                                                  // class.
```

TABLE IV-continued

Exemplary code listing showing embodiment of code for DRT
A3. This third excerpt is part of the DRT 71, and corresponds to step 128 of FIG. 12. This code fragment shows the DRT in a separate thread, such as thread 121/1 of FIG. 12, after being notified or requested by step 125 and array 127, and sending the changed value and changed value location/identity across the network 53 to the other of the plurality of machines M1...Mn.

```
// In this example, the field is a byte field.
while (DRT.isRunning( )) {
    synchronized (ALERT_LOCK) {
        ALERT_LOCK.wait( );   // The DRT thread is waiting for the alert
                              // method to be called.
        byte [ ] b = new byte [ ]              // Stores
        {nameTag, field.getByte(null) };       // the
                                               // nameTag
                                               // and the
                                               // value
                                               // of the
                                               // field
                                               // from the
                                               // modified
                                               // class in
                                               // a buffer.
        DatagramPacket dp = new DatagramPacket (b, 0, b.length);
        ms.send(dp); // Send the buffer out across the network.
    }
}
// END
```

TABLE V

Exemplary code listing showing embodiment of code for DRT receiving.
A4. The fourth excerpt is part of the DRT 71, and corresponds to steps 135 and 136 of FIG. 13. This is a fragment of code to receive a propagated identity and value pair sent by another DRT 71 over the network, and write the changed value to the identified memory location.

```
// START
MulticastSocket ms =                      // The multicast socket
DRT.getMulticastSocket( );                // used by the DRT for
                                          // communication.
DatagramPacket dp = new DatagramPacket (new byte [2] , 0, 2);
byte nameTag = 33;                // This is the "name tag" on the network
                                  // for this field.
Field field =                             // Stores the
modifiedClass.getDeclaredField("myField1");  // field from
                                          // the modified
                                          // class.
// In this example,the field is a byte field.
while(DRT.isRunning) {
    ms.receive (dp);    // Receive the previously sent buffer from
                        the network.
    byte [ ] b = dp.getData ( );
    if (b [0] == nameTag) {          // Check the nametags match.
        field.setByte (null, b [1] );    // Write the value from the
                                         // network packet into
                                         the field location in memory.
    }
}
// END
```

TABLE VI

Exemplary code listing showing embodiment of application
before modification is made.
A5. The fifth excerpt is an disassembled compiled form
of the example.java application of Annexure A7, which performs a
memory manipulation operation (putstatic and putfield).

```
Method void setValues(int, int)
   0 iload_1
   1 putstatic #3 <Field int staticValue>
   4 aload_0
   5 iload_2
   6 putfield #2 <Field int instanceValue>
   9 return
```

TABLE VII

Exemplary code listing showing embodiment of application
after modification is made.
A6. The sixth excerpt is the disassembled compiled form of the same
example application in Annexure A5 after modification has been
performed by FieldLoader.java of Annexure A11, in accordance with FIG. 9
of this invention. The modifications are highlighted in bold.

```
Method void setValues(int, int)
   0 iload_1
   1 putstatic #3 <Field int staticValue>
   4 ldc #4 <String "example">
   6 iconst_0
   7 invokestatic #5 <Method void alert(java.lang.Object, int)>
  10 aload_0
  11 iload_2
  12 putfield #2 <Field int instanceValue>
  15 aload_0
  16 iconst_1
  17 invokestatic #5 <Method void alert(java.lang.Object, int)>
  20 return
```
(bold lines: `4 ldc #4 <String "example">`, `6 iconst_0`, `7 invokestatic #5 <Method void alert(java.lang.Object, int)>`, `15 aload_0`, `16 iconst_1`, `17 invokestatic #5 <Method void alert(java.lang.Object, int)>`)

TABLE VIII

Exemplary code listing showing embodiment of source-code
of the example application.
A7. The seventh excerpt is the source-code of the example.java
application used in excerpt A5 and A6. This example application
has two memory locations (staticValue and instanceValue)
and performs two memory manipulation operations.

```java
import java.lang.*;
public class example{
    /** Shared static field. */
    public static int staticValue = 0;
    /** Shared instance field. */
    public int instanceValue = 0;
    /** Example method that writes to memory (instance field). */
    public void setValues(int a, int b){
        staticValue = a;
        instanceValue = b;
    }
}
```

TABLE IX

Exemplary code listing showing embodiment of the
source-code of FieldAlert.
A8. The eighth excerpt is the source-code of FieldAlert.java
which corresponds to step 125 and arrow 127 of FIG. 12, and which
requests a thread 121/1 executing FieldSend.java of the
"distributed run-time" 71 to propagate a changed value
and identity pair to the other machines M1...Mn.

```java
import java.lang.*;
import java.util.*;
import java.net.*;
import java.io.*;
```

TABLE IX-continued

Exemplary code listing showing embodiment of the
source-code of FieldAlert.
A8. The eighth excerpt is the source-code of FieldAlert.java
which corresponds to step 125 and arrow 127 of FIG. 12, and which
requests a thread 121/1 executing FieldSend.java of the
"distributed run-time" 71 to propagate a changed value
and identity pair to the other machines M1...Mn.

```java
public class FieldAlert{
    /** Table of alerts. */
    public final static Hashtable alerts = new Hashtable( );
    /** Object handle. */
    public Object reference = null;
    /** Table of field alerts for this object.*/
    public boolean[ ] fieldAlerts = null;
    /** Constructor. */
    public FieldAlert(Object o, int initialFieldCount){
        reference = o;
        fieldAlerts = new boolean[initialFieldCount];
    }
    /** Called when an application modifies a value. (Both objects and
        classes) */
    public static void alert (Object o,int fieldID){
        // Lock the alerts table.
        synchronized (alerts){
            FieldAlert alert = (FieldAlert) alerts.get(o);
            if (alert == null){       // This object hasn't been alerted already,
                                      // so add to alerts table.
                alert = new FieldAlert(o, fieldID + 1);
                alerts.put (o, alert);
            }
            if (fieldID >= alert.fieldAlerts.length){
                // Ok, enlarge fieldAlerts array.
                boolean[ ] b = new boolean[fieldID+1];
                System.arraycopy(alert.fieldAlerts, 0, b, 0,
                    alert.fieldAlerts.length);
                alert.fieldAlerts = b;
            }
            // Record the alert.
            alert.fieldAlerts[fieldID] = true;
            // Mark as pending.
            FieldSend.pending = true;  // Signal that there is one or more
                                        // propagations waiting.
            // Finally, notify the waiting FieldSend thread(s)
            if (FieldSend.waiting){
                FieldSend.waiting = false;
                alerts.notify( );
            }
        }
    }
}
```

It is noted that the compiled code in the annexure and portion repeated in the table is taken from the source-code of the file "example.java" which is included in the Annexure A7 (Table VIII). In the procedure of Annexure A5 and Table VI, the procedure name "Method void setValues(int, int)" of Step 001 is the name of the displayed disassembled output of the setValues method of the compiled application code of "example.java". The name "Method void setValues(int, int)" is arbitrary and selected for this example to indicate a typical JAVA method inclusive of a memory manipulation operation. Overall the method is responsible for writing two values to two different memory locations through the use of an memory manipulation assignment statement (being "putstatic" and "putfield" in this example) and the steps to accomplish this are described in turn.

First (Step 002), the Java Virtual Machine instruction "iload_1" causes the Java Virtual Machine to load the integer value in the local variable array at index 1 of the current method frame and store this item on the top of the stack of the current method frame and results in the integer value passed to this method as the first argument and stored in the local variable array at index 1 being pushed onto the stack.

The Java Virtual Machine instruction "putstatic #3<Field int staticValue>" (Step 003) causes the Java Virtual Machine to pop the topmost value off the stack of the current method frame and store the value in the static field indicated by the CONSTANT_Fieldref_info constant-pool item stored in the $3^{rd}$ index of the classfile structure of the application program containing this example setValues( ) method and results in the topmost integer value of the stack of the current method frame being stored in the integer field named "staticValue".

The Java Virtual Machine instruction "aload_0" (Step 004) causes the Java Virtual Machine to load the item in the local variable array at index 0 of the current method frame and store this item on the top of the stack of the current method frame and results in the 'this' object reference stored in the local variable array at index 0 being pushed onto the stack.

First (Step 005), the Java Virtual Machine instruction "iload_2" causes the Java Virtual Machine to load the integer value in the local variable array at index 2 of the current method frame and store this item on the top of the stack of the current method frame and results in the integer value passed to this method as the first argument and stored in the local variable array at index 2 being pushed onto the stack.

The Java Virtual Machine instruction "putfield #2<Field int instanceValue>" (Step 006) causes the Java Virtual Machine to pop the two topmost values off the stack of the current method frame and store the topmost value in the object instance field of the second popped value, indicated by the CONSTANT_Fieldref_info constant-pool item stored in the $2^{nd}$ index of the classfile structure of the application program containing this example setValues method and results in the integer value on the top of the stack of the current method frame being stored in the instance field named "instanceValue" of the object reference below the integer value on the stack.

Finally, the JAVA virtual machine instruction "return" (Step 007) causes the JAVA virtual machine to cease executing this setValues( ) method by returning control to the previous method frame and results in termination of execution of this setValues( ) method.

As a result of these steps operating on a single machine of the conventional configurations in FIG. 1 and FIG. 2, the JAVA virtual machine manipulates (i.e. writes to) the staticValue and instanceValue memory locations, and in executing the setValues( ) method containing the memory manipulation operation(s) is able to ensure that memory is and remains consistent between multiple threads of a single application instance, and therefore ensure that unwanted behaviour, such as for example inconsistent or incoherent memory between multiple threads of a single application instance (such inconsistent or incoherent memory being for example incorrect or different values or contents with respect to a single memory location) does not occur. Were these steps to be carried out on the plurality of machines of the configurations of FIG. 5 and FIG. 8 by concurrently executing the application program code 50 on each one of the plurality of machines M1 . . . Mn, the memory manipulation operations of each concurrently executing application program occurrence on each one of the machines would be performed without coordination between any other machine(s), such coordination being for example updating of corresponding memory locations on each machine such that they each report a same content or value. Given the goal of consistent, coordinated and coherent memory state and manipulation and updating operation across a plurality of a machines, this prior art arrangement would fail to perform such consistent, coherent, and coordinated memory state and manipulation and updating operation across the plurality of machines, as each machine performs memory manipulation only locally and without any attempt to coordinate or update their local memory state and manipulation operation with any other similar memory state on any one or more other machines. Such an arrangement would therefore be susceptible to inconsistent and incoherent memory state amongst machines M1 . . . Mn due to uncoordinated, inconsistent and/or incoherent memory manipulation and updating operation. Therefore it is the goal of the present invention to overcome this limitation of the prior art arrangement.

In the exemplary code in Table VII (Annexure A6), the code has been modified so that it solves the problem of consistent, coordinated memory manipulation and updating operation for a plurality of machines M1 . . . Mn, that was not solved in the code example from Table VI (Annexure A5). In this modified setValues( ) method code, an "Idc #4<String "example">" instruction is inserted after the "putstatic #3" instruction in order to be the first instruction following the execution of the "putstatic #3" instruction. This causes the JAVA virtual machine to load the String value "example" onto the stack of the current method frame and results in the String value of "example" loaded onto the top of the stack of the current method frame. This change is significant because it modifies the setValues( ) method to load a String identifier corresponding to the classname of the class containing the static field location written to by the "putstatic #3" instruction onto the stack.

Furthermore, the JAVA virtual machine instruction "iconst_0" is inserted after the "Idc #4" instruction so that the JAVA virtual machine loads an integer value of "0" onto the stack of the current method frame and results in the integer value of "0" loaded onto the top of the stack of the current method frame. This change is significant because it modifies the setValues( ) method to load an integer value, which in this example is "0", which represents the identity of the memory location (field) manipulated by the preceding "putstatic #3" operation. It is to be noted that the choice or particular form of the memory identifier used for the implementation of this invention is for illustration purposes only. In this example, the integer value of "0" is the identifier used of the manipulated memory location, and corresponds to the "staticValue" field as the first field of the "example.java" application, as shown in Annexure A7. Therefore, corresponding to the "putstatic #3" instruction, the "iconst_0" instruction loads the integer value "0" corresponding to the index of the manipulated field of the "putstatic #3" instruction, and which in this case is the first field of "example.java" hence the "0" integer index value, onto the stack.

Additionally, the JAVA virtual machine instruction "invokestatic #5<Method boolean alert(java.lang.Object, int)>" is inserted after the "iconst_0" instruction so that the JAVA virtual machine pops the two topmost items off the stack of the current method frame (which in accordance with the preceding "Idc #4" instruction is a reference to the String object with the value "example" corresponding to the name of the class to which manipulated field belongs, and the integer "0" corresponding to the index of the manipulated field in the example.java application) and invokes the "alert" method, passing the two topmost items popped off the stack to the new method frame as its first two arguments. This change is significant because it modifies the setValues( ) method to execute the "alert" method and associated operations, corresponding to the preceding memory manipulation operation (that is, the "putstatic #3" instruction) of the setValues( ) method.

Likewise, in this modified setValues( ) method code, an "aload_0" instruction is inserted after the "putfield #2" instruction in order to be the first instruction following the execution of the "putfield #2" instruction. This causes the JAVA virtual machine to load the instance object of the example class to which the manipulated field of the preceding "putfield #2" instruction belongs, onto the stack of the current method frame and results in the object reference corresponding to the instance field written to by the "putfield #2" instruction, loaded onto the top of the stack of the current method frame. This change is significant because it modifies the setValues( ) method to load a reference to the object corresponding to the manipulated field onto the stack.

Furthermore, the JAVA virtual machine instruction "iconst_1" is inserted after the "aload_0" instruction so that the JAVA virtual machine loads an integer value of "1" onto the stack of the current method frame and results in the integer value of "1" loaded onto the top of the stack of the current method frame. This change is significant because it modifies the setValues( ) method to load an integer value, which in this example is "1", which represents the identity of the memory location (field) manipulated by the preceding "putfield #2" operation. It is to be noted that the choice or particular form of the identifier used for the implementation of this invention is for illustration purposes only. In this example, the integer value of "1" corresponds to the "instanceValue" field as the second field of the "example.java" application, as shown in Annexure A7. Therefore, corresponding to the "putfield #2" instruction, the "iconst_1" instruction loads the integer value "1" corresponding to the index of the manipulated field of the "putfield #2" instruction, and which in this case is the second field of "example.java" hence the "1" integer index value, onto the stack.

Additionally, the JAVA virtual machine instruction "invokestatic #5 <Method boolean alert(java.lang.Object, int)>" is inserted after the "iconst_1" instruction so that the JAVA virtual machine pops the two topmost item off the stack of the current method frame (which in accordance with the preceding "aload_0" instruction is a reference to the object corresponding to the object to which the manipulated instance field belongs, and the integer "1" corresponding to the index of the manipulated field in the example.java application) and invokes the "alert" method, passing the two topmost items popped off the stack to the new method frame as its first two arguments. This change is significant because it modifies the setValues( ) method to execute the "alert" method and associated operations, corresponding to the preceding memory manipulation operation (that is, the "putfield #2" instruction) of the setValues( ) method.

The method void alert(java.lang.Object, int), part of the FieldAlert code of Annexure A8 and part of the distributed runtime system (DRT) 71, requests or otherwise notifies a DRT thread 121/1 executing the FieldSend.java code of Annexure A9 to update and propagate the changed identity and value of the manipulated memory location to the plurality of machines M1 . . . Mn.

It will be appreciated that the modified code permits, in a distributed computing environment having a plurality of computers or computing machines, the coordinated operation of memory manipulation operations so that the problems associated with the operation of the unmodified code or procedure on a plurality of machines M1 . . . Mn (such as for example inconsistent and incoherent memory state and manipulation and updating operation) does not occur when applying the modified code or procedure.

Figure 14:
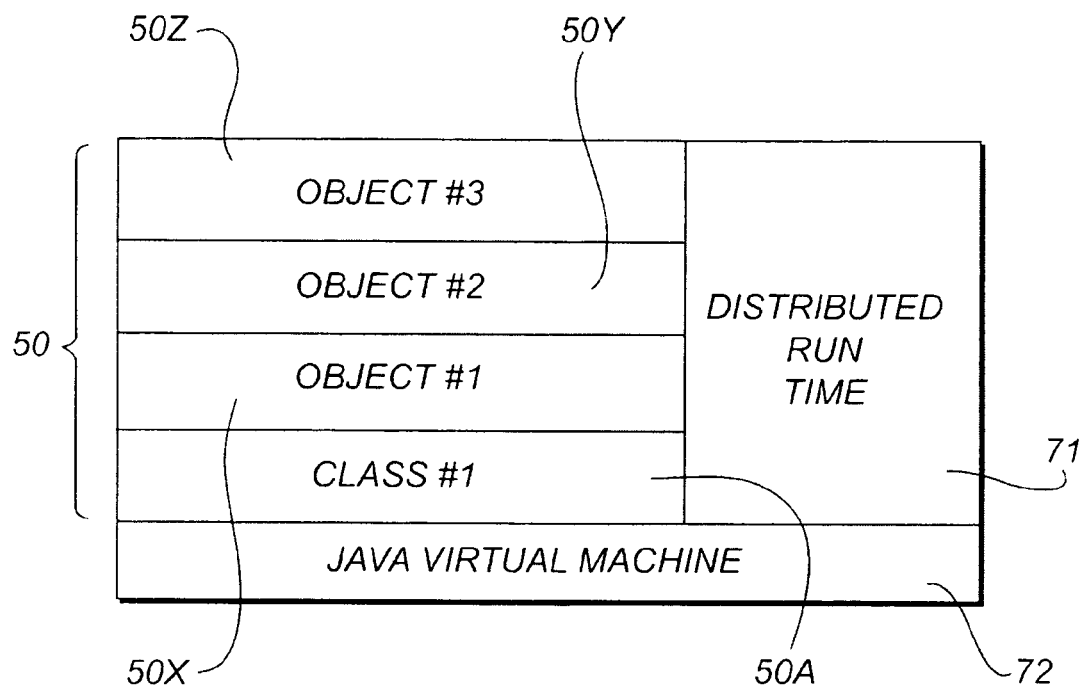
FIG. 14 is a schematic illustration of a prior art computer arranged to operate in JAVA code and thereby constitute a JAVA virtual machine.

Turning to FIG. 14, there is illustrated a schematic representation of a single prior art computer operated as a JAVA virtual machine. In this way, a machine (produced by any one of various manufacturers and having an operating system operating in any one of various different languages) can operate in the particular language of the application program code 50, in this instance the JAVA language. That is, a JAVA virtual machine 72 is able to operate application code 50 in the JAVA language, and utilize the JAVA architecture irrespective of the machine manufacturer and the internal details of the machine.

When implemented in a non-JAVA language or application code environment, the generalized platform, and/or virtual machine and/or machine and/or runtime system is able to operate application code 50 in the language(s) (possibly including for example, but not limited to any one or more of source-code languages, intermediate-code languages, object-code languages, machine-code languages, and any other code languages) of that platform, and/or virtual machine and/or machine and/or runtime system environment, and utilize the platform, and/or virtual machine and/or machine and/or runtime system and/or language architecture irrespective of the machine manufacturer and the internal details of the machine. It will also be appreciated in light of the description provided herein that the platform and/or runtime system may include virtual machine and non-virtual machine software and/or firmware architectures, as well as hardware and direct hardware coded applications and implementations.

Furthermore, when there is only a single computer or machine 72, the single machine of FIG. 14 is able to easily keep track of whether the specific objects 50X, 50Y, and/or 50Z are, liable to be required by the application code 50 at a later point of execution of the application code 50. This may typically be done by maintaining a "handle count" or similar count or index for each object and/or class. This count may typically keep track of the number of places or times in the executing application code 50 where reference is made to a specific object (or class). For a handle count (or other count or index based) implementation that increments the handle count (or index) upward when a new reference to the object or class is created or assigned, and decrements the handle count (or index) downward when a reference to the object or class is destroyed or lost, when the object handle count for a specific object reaches zero, there is nowhere in the executing application code 50 which makes reference to the specific object (or class) for which the zero object handle count (or class handle count) pertains. For example, in the JAVA language and virtual machine environment, a "zero object handle count" correlates to the lack of the existence of any references (zero reference count) which point to the specific object. The object is then said to be "finalizable" or exist in a finalizable state. Object handle counts (and handle counters) may be maintained for each object in an analogous manner so that finalizable or non-finalizable state of each particular or specific object may be known. Class handle counts (and class handle counters) may be maintained for each class in an analogous manner to that for objects so that finalizable or non-finalizable state of each particular or specific class may be known. Furthermore, asset handle counts or indexes and counters may be maintained for each asset in an analogous manner to that for classes and objects so that finalizable or non-finalizable state of each particular or specific asset may be known.

Once this finalizable state has been achieved for an object (or class), the object (or class) can be safely finalized. This finalization may typically include object (or class) deletion, removal, clean-up, reclamation, recycling, finalization or other memory freeing operation because the object (or class) is no longer needed.

Therefore, in light of the availability of these reference, pointer, handle count or other class and object type tracking means, the computer programmer (or other automated or nonautomated program generator or generation means) when writing a program such as the application code 50 using the JAVA language and architecture, need not write any specific code in order to provide for this class or object removal, clean up, deletion, reclamation, recycling, finalization or other memory freeing operation. As there is only a single JAVA virtual machine 72, the single JAVA virtual machine 72 can keep track of the class and object handle counts in a consistent, coherent and coordinated manner, and clean up (or carry out finalization) as necessary in an automated and unobtrusive fashion, and without unwanted behaviour for example erroneous, premature, supernumerary, or re-finalization operation such as may be caused by inconsistent and/or incoherent finalization states or handle counts.

In analogous manner, a single generalized virtual machine or machine or runtime system can keep track of the class and object handle counts (or equivalent if the machine does not specifically use "object" and "class" designations) and clean up (or carry out finalization) as necessary in an automated and unobtrusive fashion.

The automated handle counting system described above is used to indicate when an object (or class) of an executing application program 50 is no longer needed and may be 'deleted' (or cleaned up, or finalized, or reclaimed, or recycled, or other otherwise freed). It is to be understood that when implemented in 'non-automated memory management' languages and architectures (such as for example 'non-garbage collected' programming languages such as C, C++, FORTRAN, COBOL, and machine-CODE languages such as x86, SPARC, PowerPC, or intermediate-code languages), the application program code 50 or programmer (or other automated or non-automated program generator or generation means) may be able to make the determination at what point a specific object (or class) is no longer needed, and consequently may be 'deleted' (or cleaned up, or finalized, or reclaimed, or recycled). Thus, 'deletion' in the context of this invention is to be understood to be inclusive of the deletion (or cleaning up, or finalization, or reclamation, or recycling, or freeing) of objects (or classes) on 'non-automated memory management' languages and architectures corresponding to deletion, finalization, clean up, recycling, or reclamation operations on those 'non-automated memory management' languages and architectures.

For a more general set of virtual machine or abstract machine environments, and for current and future computers and/or computing machines and/or information appliances or processing systems, and that may not utilize or require utilization of either classes and/or objects, the inventive structure, method, and computer program and computer program product are still applicable. Examples of computers and/or computing machines that do not utilize either classes and/or objects include for example, the x86 computer architecture manufactured by Intel Corporation and others, the SPARC computer architecture manufactured by Sun Microsystems, Inc and others, the PowerPC computer architecture manufactured by International Business Machines Corporation and others, and the personal computer products made by Apple Computer, Inc., and others. For these types of computers, computing machines, information appliances, and the virtual machine or virtual computing environments implemented thereon that do not utilize the idea of classes or objects, the terms 'class' and 'object' may be generalized for example to include primitive data types (such as integer data types, floating point data types, long data types, double data types, string data types, character data types and Boolean data types), structured data types (such as arrays and records) derived types, or other code or data structures of procedural languages or other languages and environments such as functions, pointers, components, modules, structures, references and unions.

However, in the arrangement illustrated in FIG. 8, (and also in FIGS. 20-22), a plurality of individual computers or machines M1, M2 . . . Mn are provided, each of which are interconnected via a communications network 53 or other communications link and each of which individual computers or machines is provided with a modifier 51 (See FIG. 5) and realised or implemented by or in for example the distributed run-time system (DRT) 71 (See FIG. 8) and loaded with a common application code 50. The term common application program is to be understood to mean an application program or application program code written to operate on a single machine, and loaded and/or executed in whole or in part on the plurality of computers or machines M1, M2 . . . Mn. Put somewhat differently, there is a common application program represented in application code 50, and this single copy or perhaps a plurality of identical copies are modified to generate a modified copy or version of the application program or program code, each copy or instance prepared for execution on the plurality of machines. At the point after they are modified they are common in the sense that they perform similar operations and operate consistently and coherently with each other. It will be appreciated that a plurality of computers, machines, information appliances, or the like implementing the features of the invention may optionally be connected to or coupled with other computers, machines, information appliances, or the like that do not implement the features of the invention.

In some embodiments, some or all of the plurality of individual computers or machines may be contained within a single housing or chassis (such as so-called "blade servers" manufactured by Hewlett-Packard Development Company, Intel Corporation, IBM Corporation and others) or implemented on a single printed circuit board or even within a single chip or chip set.

Essentially the modifier 51 or DRT 71, or other code modifying means is responsible for modifying the application code 50 so that it may execute clean up or other memory reclamation, recycling, deletion or finalization operations, such as for example finalization methods in the JAVA language and virtual machine environment, in a coordinated, coherent and consistent manner across and between the plurality of individual machines M1, M2, . . . , Mn. It follows therefore that in such a computing environment it is necessary to ensure that the local objects and classes on each of the individual machines is finalized in a consistent fashion (with respect to the others).

It will be appreciated in light of the description provided herein that there are alternative implementations of the modifier 51 and the distributed run time 71. For example, the modifier 51 may be implemented as a component of or within the distributed run time 71, and therefore the DRT 71 may implement the functions and operations of the modifier 51. Alternatively, the function and operation of the modifier 51 may be implemented outside of the structure, software, firmware, or other means used to implement the DRT 71. In one embodiment, the modifier 51 and DRT 71 are implemented or written in a single piece of computer program code that provides the functions of the DRT and modifier. The modifier function and structure therefore maybe subsumed into the DRT and considered to be an optional component. Independent of how implemented, the modifier function and structure is responsible for modifying the executable code of the application code program, and the distributed run time function and structure is responsible for implementing communications between and among the computers or machines. The communications functionality in one embodiment is implemented via an intermediary protocol layer within the computer program code of the DRT on each machine. The DRT may for example implement a communications stack in the JAVA language and use the Transmission Control Protocol/Internet Protocol (TCP/IP) to provide for communications or talking between the machines. Exactly how these functions or operations are implemented or divided between structural and/or procedural elements, or between computer program code or data structures within the invention are less important than that they are provided.

In particular, whilst the application program code executing on one particular machine (say, for example machine M3) may have no active handle, reference, or pointer to a specific local object or class (i.e. a "zero handle count"), the same application program code executing on another machine (say for example machine M5) may have an active handle, reference, or pointer to the local similar equivalent object or class corresponding to the 'un-referenced' local object or class of machine M3, and therefore this other machine (machine M5) may still need to refer to or use that object or class in future. Thus if the corresponding similar equivalent local object or class on each machine M3 and M5 were to be finalized (or otherwise cleaned-up by some other memory clean-up operation) in an independent and uncoordinated manner relative to other machine(s), the behaviour of the object and application as a whole is undefined—that is, in the absence of coordinated, coherent, and consistent finalization or memory clean-up operations between machines M1 . . . Mn, conflict, unwanted interactions, or other anomalous behaviour such as permanent inconsistency between local similar equivalent corresponding objects on machine M5 and machine M3 is likely to result. For example, if the local similar equivalent object or class on machine M3 were to be finalized, such as by being deleted, or cleaned up, or reclaimed, or recycled, from machine M3, in an uncoordinated and inconsistent manner with respect to machine M5, then if machine M5 were to perform an operation on or otherwise use the local object or class corresponding to the now finalized similar equivalent local object on machine M3 (such operation being for example, in an environment with a memory updating and propagation means of FIGS. 9, 10, 11, 12, and 13, a write to (or try to write to) the similar equivalent local object on machine M5 or amendment to that particular object's value), then that operation (the change or attempted change in value) could not be performed (propagated from machine M5) throughout all the other machines M1, M2 . . . Mn since at least the machine M3 would not include the relevant similar equivalent corresponding particular object in its local memory, the object and its data, contents and value(s) having been deleted by the prior object clean-up or finalization or reclamation or recycling operation. Therefore, even though one may contemplate machine M5 being able to write to the object (or class) the fact that it has already been finalized on machine M3 means that likely such a write operation is not possible, or at the very least not possible on machine M3.

Additionally, if an object of class on machine M3 were to be marked finalizable and subsequently finalized (such as by being deleted, or cleaned up, or reclaimed, or recycled) whilst the same object on the other machines M1, M2 . . . Mn were not also marked as finalizable, then the execution of the finalization (or deletion, or clean up, or reclamation, or recycling) operation of that object on machine M3 would be premature with respect to coordinated finalization operation between all machines M1, M2 . . . Mn, as machines other than M3 are not yet ready to finalize their local similar equivalent object corresponding to the particular object now finalized or finalizable by machine M3. Therefore were machine M3 to execute the cleanup or other finalization routine on a given particular object (or class), the cleanup or other finalization routine would preform the clean-up or finalization not just for that local object (or class) on machine M3, but also for all similar equivalent local objects or classes (i.e. corresponding to the particular object or class to be cleaned-up or otherwise finalized) on all other machines as well.

Were such either these circumstance to happen, the behaviour of the equivalent object on the other machines M1, M2 . . . Mn is undefined and likely to result in permanent and irrecoverable inconsistency between machine M3 and machines M1, M2 . . . Mn. Therefore, though machine M3 may independently determine an object (or class) is ready for finalization and proceed to finalize the specified object (or class), machine M5 may not have made the same determination as to the same similar equivalent local object (or class) being ready to be finalized, and therefore inconsistent behaviour will likely result due to the deletion of one of the plurality of similar equivalent objects on one machine (eg, machine M3) but not on the other machine (eg, machine M5) or machines, and the premature execution of the finalization routine of the specified object (or class) by machine M3 and on behalf of all other machines M1, M2 . . . Mn. At the very least operation of machine M5 as well as other machines in such an above circumstance is unpredictable and would likely lead to inconsistent results, such inconsistency potentially arising for example from, uncoordinated premature execution of the finalization routine and/or deletion of the object on one, or a subset of, machines but not others. Thus, a goal of achieving or providing consistent coordinated finalization operation (or other memory clean-up operation) as required for the simultaneous operation of the same application program code on each of the plurality of machines M1, M2 . . . Mn would not be achieved. Any attempt therefore to maintain identical memory contents with a memory updating and propagation means of FIGS. 9, 10, 11, 12, and 13, or even identical memory contents as to a particular or defined set of classes, objects, values, or other data, for each of the machines M1, M2, . . . , Mn, as required for simultaneous operation of the same application program, would not be achieved given conventional schemes.

In order to ensure consistent class and object (or equivalent) finalizable status and finalization or clean up between and amongst machines M1, M2, . . . , Mn, the application code 50 is analysed or scrutinized by searching through the executable application code 50 in order to detect program steps (such as particular instructions or instruction types) in the application code 50 which define or constitute or otherwise represent a finalization operation or routine (or other memory, data, or code clean up routine, or other similar reclamation, recycling, or deletion operation). In the JAVA language, such program steps may for example comprise or consist of some part of, or all of, a "finalize( )" method of an object, and optionally any other code, routine, or method related to a 'finalize( )' method, for example by means of a method invocation from the body of the 'finalize( )' method to a different method.

This analysis or scrutiny may take place either prior to loading the application program, or during the application program code 50 loading procedure, or even after the application program code 50 loading procedure. It may be likened to an instrumentation, program transformation, translation, or compilation procedure in that the application program may be instrumented with additional instructions, and/or otherwise modified by meaning-preserving program manipulations, and/or optionally translated from an input code language to a different code language (such as from source-code or intermediate-code language to machine language), and with the understanding that the term compilation normally involves a change in code or language, for example, from source to object code or from one language to another language. However, in the present instance the term "compilation" (and its grammatical equivalents) is not so restricted and can also include or embrace modifications within the same code or language. For example, the compilation and its equivalents are understood to encompass both ordinary compilation (such as for example by way of illustration but not limitation, from source-code to object-code), and compilation from source-code to source-code, as well as compilation from object-code to object-code, and any altered combinations therein. It is also inclusive of so-called "intermediary languages" which are a form of "pseudo object-code".

By way of illustration and not limitation, in one embodiment, the analysis or scrutiny of the application code 50 may take place during the loading of the application program code such as by the operating system reading the application code from the hard disk or other storage device or source and copying it into memory and preparing to begin execution of the application program code. In another embodiment, in a JAVA virtual machine, the analysis or scrutiny may take place during the class loading procedure of the java.lang.Class-Loader loadClass method (e.g., "java.lang.ClassLoader.loadClass( )").

Alternatively, the analysis or scrutiny of the application code 50 may take place even after the application program code loading procedure, such as after the operating system has loaded the application code into memory, or optionally even after execution of the application program code has started, such as for example after the JAVA virtual machine has loaded the application code into the virtual machine via the "java.lang.ClassLoader.loadClass( )" method and optionally commenced execution.

As a consequence, of the above described analysis or scrutiny, clean up routines are initially looked for, and when found or identified a modifying code is inserted so as to give rise to a modified clean up routine. This modified routine is adapted and written to abort the clean up routine on any specific machine unless the class or object (or in the more general case to be 'asset') to be deleted, cleaned up, reclaimed, recycled, freed, or otherwise finalized is marked for deletion by all other machines. There are several different alternative modes wherein this modification and loading can be carried out.

By way of illustration and not limitation, in one embodiment, the analysis or scrutiny of the application code 50 may take place during the loading of the application program code such as by the operating system reading the application code from the hard disk or other storage device and copying it into memory whilst preparing to begin execution of the application program. In another embodiment, in a JAVA virtual machine, the analysis or scrutiny may take place during the execution of the java.lang.ClassLoader loadClass (e.g., "java.lang.ClassLoader.loadClass( )") method.

Alternatively, the analysis or scrutiny of the application code 50 may take place even after the application program code loading procedure such as after the operating system has loaded the application code into memory and even started execution, or after the java virtual machine has loaded the application code into the virtual machine via the "java. lang. ClassLoader.loadClass( )" method. In other words, in the case of the JAVA virtual machine, after the execution of "java.lang.ClassLoader.loadclass( )" has concluded.

Thus, in one mode, the DRT 71/1 on the loading machine, in this example Java Machine M1 (JVM#1), asks the DRT's 71/2, ..., 71/n of all the other machines M2, ..., Mn if the similar equivalent first object 50X on all machines, say, is utilized, referenced, or in-use (i.e. not marked as finalizable) by any other machine M2, ..., Mn. If the answer to this question is yes (that is, a similar equivalent object is being utilized by another one or more of the machines, and is not marked as finalizable and therefore not liable to be deleted, cleaned up, finalized, reclaimed, recycled, or freed), then the ordinary clean up procedure is turned off, aborted, paused, or otherwise disabled for the similar equivalent first object 50X on machine JVM#1. If the answer is no, (that is the similar equivalent first object 50X on each machine is marked as finalizable on all other machines with a similar equivalent object 50X) then the clean up procedure is operated (or resumed or continued, or commenced) and the first object 50X is deleted not only on machine JVM#1 but on all other machines M2 ... Mn with a similar equivalent object 50X. Preferably, execution of the clean up routine is allocated to one machine, such as the last machine M1 marking the similar equivalent object or class as finalizable. The execution of the finalization routine corresponding to the determination by all machines that the plurality of similar equivalent objects is finalizable, is to execute only once with respect to all machines M1 ... Mn, and preferably by only one machine, on behalf of all machines M1 ... Mn. Corresponding to, and preferably following, the execution of the finalization routine, all machines may then delete, reclaim, recycle, free or otherwise clean-up the memory (and other corresponding system resources) utilized by their local similar equivalent object.

Annexures C1, C2, C3, and C4 (also reproduced in part in Tables XVI, XVII, XVIII, and XIX below) are exemplary code listings that set forth the conventional or unmodified computer program software code (such as may be used in a single machine or computer environment) of a finalization routine of application program 50 (Annexure C1 and Table X), and a post-modification excerpt of the same synchronization routine such as may be used in embodiments of the present invention having multiple machines (Annexures C2 and C3 and Tables XI and XII). Also the modified code that is added to the finalization routine is highlighted in bold text.

Annexure C1 is a before-modification excerpt of the disassembled compiled form of the finalize( ) method of the example.java application of Annexure C4. Annexure C2 is an after-modification form of Annexure C1, modified by FinalLoader.java of Annexure C7 in accordance with the steps of FIG. 22. Annexure C3 is an alternative after-modification form of Annexure C1, modified by FinalLoader.java of Annexure C7 in accordance with the steps of FIG. 22. The modifications are highlighted in bold.

Annexure C4 is an excerpt of the source-code of the example.java application used in before/after modification excerpts C1-C3. This example application has a single finalization routine, the finalize( ) method, which is modified in accordance with this invention by FinalLoader.java of Annexure C7.

TABLE X

Annexure C1 - Typical prior art finalization for a single machine

Method finalize( )
  0 getstatic #9 <Field java.io.PrintStream out>
  3 ldc #24 <String "Deleted...">
  5 invokevirtual #16 <Method void println(java.lang.String)>
  8 return

TABLE XI

Annexure C2 - Finalization For Multiple Machines

Method finalize( )
0 aload_0
1 invokestatic #3 <Method boolean isLastReference(javalang.Object)>
4 ifne 8
7 return
8 getstatic #9 <Field java.io.PrintStream out>
11 ldc #24 <String "Deleted...">
13 invokevirtual #16 <Method void println(java.lang.String)>
16 return

TABLE XII

Annexure C3 - Finalization For Multiple Machines (Alternative)

Method finalize( )
0 aload_0
1 invokestatic #3 <Method boolean isLastReference(java.lang.Object)>
4 ifne 8
7 return
8 getstatic #9 <Field java.io.PrintStream out>
11 ldc #24 <String "Deleted...">
13 invokevirtual #16 <Method void println(java.lang.String)>
16 return

TABLE XIII

Annexure C4 - Source-code of the example.java application used in before/after modification excerpt of Annexures C1-C3

```
import java.lang.*;
public class example{
  /** Finalize method. */
  protected void finalize( ) throws Throwable{
    // "Deleted..." is printed out when this object is garbaged.
    System.out.println("Deleted...");
  }
}
```

It is noted that the compiled code in the annexure and portion repeated in the table is taken from the source-code of the file "example.java" which is included in the Annexure C4. In the procedure of Annexure C1 and Table X, the procedure name "Method finalize( )" of Step 001 is the name of the displayed disassembled output of the finalize method of the compiled application code "example.java". The method name "finalize( )" is the name of an object's finalization method in accordance with the JAVA platform specification, and selected for this example to indicate a typical mode of operation of a JAVA finalization method. Overall the method is responsible for disposing of system resources or to perform other cleanup corresponding to the determination by the garbage collector of a JAVA virtual machine that there are no more references to this object, and the steps the "example.java" code performs are described in turn.

First (Step 002), the JAVA virtual machine instruction "getstatic #9<Field java.io.PrintStream out>" causes the JAVA virtual machine to retrieve the object reference of the static field indicated by the CONSTANT_Fieldref_info constant_pool item stored in the $2^{nd}$ index of the classfile structure of the application program containing this example finalize( ) method and results on a reference to a java.io.PrintStream object in the field to be placed (pushed) on the stack of the current method frame of the currently executing thread.

Next (Step 003), the JAVA virtual machine instruction "ldc #24<String "Deleted...">" causes the JAVA virtual machine to load the String value "Deleted" onto the stack of the current method frame and results in the String value "Deleted" loaded onto the top of the stack of the current method frame.

Next (Step 004), the JAVA virtual machine instruction "invokevirtual #16<Method void println(java.lang.String)>" causes the JAVA virtual machine to pop the topmost item off the stack of the current method frame and invoke the "println" method, passing the popped item to the new method frame as its first argument, and results in the "println" method being invoked.

Finally, the JAVA virtual machine instruction "return" (Step 005) causes the JAVA virtual machine to cease executing this finalize( ) method by returning control to the previous method frame and results in termination of execution of this finalize method.

As a result of these steps operating on a single machine of the conventional configurations in FIG. 1 and FIG. 2, the JAVA virtual machine can keep track of the object handle count in a consistent, coherent and coordinated manner, and in executing the finalize( ) method containing the println operation is able to ensure that unwanted behaviour (for example premature or supernumerary finalization operation such as execution of the finalize( ) method of a single 'example.java' object more than once) such as may be caused by inconsistent and/or incoherent finalization states or handle counts, does not occur. Were these steps to be carried out on the plurality of machines of the configurations of FIG. 5 and FIG. 8 with the memory update and propagation replication means of FIGS. 9, 10, 11, 12, and 13, and concurrently executing the application program code 50 on each one of the plurality of machines M1 . . . Mn, the finalization operations of each concurrently executing application program occurrence on each of the one of the machines would be performed without coordination between any other of the occurrences on any other of the machine(s). Given the goal of consistent, coordinated and coherent finalization operation across a plurality of a machines, this prior art arrangement would fail to perform such consistent coordinated finalization operation across the plurality of machines, as each machine performs finalization only locally and without any attempt to coordinate their local finalization operation with any other similar finalization operation on any one or more other machines. Such an arrangement would therefore be susceptible to unwanted or other anomalous behaviour due to uncoordinated, inconsistent and/or incoherent finalization states or handle counts, and associated finalization operation. Therefore it is the goal of the present invention to overcome this limitation of the prior art arrangement.

In the exemplary code in Table XII (Annexure C3), the code has been modified so that it solves the problem of consistent, coordinated finalization operation for a plurality of machines M1 . . . Mn, that was not solved in the code example from Table X (Annexure C1). In this modified finalize( ) method code, an "aload_0" instruction is inserted before the "getstatic #9" instruction in order to be the first instruction of the finalize( ) method. This causes the JAVA virtual machine to load the item in the local variable array at index 0 of the current method frame and store this item on the top of the stack of the current method frame, and results in the object reference of the 'this' object at index 0 being pushed onto the stack.

Furthermore, the JAVA virtual machine instruction "invokestatic #3<Method Boolean isLastReference(java.lang.Object)>" is inserted after the "0 aload_0" instruction so that the JAVA virtual machine pops the topmost item off the stack of the current method frame (which in accordance with the preceding "aload_0" instruction is a reference to the object to which this finalize( ) method belongs) and invokes the "isLastReference" method, passing the popped item to the new method frame as its first argument, and returning a boolean value onto the stack upon return from this "invokestatic" instruction. This change is significant because it modifies the finalize( ) method to execute the "isLastReference" method and associated operations, corresponding to the start of execution of the finalize( ) method, and returns a boolean argument (indicating whether the object corresponding to this finalize( ) method is the last remaining reference amongst the similar equivalent object on each of the machines M1 ... Mn) onto the stack of the executing method frame of the finalize( ) method.

Next, two JAVA virtual machine instructions "ifne 8" and "return" are inserted into the code stream after the "1 invokestatic #3" instruction and before the "getstatic #9" instruction. The first of these two instructions, the "ifne 8" instruction, causes the JAVA virtual machine to pop the topmost item off the stack and performs a comparison between the popped value and zero. If the performed comparison succeeds (i.e. if and only if the popped value is not equal to zero), then execution continues at the "8 getstatic #9" instruction. If however the performed comparison fails (i.e. if and only if the popped value is equal to zero), then execution continues at the next instruction in the code stream, which is the "7 return" instruction. This change is particularly significant because it modifies the finalize( ) method to either continue execution of the finalize( ) method (i.e. instructions 8-16) if the returned value of the "isLastReference" method was positive (i.e. "true"), or discontinue execution of the finalize( ) method (i.e. the "7 return" instruction causing a return of control to the invoker of this finalize( ) method) if the returned value of the "isLast Reference" method was negative (i.e. "false").

Figure 19:
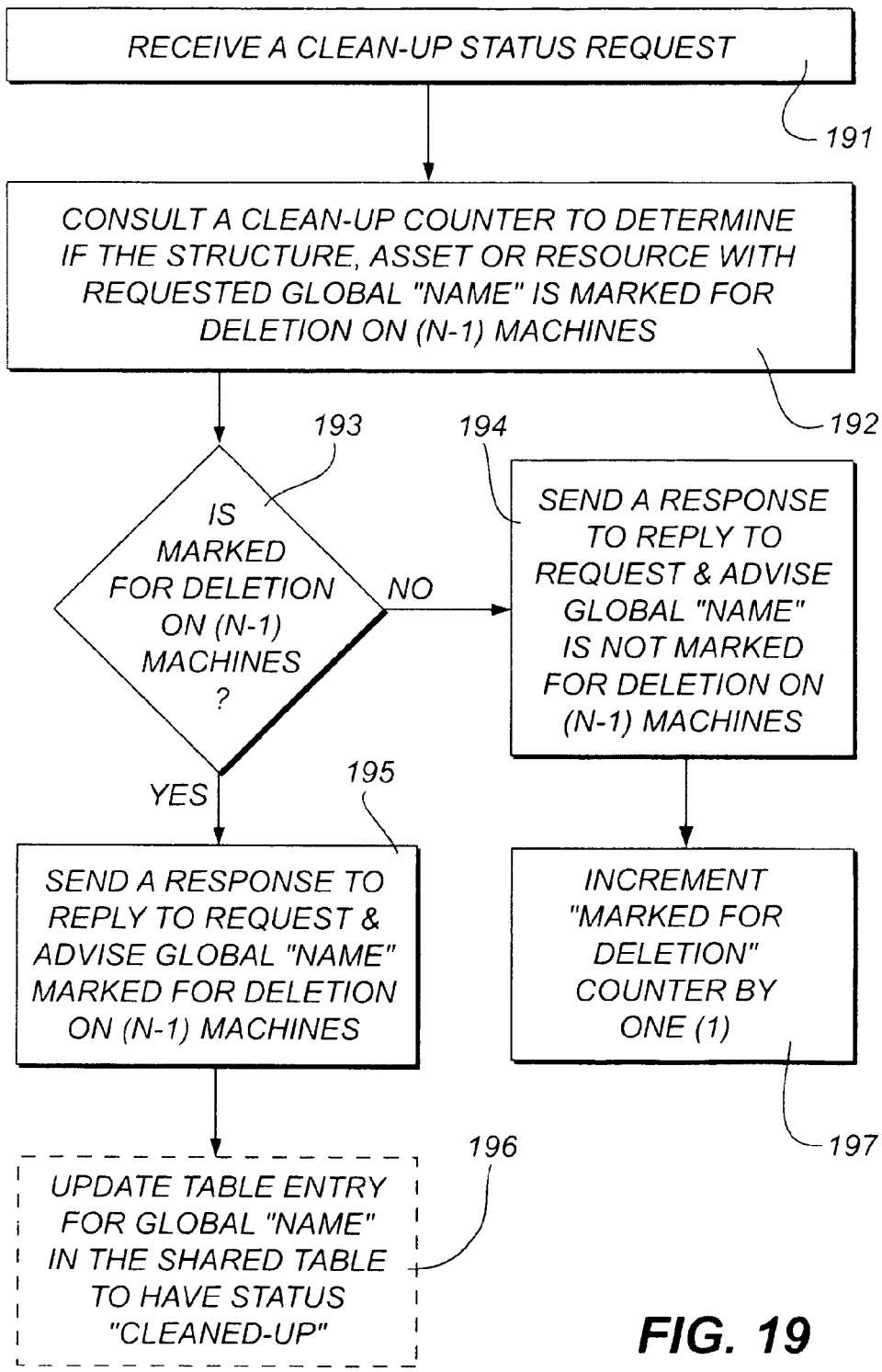
FIG. 19 is a flow chart of the response of the server machine X to the request of FIG. 18.

The method void isLastReference(java.lang.Object), part of the FinalClient code of Annexure C5 and part of the distributed runtime system (DRT) 71, performs the communications operations between machines M1 ... Mn to coordinate the execution of the finalize( ) method amongst the machines M1 ... Mn. The isLastReference method of this example communicates with the InitServer code of Annexure C6 executing on a machine X of FIG. 15, by means of sending an "clean-up status request" to machine X corresponding to the object being "finalized" (i.e. the object to which this finalize( ) method belongs). With reference to FIG. 19 and Annexure C6, machine X receives the "clean-up status request" corresponding to the object to which the finalize( ) method belongs, and consults a table of clean-up counts or finalization states to determine the clean-up count or finalization state for the object to which the request corresponds.

If the plurality of similar equivalent objects one each one of the plurality of machines M1 ... Mn corresponding to the clean-up status request is marked for clean-up on all other machines than the requesting machine (i.e. n-1 machines), then machine X will send a response indicating that the plurality of similar equivalent objects are marked for clean-up on all other machines, and optionally update a record entry corresponding to the specified similar equivalent objects to indicate the similar equivalent objects as now cleaned up. Alternatively, if the plurality of the similar equivalent objects corresponding to the clean-up status request is not marked for clean-up on all other machines than the requesting machine (i.e. less than n-1 machines), then machine X will send a response indicating that the plurality of similar equivalent objects is not marked for cleanup on all other machines, and increment the "marked for clean-up counter" record (or other similar finalization record means) corresponding to the specified object, to record that the requesting machine has marked its one of the plurality of similar equivalent objects to be cleaned-up. Corresponding to the determination that the plurality of similar equivalent objects to which this clean-up status request pertains is marked for clean-up on all other machines than the requesting machine, a reply is generated and sent to the requesting machine indicating that the plurality of similar equivalent objects is marked for clean-up on all other machines than the requesting machine. Additionally, and optionally, machine X may update the entry corresponding to the object to which the clean-up status request pertained to indicate the plurality of similar equivalent objects as now "cleaned-up". Following a receipt of such a message from machine X indicating that the plurality of similar equivalent objects is marked for clean-up on all other machines, the isLastReference( ) method and operations terminate execution and return a 'true' value to the previous method frame, which is the executing method frame of the finalize( ) method. Alternatively, following a receipt of a message from machine X indicating that the plurality of similar equivalent objects is not marked for clean-up on all other machines, the isLastReference( ) method and operations terminate execution and return "false" value to the previous method frame, which is the executing method frame of the finalize( ) method. Following this return operation, the execution of the finalize( ) method frame then resumes as indicated in the code sequence of Annexure C3.

It will be appreciated that the modified code permits, in a distributed computing environment having a plurality of computers or computing machines, the coordinated operation of finalization routines or other clean-up operations so that the problems associated with the operation of the unmodified code or procedure on a plurality of machines M1 ... Mn (such as for example erroneous, premature, multiple finalization, or re-finalization operation) does not occur when applying the modified code or procedure.

It may be observed that the code in Annexure C2 and Table XI is an alternative but lesser preferred form of the code in Annexure C3. It is essentially functionally equivalent to the code and approach in Annexure C3.

As seen in FIG. 15 a modification to the general arrangement of FIG. 8 is provided in that machines M1, M2, ..., Mn are as before and run the same application code 50 (or codes) on all machines M1, M2, ..., Mn simultaneously or concurrently. However, the previous arrangement is modified by the provision of a server machine X which is conveniently able to supply housekeeping functions, for example, and especially the clean up of structures, assets and resources. Such a server machine X can be a low value commodity computer such as a PC since its computational load is low. As indicated by broken lines in FIG. 15, two server machines X and X+1 can be provided for redundancy purposes to increase the overall reliability of the system. Where two such server machines X and X+1 are provided, they are preferably operated as redundant machines in a failover arrangement.

It is not necessary to provide a server machine X as its computational load can be distributed over machines M1, M2, ..., Mn. Alternatively, a database operated by one machine (in a master/slave type operation) can be used for the housekeeping function(s).

Figure 16:
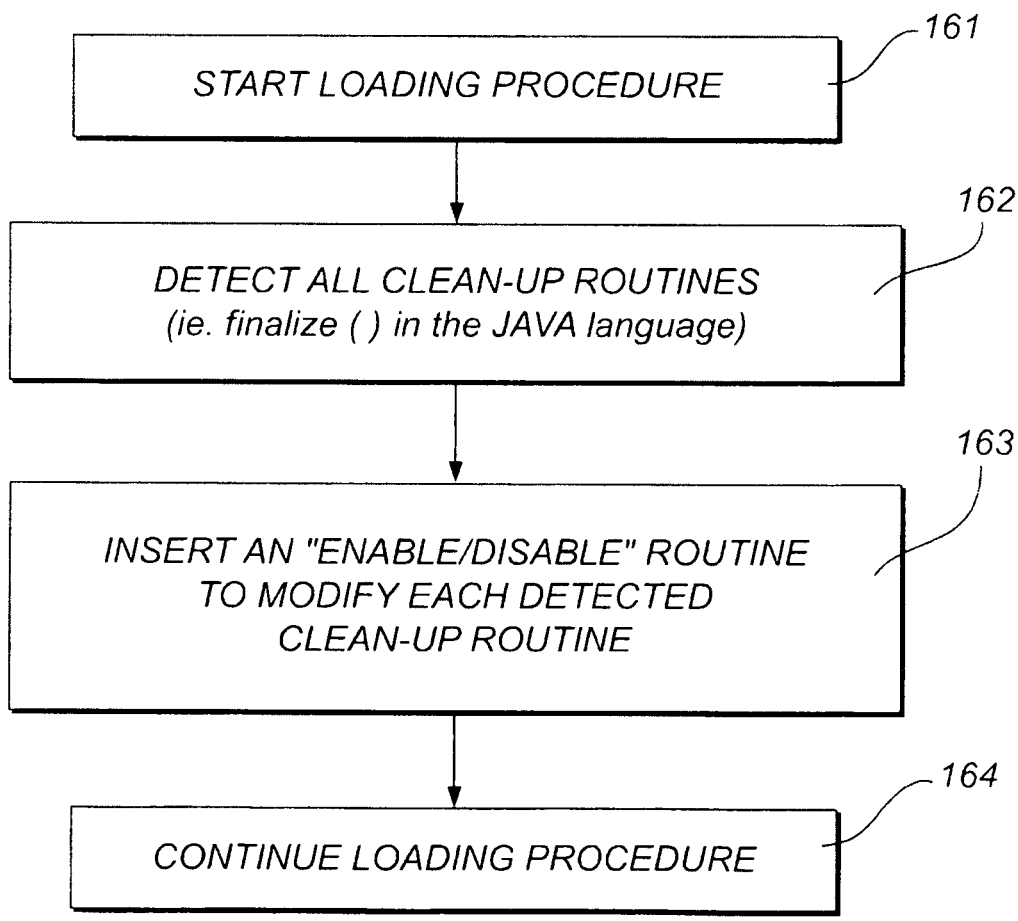
FIG. 16 is a flow chart of illustrating the modification of "clean up" or finalization routines.

FIG. 16 shows a preferred general procedure to be followed. After loading 161 has been commenced, the instructions to be executed are considered in sequence and all clean up routines are detected as indicated in step 162. In the JAVA language these are the finalization routines or finalize method (e.g., "finalize( )"). Other languages use different terms.

Where a clean up routine is detected, it is modified at step 163 in order to perform consistent, coordinated, and coherent clean up or finalization across and between the plurality of machines M1, M2 . . . Mn, typically by inserting further instructions into the clean up routine to, for example, determine if the object (or class or other asset) containing this finalization routine is marked as finalizable across all similar equivalent local objects on all other machines, and if so performing finalization by resuming the execution of the finalization routine, or if not then aborting the execution of the finalization routine, or postponing or pausing the execution of the finalization routine until such a time as all other machines have marked their similar equivalent local objects as finalizable. Alternatively, the modifying instructions could be inserted prior to the routine. Once the modification has been completed the loading procedure continues by loading modified application code in place of the unmodified application code, as indicated in step 164. Altogether, the finalization routine is to be executed only once, and preferably by only one machine, on behalf of all machines M1 . . . Mn corresponding to the determination by all machines M1 . . . Mn that the particular object is finalizable.

Figure 17:
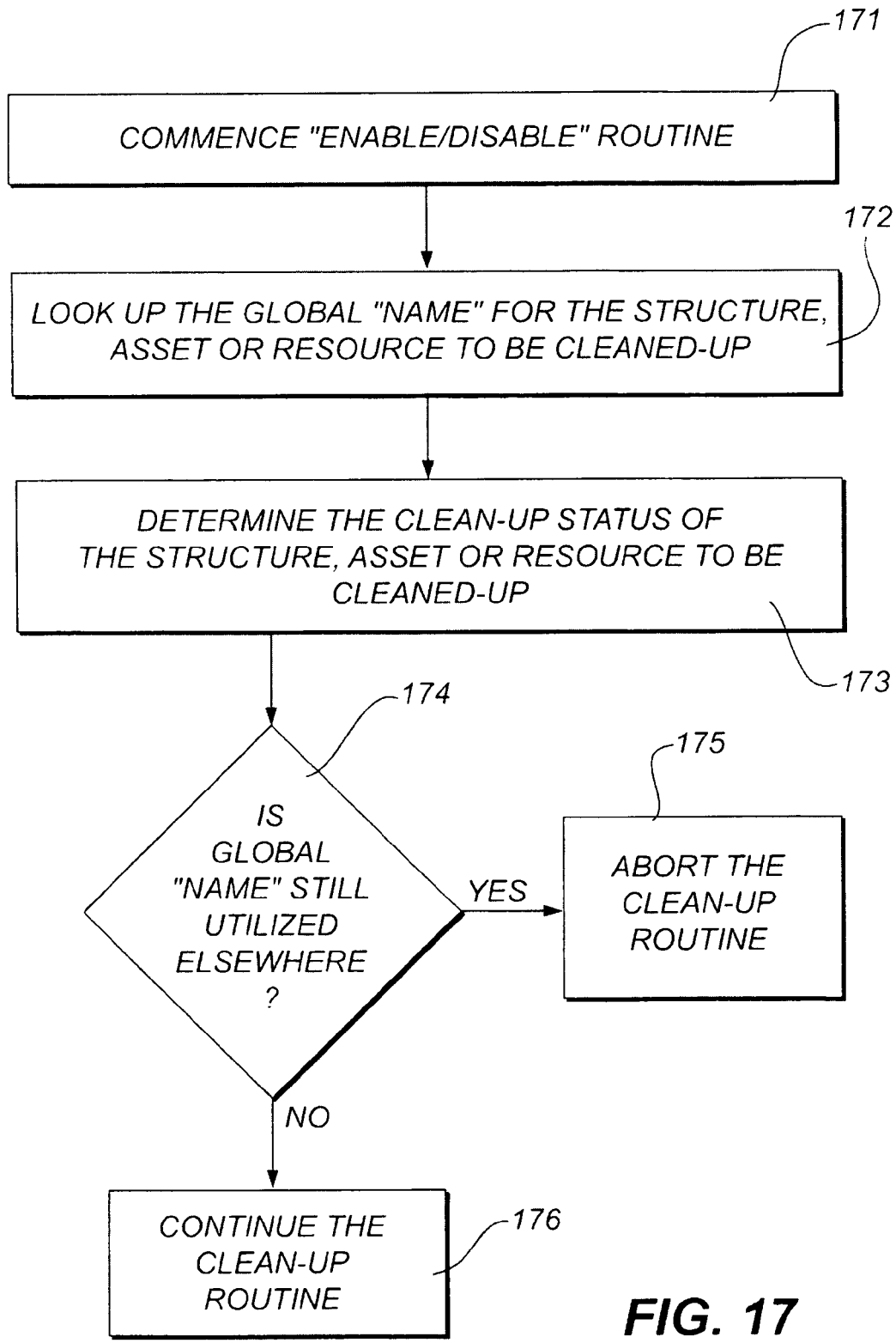
FIG. 17 is a flow chart illustrating the continuation or abortion of finalization routines.

FIG. 17 illustrates a particular form of modification. Firstly, the structures, assets or resources (in JAVA termed classes or objects) 50A, 50X . . . 50Y which are possible candidates to be cleaned up, are allocated a name or tag (for example a global name or tag), or have already been allocated a global name or tag, which can be used to identify corresponding similar equivalent local structures, assets, or resources (such as classes and objects in JAVA) globally on each of the machines M1, M2 . . . Mn, as indicated by step 172. This preferably happens when the classes or objects are originally initialized. This is most conveniently done via a table maintained by server machine X. This table also includes the "clean up status" of the class or object (or other asset). It will be understood that this table or other data structure may store only the clean up status, or it may store other status or information as well. In one embodiment, this table also includes a counter which stores a machine asset deletion count value identifying the number of machines (and optionally the identity of the machines although this is not required) which have marked this particular object, class, or other asset for deletion. In one embodiment, the count value is incremented until the count value equals the number of machines. Thus a total machine asset deletion count value of less than (n−1), where n is the total number of machines in Mn indicates a "do not clean up" status for the object, class, or other asset as a network (or machine constellation) whole, because the machine asset deletion count of less than n−1 means that one or more machines have yet to mark their similar equivalent local object (or class or other asset) as finalizable and that object cannot be cleaned up as unwanted or other anomalous behaviour may result. Stated differently, and by way of example but not limitation, if there are six machines and the asset deletion count is less than five then it means that not all the other machines have attempted to finalize this object (i.e., not yet marked this object as finalizable), and therefore the object can't be finalised. If however the asset deletion count is five, then it means that there is only one machine that has yet to attempt to finalize this object (i.e., mark this object as finalizable) and therefore that last machine yet to mark the object as finalizable must be the current machine attempting to finalize the object (i.e., marking the object as finalizable and consequently consulting the finalization table as to finalization status of this object on all other machines). In the configuration of six machines, the count value of n−1=5 means that five machines must have previously marked the object for deletion and the sixth machine to mark this object for deletion is the machine that actually executes the full finalization routine.

As indicated in FIG. 17, if the global name or identifier is not marked for cleanup or deletion or other finalization on all other machines (i.e., all except on the machine proposing to carry out the clean up or deletion routine) then this means that the proposed clean up or finalization routine of the object or class (or other asset) should be aborted, stopped, suspend, paused, postponed, or cancelled prior to its initiation or if already initiated then to its completion if it has already begun execution, since the object or class is still required by one or more of the machines M1, M2 . . . Mn, as indicated by step 175.

In one embodiment, the clean up or finalization routine is stopped from initiating or beginning execution; however, if some implementations it is difficult or practically impossible to stop the clean up or finalization routine from initiating or beginning execution. Therefore, in an alternative embodiment, the execution of the finalization routine that has already started is aborted such that it does not complete or does not complete in its normal manner. This alternative abortion is understood to include an actual abortion, or a suspend, or postpone, or pause of the execution of a finalization routine that has started to execute (regardless of the stage of execution before completion) and therefore to make sure that the finalization routine does not get the chance to execute to completion to clean up the object (or class or other asset), and therefore the object (or class or other asset) remains "uncleaned" (i.e., "unfinalised", or "not deleted").

However or alternatively, if the global name or other unique number or identifier for a plurality of similar equivalent local objects each on of the plurality of machines M1, M2 . . . Mn is marked for deletion on all other machines, this means that no other machine requires the class or object (or other asset) corresponding to the global name or other unique number or identifier. As a consequence clean up routine and operation, or optionally the regular or conventional ordinary clean up routine and operation, indicated in step 176 can be, and should be, carried out.

Figure 18:
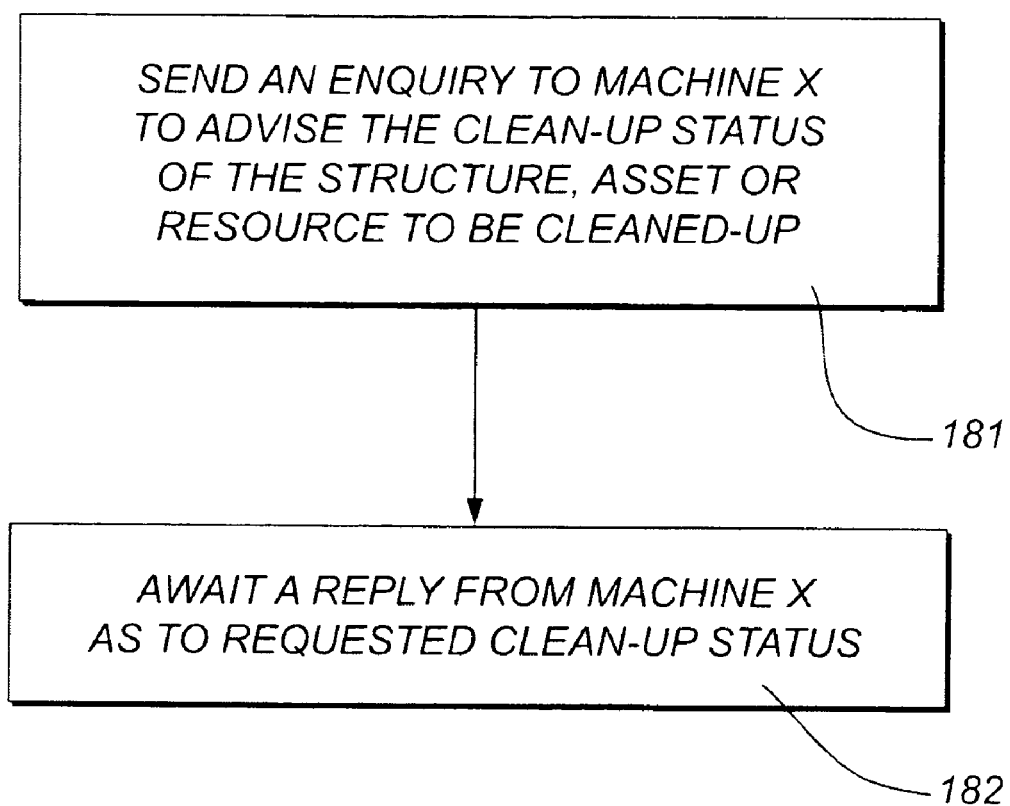
FIG. 18 is a flow chart illustrating the enquiry sent to the server machine X.

FIG. 18 shows the enquiry made by the machine proposing to execute a clean up routine (one of M1, M2 . . . Mn) to the server machine X. The operation of this proposing machine is temporarily interrupted, as shown in step 181 and 182, and corresponding to step 173 of FIG. 17. In step 181 the proposing machine sends an enquiry message to machine X to request the clean-up or finalization status of the object (or class or other asset) to be cleaned-up. Next, the proposing machine awaits a reply from machine X corresponding to the enquiry message sent by the proposing machine at step 181, indicated by step 182.

FIG. 19 shows the activity carried out by machine X in response to such a finalization or clean up status enquiry of step 181 in FIG. 18. The finalization or clean up status is determined as seen in step 192 which determines if the object (or class or other asset) corresponding to the clean-up status request of global name, as received at step 191 (191A), is marked for deletion on all other machines other than the enquiring machine 181 from which the clean-up status request of step 191 originates. The singular term object or class as used in this document (or the equivalent term of asset, or resource used in step 192 (192A) and other Figures) are to be understood to be inclusive of all similar equivalent objects (or classes, or assets, or resources) corresponding to the same global name on each of the plurality of machines M1, M2, . . . , Mn. If the step 193 (193A) determination is made that determines that the global named resource is not marked ("No") for deletion on (n−1) machines (i.e. is utilized elsewhere), then a response to that effect is sent to the enquiring machine 194 (194A) but the "marked for deletion" counter is incremented by one (1), as shown by step 197 (197A). Similarly, if the answer to this determination is marked for deletion ("Yes") indicating that the global named resource is marked for deletion on all other machines other than the waiting enquiring machine 182 then a corresponding reply is sent to the waiting enquiring machine 182 from which the clean-up status request of step 191 originated as indicated by step 195 (195A). The waiting enquiring machine 182 is then able to respond accordingly, such as for example by: (i) aborting (or pausing, or postponing) execution of the finalization routine when the reply from machine X of step 182 indicated that the similar equivalent local objects on the plurality of machines M1, M2, . . . , Mn corresponding to the global name of the object proposed to be finalized of step 172 is still utilized elsewhere (i.e., not marked for deletion on all other machines other than the machine proposing to carry out finalization); or (ii) by continuing (or resuming, or starting) execution of the finalization routine when the reply from machine X of step 182 indicated that the similar equivalent local objects on the plurality of machines M1, M2 . . . Mn corresponding to the global name of the object proposed to be finalized of step 172 are not utilized elsewhere (i.e., marked for deletion on all other machines other than the machine proposing to carry out finalization). As indicated by broken lines in FIG. 19, preferably in addition to the "yes" response shown in step 195, the shared table or cleaned-up statuses stored or maintained on machine X is updated so that the status of the globally named asset is changed to "cleaned up" as indicated by step 196.

Reference is made to the accompanying Annexure C in which: Annexure C1 is a typical code fragment from an unmodified finalize routine, Annexure C2 is an equivalent in respect of a modified finalize routine, and Annexure C3 is an alternative equivalent in respect of a modified finalize routine.

Annexures C1 and C2/C3 repeated as Tables XVI and XVII/XVIII are the before (pre-modification or unmodified code) and after (or post-modification or modified code) excerpt of a finalization routine respectively. The modified code that is added to the method is highlighted in bold. In the original code sample of Annexure C1, the finalize method prints "Deleted . . . " to the computer console on event of finalization (i.e. deletion) of this object. Thus, without management of object finalization in a distributed environment, each machine would re-finalize the same object, thus executing the finalize method more than once for a single globally-named coherent plurality of similar equivalent objects. Clearly this is not what the programmer or user of a single application program code instance expects to happen.

So, taking advantage of the DRT, the application code 50 is modified as it is loaded into the machine by changing the clean-up, deletion, or finalization routine or method. It will be appreciated that the term finalization is typically used in the context of the JAVA language relative to the JAVA virtual machine specification existent at the date of filing of this specification. Therefore, finalization refers to object and/or class cleanup or deletion or reclamation or recycling or any equivalent form of object, class, asset or resource clean-up in the more general sense. The term finalization should therefore be taken in this broader meaning unless otherwise restricted. The changes made (highlighted in bold) are the initial instructions that the finalize method executes. These added instructions check if this particular object is the last remaining object of the plurality of similar equivalent objects on the plurality of machines M1, M2 . . . Mn to be marked as finalizable, by calling a routine or procedure to determine the clean-up status of the object to be finalized, such as the "isLastReference( )" procedure or method of a DRT 71 performing the steps of 172-176 of FIG. 17 where the determination as to the clean-up status of the particular object is sought, and which determines either a true result or a false result corresponding to whether or not this particular object on this particular machine that is executing the determination procedure is the last of the plurality of machines M1, M2 . . . Mn, each with one of a similar equivalent peer object, to request finalization. Recall that a peer object refers to a similar equivalent object on a different one of the machines, so that for example, in a configuration having eight machines, there will be eight peer objects (i.e. eight similar equivalent objects each on one of eight machines).

The finalization determination procedure or method "isLastReference( )" of the DRT 71 can optionally take an argument which represents a unique identifier for this object (See Annexure C3 and Table XII). For example, the name of the object that is being considered for finalization, a reference to the object in question being considered for finalization, or a unique number or identifier representing this object across all machines (or nodes), to be used in the determination of the finalization status of this object or class or other asset. This way, the DRT can support the finalization of multiple objects (or classes or assets) at the same time without becoming confused as to which of the multiple objects are already finalized and which are not, by using the unique identifier of each object to consult the correct record in the finalization table referred to earlier.

The DRT 71 can determine the finalization state of the object in a number of possible ways. Preferably, it (the requesting machine) can ask each other requested machine in turn (such as by using a computer communications network to exchange query and response messages between the requesting machine and the requested machine(s) if their requested machine's similar equivalent object has been marked for finalization, and if any requested machine replies false indicating that their similar equivalent object is not marked for finalization, then return a false result at return from the "isLastReference( )" method indicating that the local similar equivalent object should not be finalized, otherwise return a true result at return from the "isLastReference( )" method indicating that the local similar equivalent object can be finalized. Of course different logic schemes for true or false result may alternatively be implemented with the same effect. Alternatively, the DRT 71 on the local machine can consult a shared record table (perhaps on a separate machine (e.g., machine X), or a coherent shared record table on each local machine and updated to remain substantially identical, or in a database) to determine if each of the plurality of similar equivalent objects have been marked for finalization by all requested machines except the current requesting machine.

If the "isLastReference( )" method of the DRT 71 returns true then this means that this object has been marked for finalization on all other machines in the virtual or distributed computing environment (i.e. the plurality of machines M1 . . . Mn), and hence, the execution of the finalize method is to proceed as this is considered the last remaining similar equivalent object on the plurality of machines M1, M2 . . . Mn to be marked or declared as finalizable.

On the other hand, if the "isLastReference( )" method of the DRT 71 returns false, then this means that the plurality of similar equivalent objects has not been marked for finalization by all other machines in the distributed environment, as recorded in the shared record table on machine X of the finalization states of objects. In such a case, the finalize method is not to be executed (or alternatively resumed, or continued), as it will potentially invalidate the object on those machine(s) that are continuing to use their similar equivalent object and have yet to mark their similar equivalent object for finalization. Thus, when the DRT returns false, the inserted four instructions at the start of the finalize method prevent execution of the remaining code of the finalize method by aborting the execution of the finalize method through the use of a return instruction, and consequently aborting the Java Virtual Machine's finalization operation for this object.

Given the fundamental concept of testing to determine if a finalization, such as a deletion or clean up, is ready to be carried out on a class, object, or other asset; and if ready carrying out the finalization, and if not ready, then not carrying out the finalization, there are several different ways or embodiments in which this finalization concept, method, and procedure may be implemented.

In the first embodiment, a particular machine, say machine M2, loads the asset (such as class or object) inclusive of a clean up routine modifies it, and then loads each of the other machines M1, M3, . . . , Mn (either sequentially or simultaneously or according to any other order, routine, or procedure) with the modified object (or class or asset) inclusive of the now modified clean up routine or routines. Note that there may be one or a plurality of routines corresponding to only one object in the application code or there can be a plurality of routines corresponding to a plurality of objects in the application code. Note that in one embodiment, the cleanup routine(s) that is (are) loaded is binary executable object code. Alternatively, the cleanup routine(s) that is (are) loaded is executable intermediate code.

In one arrangement, which may be termed "master/slave" (or primary/secondary) each of the slave (or secondary) machines M1, M3, . . . , Mn loads the modified object (or class), and inclusive of the now modified clean-up routine(s), that was sent to it over the computer communications network or other communications link or path by the master (or primary) machine, such as machine M2, or some other machine such as a machine X of FIG. 15. In a slight variation of this "master/slave" or "primary/secondary" arrangement, the computer communications network can be replaced by a shared storage device such as a shared file system, or a shared document/file repository such as a shared database.

Note that the modification performed on each machine or computer need not and frequently will not be the same or identical. What is required is that they are modified in a similar enough way that in accordance with the inventive principles described herein, each of the plurality of machines behaves consistently and coherently relative to the other machines to accomplish the operations and objectives described herein. Furthermore, it will be appreciated in light of the description provided herein that there are a myriad of ways to implement the modifications that may for example depend on the particular hardware, architecture, operating system, application program code, or the like or different factors. It will also be appreciated that embodiments of the invention may be implemented within an operating system, outside of or without the benefit of any operating system, inside the virtual machine, in an EPROM, in software, in firmware, or in any combination of these.

In a further variation of this "master/slave" or "primary/secondary" arrangement, machine M2 loads the asset (such as class or object) inclusive of a cleanup routine in unmodified form on machine M2, and then (for example, M2 or each local machine) deletes the unmodified clean up routine that had been present on the machine in whole or part from the asset (such as class or object) and loads by means of a computer communications network the modified code for the asset with the now modified or deleted clean up routine on the other machines. Thus in this instance the modification is not a transformation, instrumentation, translation or compilation of the asset clean up routine but a deletion of the clean up routine on all machines except one. In one embodiment, the actual code-block of the finalization or cleanup routine is deleted on all machines except one, and this last machine therefore is the only machine that can execute the finalization routine because all other machines have deleted the finalization routine. One benefit of this approach is that no conflict arises between multiple machines executing the same finalization routine because only one machine has the routine.

The process of deleting the clean up routine in its entirety can either be performed by the "master" machine (such as machine M2 or some other machine such as machine X of FIG. 15) or alternatively by each other machine M1, M3 . . . Mn upon receipt of the unmodified asset. An additional variation of this "master/slave" or "primary/secondary" arrangement is to use a shared storage device such as a shared file system, or a shared document/file repository such as a shared database as means of exchanging the code for the asset, class or object between machines M1, M2 . . . Mn and optionally a machine X of FIG. 15.

In a still further embodiment, each machine M1, . . . , Mn receives the unmodified asset (such as class or object) inclusive of finalization or clean up routine(s), but modifies the routine(s) and then loads the asset (such as class or object) consisting of the now modified routine(s). Although one machine, such as the master or primary machine may customize or perform a different modification to the finalization or clean up routine(s) sent to each machine, this embodiment more readily enables the modification carried out by each machine to be slightly different and to be enhanced, customized or optimized based upon its particular machine architecture, hardware, processor, memory, configuration, operating system or other factors, yet still similar, coherent and consistent with other machines with all other similar modifications and characteristics that may not need to be similar or identical.

In a further arrangement, a particular machine, say M1, loads the unmodified asset (such as class or object) inclusive of a finalization or clean up routine and all other machines M2, M3, . . . , Mn perform a modification to delete the clean up routine of the asset (such as class or object) and load the modified version.

In all of the described instances or embodiments, the supply or communication of the asset code (such as class code or object code) to the machines M1, . . . , Mn, and optionally inclusive of a machine X of FIG. 15 can be branched, distributed or communicated among and between the different machines in any combination or permutation; such as by providing direct machine to machine communication (for example, M2 supplies each of M1, M3, M4, etc directly), or by providing or using cascaded or sequential communication (for example, M2 supplies M1 which then supplies M3, which then supplies M4, and so on), or a combination of the direct and cascaded and/or sequential.

In a still further arrangement, the machines M1, . . . , Mn, may send some or all load requests to an additional machine X (See for example the embodiment of FIG. 15), which performs the modification to the application program code 50 (such as consisting of assets, and/or classes, and/or objects) and inclusive of finalization or clean up routine(s), via any of the afore mentioned methods, and returns the modified application program code inclusive of the now modified finalization or clean-up routine(s) to each of the machines M1 to Mn, and these machines in turn load the modified application program code inclusive of the modified routine(s) locally. In this arrangement, machines M1 to Mn forward all load requests to machine X, which returns a modified application program code inclusive of modified finalization or clean-up routine(s) to each machine. The modifications performed by machine X can include any of the modifications covered under the scope of the present invention. This arrangement may of course be applied to some of the machines and other arrangements described herein before applied to other of the machines.

Persons skilled in the computing arts will be aware of various possible techniques that may be used in the modification of computer code, including but not limited to instrumentation, program transformation, translation, or compilation means.

One such technique is to make the modification(s) to the application code, without a preceding or consequential change of the language of the application code. Another such technique is to convert the original code (for example, JAVA language source-code) into an intermediate representation (or intermediate-code language, or pseudo code), such as JAVA byte code. Once this conversion takes place the modification is made to the byte code and then the conversion may be reversed. This gives the desired result of modified JAVA code.

A further possible technique is to convert the application program to machine code, either directly from source-code or via the abovementioned intermediate language or through some other intermediate means. Then the machine code is modified before being loaded and executed. A still further such technique is to convert the original code to an intermediate representation, which is thus modified and subsequently converted into machine code.

The present invention encompasses all such modification routes and also a combination of two, three or even more, of such routes.

Having now described aspects of the memory management and replication and finalization, attention is now directed to an exemplary operational scenario illustrating the manner in which application programs on two computers may simultaneously execute the same application program in a consistent, coherent manner.

Figure 20:
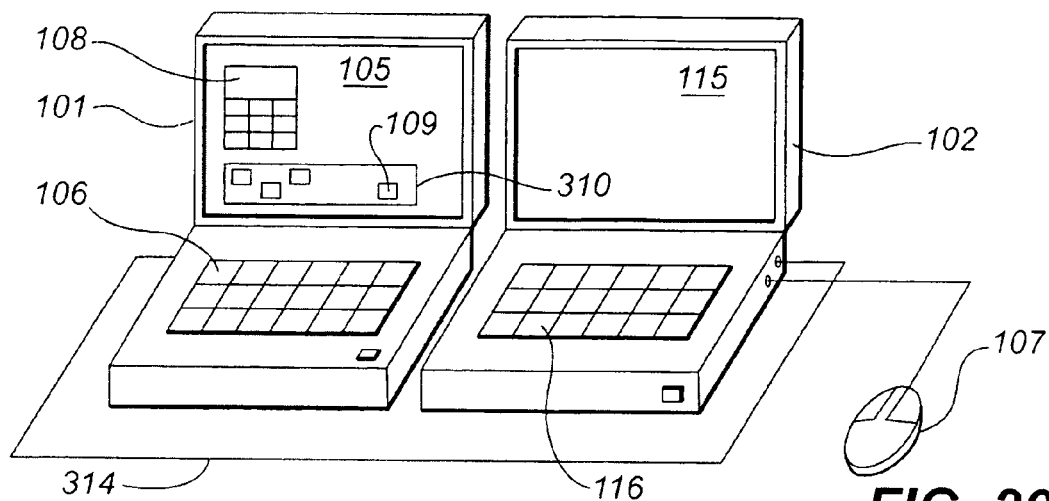
FIG. 20 is a schematic representation of two laptop computers interconnected to simultaneously run a plurality of applications, with both applications running on a single computer.
Figure 21:
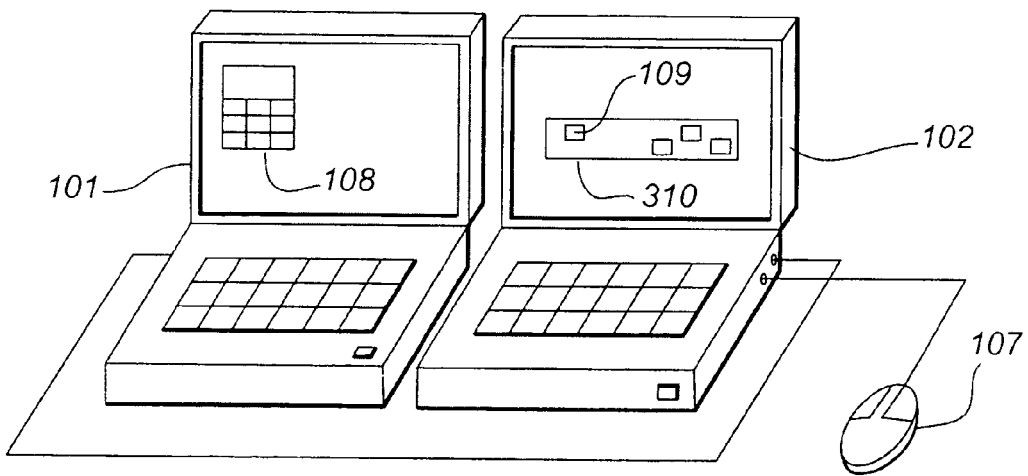
FIG. 21 is a view similar to FIG. 20 but showing the FIG. 20 apparatus with one application operating on each computer.
Figure 22:
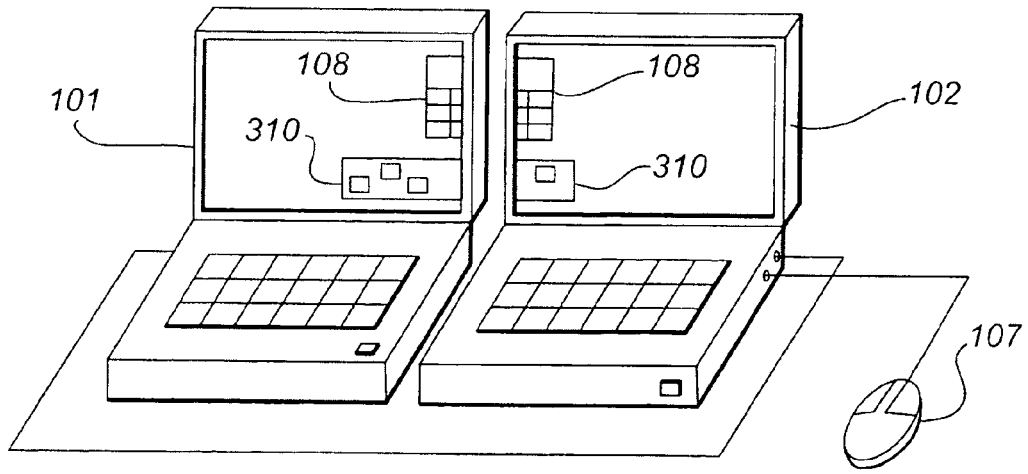
FIG. 22 is a view similar to FIGS. 20 and 21 but showing the FIG. 20 apparatus with both applications operating simultaneously on both computers.

In this regard, attention is directed to FIGS. 20-22, two laptop computers 101 and 102 are illustrated. The computers 101 and 102 are not necessarily identical and indeed, one can be an IBM or IBM-clone and the other can be an APPLE computer. The computers 101 and 102 have two screens 105, 115 two keyboards 106, 116 but a single mouse 107. The two machines 101, 102 are interconnected by a means of a single coaxial cable or twisted pair cable 314.

Two simple application programs are downloaded onto each of the machines 101, 102, the programs being modified as they are being loaded as described above. In this embodiment the first application is a simple calculator program and results in the image of a calculator 108 being displayed on the screen 105. The second program is a graphics program which displays four coloured blocks 109 which are of different colours and which move about at random within a rectangular box 310. Again, after loading, the box 310 is displayed on the screen 105. Each application operates independently so that the blocks 109 are in random motion on the screen 105 whilst numerals within the calculator 108 can be selected (with the mouse 107) together with a mathematical operator (such as addition or multiplication) so that the calculator 108 displays the result.

The mouse 107 can be used to "grab" the box 310 and move same to the right across the screen 105 and onto the screen 115 so as to arrive at the situation illustrated in FIG. 21. In this arrangement, the calculator application is being conducted on machine 101 whilst the graphics application resulting in display of box 310 is being conducted on machine 102.

However, as illustrated in FIG. 22, it is possible by means of the mouse 107 to drag the calculator 108 to the right as seen in FIG. 21 so as to have a part of the calculator 108 displayed by each of the screens 105, 115. Similarly, the box 310 can be dragged by means of the mouse 107 to the left as seen in FIG. 21 so that the box 310 is partially displayed by each of the screens 105, 115 as indicated FIG. 22. In this configuration, part of the calculator operation is being performed on machine 101 and part on machine 102 whilst part of the graphics application is being carried out the machine 101 and the remainder is carried out on machine 102.

Further Description

The foregoing describes only some embodiments of the present invention and modifications, obvious to those skilled in the art, can be made thereto without departing from the scope of the present invention. For example, reference to JAVA includes both the JAVA language and also JAVA platform and architecture.

In all described instances of modification, where the application code 50 is modified before, or during loading, or even after loading but before execution of the unmodified application code has commenced, it is to be understood that the modified application code is loaded in place of, and executed in place of, the unmodified application code subsequently to the modifications being performed.

Alternatively, in the instances where modification takes place after loading and after execution of the unmodified application code has commenced, it is to be understood that the unmodified application code may either be replaced with the modified application code in whole, corresponding to the modifications being performed, or alternatively, the unmodified application code may be replaced in part or incrementally as the modifications are performed incrementally on the executing unmodified application code. Regardless of which such modification routes are used, the modifications subsequent to being performed execute in place of the unmodified application code.

An advantage of using a global identifier in the invention described is as a form of 'meta-name' or 'meta-identity' for all the similar equivalent local objects (or classes, or assets or resources or the like) on each one of the plurality of machines M1, ..., Mn. For example, rather than having to keep track of each unique local name or identity of each similar equivalent local object on each machine of the plurality of similar equivalent objects, one may instead define or use a global name corresponding to the plurality of similar equivalent objects on each machine (e.g., "globalname7787"), and with the understanding that each machine relates the global name to a specific local name or object (e.g., "globalname7787" corresponds to object "localobject456" on machine M1, and "globalname7787" corresponds to object "localobject885" on machine M2, and "globalname7787" corresponds to object "localobject111" on machine M3, and so forth).

Those skilled in the programming arts will be aware that when additional code or instructions is/are inserted into an existing code or instruction set to modify same, the existing code or instruction set may well require further modification (such as for example, by re-numbering of sequential instructions) so that offsets, branching, attributes, mark up and the like are catered for.

Similarly, in the JAVA language memory locations include, for example, both fields and array types. The above description deals with fields and the changes required for array types are essentially the same mutatis mutandis. Also the present invention is equally applicable to similar programming languages (including procedural, declarative and object orientated) to JAVA including Micrsoft.NET platform and architecture (Visual Basic, Visual C/C++, and C#) FORTRAN, C/C++, COBOL, BASIC etc.

The abovementioned arrangement, in which the JAVA code which updates memory locations or field values is modified, is based on the assumption that either the runtime system (say, JAVA HOTSPOT VIRTUAL MACHINE written in C and Java) or the operating system (LINUX written in C and Assembler, for example) of each machine M1 . . . Mn will ordinarily update memory on the local machine (say M2) but not on any corresponding other machines (M1, M3 . . . Mn). It is possible to leave the JAVA code which updates memory locations or field values unamended and instead amend the LINUX or HOTSPOT routine which updates memory locally, so that it correspondingly updates memory on all other machines as well. In order to embrace such an arrangement the term "updating propagation routine" used herein in conjunction with maintaining the memory of all machines M1 . . . Mn essentially the same, is to be understood to include within its scope both the JAVA puffield and putstatic instructions and related operations and the "combination" of the JAVA puffield and putstatic operations and the LINUX or HOTSPOT code fragments which perform memory updating.

The abovementioned embodiment in which the code of the JAVA finalisation or clean up routine is modified, is based upon the assumption that either the run time system (say, JAVA HOTSPOT VIRTUAL MACHINE written in C and JAVA) or the operating system (LINUX written in C and Assembler, for example) of each machine M1 . . . Mn will call the JAVA finalisation routine. It is possible to leave the JAVA finalisation routine unamended and instead amend the LINUX or HOTSPOT routine which calls the JAVA finalisation routine, so that if the object or class is not to be deleted, then the JAVA finalisation routine is not called. In order to embrace such an arrangement the term "finalisation routine" is to be understood to include within its scope both the JAVA finalisation routine and the "combination" of the JAVA finalisation routine and the LINUX or HOTSPOT code fragments which call or initiate the JAVA finalisation routine.

The terms object and class used herein are derived from the JAVA environment and are intended to embrace similar terms derived from different environments such as dynamically linked libraries (DLL), or object code packages, or function unit or memory locations.

Various means are described relative to embodiments of the invention, including for example but not limited to lock means, distributed run time means, modifier or modifying means, propagation means, distribution update means, counter means, synchronization means, and the like. In at least one embodiment of the invention, any one or each of these various means may be implemented by computer program code statements or instructions (possibly including by a plurality of computer program code statements or instructions) that execute within computer logic circuits, processors, ASICs, microprocessors, microcontrollers, or other logic to modify the operation of such logic or circuits to accomplish the recited operation or function. In another embodiment, any one or each of these various means may be implemented in firmware and in other embodiments such may be implemented in hardware. Furthermore, in at least one embodiment of the invention, any one or each of these various means may be implemented by an combination of computer program software, firmware, and/or hardware.

Any and each of the aforedescribed methods, procedures, and/or routines may advantageously be implemented as a computer program and/or computer program product stored on any tangible media or existing in electronic, signal, or digital form. Such computer program or computer program products comprising instructions separately and/or organized as modules, programs, subroutines, or in any other way for execution in processing logic such as in a processor or microprocessor of a computer, computing machine, or information appliance; the computer program or computer program products modifying the operation of the computer on which it executes or on a computer coupled with, connected to, or otherwise in signal communications with the computer on which the computer program or computer program product is present or executing. Such computer program or computer program product modifying the operation and architectural structure of the computer, computing machine, and/or information appliance to alter the technical operation of the computer and realize the technical effects described herein.

The invention may therefore includes a computer program product comprising a set of program instructions stored in a storage medium or exiting electronically in any form and operable to permit a plurality of computers to carry out any of the methods, procedures, routines, or the like as described herein including in any of the claims.

Furthermore, the invention may include a plurality of computers interconnected via a communication network or other communications ink or path and each operable to substantially simultaneously or concurrently execute the same or a different portion of an application program code written to operate on only a single computer on a corresponding different one of computers, wherein the computers being programmed to carry out any of the methods, procedures, or routines described in the specification or set forth in any of the claims, or being loaded with a computer program product.

The term "comprising" (and its grammatical variations) as used herein is used in the inclusive sense of "having" or "including" and not in the exclusive sense of "consisting only of".

Copyright Notice

This patent specification and the Annexures which form a part thereof contains material which is subject to copyright protection. The copyright owner (which is the applicant) has no objection to the reproduction of this patent specification or related materials from publicly available associated Patent Office files for the purposes of review, but otherwise reserves all copyright whatsoever. In particular, the various instructions are not to be entered into a computer without the specific written approval of the copyright owner.

I claim:

1. A multiple computer system having at least one application program each written to operate only on a single computer but running simultaneously on a plurality of computers interconnected by a communications network, wherein different portions of each of said at least one application program(s) executes simultaneously on different ones of said computers and, for each said portion, a like plurality of identical objects are created, each in the corresponding computer and each having a identical name, wherein each said computer has an independent local memory, all read requests by each said computer are satisfied by reading only from the corresponding local memory of that computer and from no other computer, wherein a local memory capacity allocated to each said at least one application program is identical, the total memory capacity available to said each said at least one application program is said allocated memory capacity, and wherein all said identical objects are collectively deleted only when each one of said plurality of computers no longer needs to refer to their corresponding object.

2. The system as claimed in claim 1 wherein each said computer includes a distributed run time means with the distributed run time means of each said computer able to communicate with all other computers whereby if a portion of said application program(s) running on one of said computers no longer needs to refer to an object in that computer then the identity of the unreferenced object is transmitted by the distributed run time means of said one computer to a shared table accessible by all the other computers.

3. The system as claimed in claim 2 wherein each said application program is modified before, during, or after loading by inserting a finalization routine to modify each instance at which said application program no longer needs to refer to an object.

4. The system as claimed in claim 3 wherein said inserted finalization routine modified a pre-existing finalization routine to enable the pre-existing finalization routine to execute if all computers no longer need to refer to their corresponding object, and to disable the pre-existing finalization routine if at least one computer does not need to refer to a corresponding object.

5. The system as claimed in claim 4 wherein the application program is modified in accordance with a procedure selected from the group of procedures consisting of re-compilation at loading, pre-compilation prior to loading, compilation prior to loading, just-in-time compilation, and re-compilation after loading and before execution of the relevant portion of application program.

6. The system as claimed in claim 2 wherein said modified application program is transferred to all said computers in accordance with a procedure selected from the group consisting of master/slave transfer, branched transfer and cascaded transfer.

7. A plurality of computers interconnected via a communications link and operating simultaneously at least one application program each written to operate only on a single computer,
wherein each said computer simultaneously executes a different portion of said at least one application program (s), each said computer in operating its application program portion needs, or no longer needs to refer to an object only in local memory physically located in each said computer,
the contents of the local memory utilized by each said computer is fundamentally similar but not, at each instant, identical, wherein each said computer has an independent local memory, all read requests by each said computer are satisfied by reading only from the corresponding local memory of that computer and from no other computer,
wherein the local memory capacity allocated to said at least one application program is identical, the total memory capacity available to said at least one application program is said allocated memory capacity, and
wherein every one of said computers has a finalization routine which deletes a non-referenced object only if each one of said plurality of computers no longer needs to refer to their corresponding object.

8. The plurality of computers as claimed in claim 7 wherein all said distribution update means communicate via said communications link at a data transfer rate which is less than the local memory read rate.

9. The plurality of computers as claimed in claim 7 wherein at least some of said computers are manufactured by different manufacturers or have different operating systems.

10. A method of running simultaneously on a plurality of computers at least one application program each written to operate only on a single computer, each said computer having an independent local memory, said computers being interconnected by means of a communications network, said method comprising:
(i) executing different portions of said application program (s) on different ones of said computers and for each said different portion creating a like plurality of identical objects each in the corresponding computer and each having a identical name, satisfying all read requests by each said computer in executing said different portion by reading only from the corresponding local memory of that computer executing said different portion and from no other computer, wherein the local memory capacity allocated to the or each said application program is identical among said plurality of computers, the total memory capacity available to the or each said application program is said local allocated memory capacity; and
(ii) deleting all said identical objects collectively only when all of said plurality of computers no longer need to refer to their corresponding object.

11. A method as claimed in claim 10 including the further step of:
(iii) providing each said computer with a distributed run time means to communicate between said computers via said communications network.

12. A method as claimed in claim 11 including the further step of:
(iv) providing a shared table accessible by each said distributed run time means and in which is stored the identity of any computer which no longer requires to access an object, together with the identity of the object.

13. A method as claimed in claim 12 including the further step of:
(v) associating a counter means with said shared table, said counter means storing a count of the number of said computers which no longer require to access said object.

14. A method as claimed in claim 13 including the further step of:
(vi) providing an additional computer on which said shared program does not run and which hosts said shared table and counter, said additional computer being connected to said communications network.

15. A computer implemented method of operating a plurality of computers to ensure consistent finalization of an application program written to operate only on a single computer but different portions of which are to be executed simultaneously each on a different one of a plurality of computers interconnected via a communications network, each said one of said plurality of computers having at least one local processor and an independent local memory coupled with said processor, said method comprising:
(i) scrutinizing said application program at, or prior to, or after loading to detect each program step defining a finalization routine,
modifying said application program so that all read requests by each said computer in executing said different portion are satisfied by reading only from the corresponding local memory of that computer executing said different portion and from no other computer, the local memory capacity allocated to said application program being identical among said plurality of computers, and the total memory capacity available to said application program is said local allocated memory capacity; and (ii) modifying said finalization routine to ensure collective deletion of corresponding objects in all said computers only when each one of said computers no longer needs to refer to their corresponding object.

16. The method as claimed in claim 15 wherein said finalization routine is modified to execute to clean-up an object once only and on only one of said computers and when all of said computers no longer need to refer to said object.

17. The method claimed in claim 15 wherein step (ii) comprises the steps of: (iii) loading and executing said finalization routine on one of said computers, (iv) modifying said finalization routine by said one computer, and (v) transferring said modified finalization routine to each of the remaining computers.

18. The method as claimed in claim 17 wherein said modified finalization routine is supplied by said one computer direct to each of said remaining computers.

19. The method as claimed in claim 17 wherein said modified finalization routine is supplied in cascade fashion from said one computer sequentially to each of said remaining computers.

20. The method claimed in claim 15 wherein step (ii) comprises the steps of: (vi) loading and modifying said finalization routine on one of said computers, (vii) said one computer sending said unmodified finalization routine to each of the remaining computers, and (viii) each of said remaining computers modifying said finalization routine after receipt of same.

21. The method claimed in claim 20 wherein said unmodified finalization routine is supplied by said one computer directly to each of said remaining computers.

22. The method claimed in claim 20 wherein said unmodified finalization routine is supplied in cascade fashion from said one computer sequentially to each of said remaining computers.

23. The method as claimed in claim 15 including the further step of: (ix) modifying said application program utilizing a procedure selected from the group of procedures consisting of re-compilation at loading, pre-compilation prior to loading, compilation prior to loading, just-in-time compilation, and re-compilation after loading and before execution of the relevant portion of application program.

24. The method as claimed in claim 15 including the further step of: (x) transferring the modified application program to all said computers utilizing a procedure selected from the group consisting of master/slave transfer, branched transfer and cascaded transfer.

25. The method claimed in claim 16 wherein step (ii) comprises the steps of: (iii) loading and executing said finalization routine on one of said computers, (iv) modifying said finalization routine by said one computer, and (v) transferring said modified finalization routine to each of the remaining computers.

26. The method as claimed in claim 25 wherein said modified finalization routine is supplied by said one computer direct to each of said remaining computers.

27. The method as claimed in claim 25 wherein said modified finalization routine is supplied in cascade fashion from said one computer sequentially to each of said remaining computers.

28. The method claimed in claim 16 wherein step (ii) comprises the steps of: (vi) loading and modifying said finalization routine on one of said computers, (vii) said one computer sending said unmodified finalization routine to each of the remaining computers, and (viii) each of said remaining computers modifying said finalization routine after receipt of same.

29. The method claimed in claim 28 wherein said unmodified finalization routine is supplied by said one computer directly to each of said remaining computers.

30. The method claimed in claim 28 wherein said unmodified finalization routine is supplied in cascade fashion from said one computer sequentially to each of said remaining computers.

31. The method as claimed in claim 16 including the further step of: (ix) modifying said application program utilizing a procedure selected from the group of procedures consisting of re-compilation at loading, pre-compilation prior to loading, compilation prior to loading, just-in-time compilation, and re-compilation after loading and before execution of the relevant portion of application program.

32. The method as claimed in claim 16 including the further step of: (x) transferring the modified application program to all said computers utilizing a procedure selected from the group consisting of master/slave transfer, branched transfer and cascaded transfer.

33. A multiple thread computer processing method in which different individual threads or different groups of threads of a single application program written to operate only on a single computer are simultaneously processed each on a corresponding different one of a plurality of computers each having a local memory and a local memory capacity, each of said plurality of single computers being interconnected via a communications link, and in which objects in the local memory physically associated with the computer processing of each thread have corresponding objects in the local memory of each other said computer, the method comprising:

satisfying all read requests by each said computer of said plurality of computers by reading only from the corresponding local memory of that computer which operates to execute a particular different individual threads or particular different group of threads and from no other computer, the local memory capacity allocated to the application program being identical for each computer, and the total memory capacity available to the application program being limited to said allocated memory capacity; and collectively deleting all said corresponding objects when each one of said plurality of computers no longer needs to refer to their corresponding object.

34. The method of claim 33, wherein an object residing in the memory associated with one said thread and to be deleted has its identity communicated by the computer of said one thread to a shared table accessible by all other said computers.

35. The method of claim 33, wherein an object residing in the memory associated with one said thread and to be deleted has its identity transmitted to the computer associated with another said thread and is transmitted thereby to a shared table accessible by all said other computers.

36. A computer program product comprising a set of program instructions stored in a storage medium and operable to permit a plurality of computers to carry out the method as claimed in claim 10.

37. A computer program product stored in a computer readable storage medium and comprising a set of program instructions which, when executed in a computer, are operable to permit a plurality of computers to carry out a method of operating a plurality of computers to ensure consistent finalization of an application program written to operate only on a single computer, wherein different portions of said set of program instructions are to be executed simultaneously each on a different one of a plurality of computers interconnected via a communications network, each of said plurality of computers having an in dependent local memory, said method comprising:

scrutinizing said application program at, or prior to, or after loading to detect each program step defining a finalization routine;

modifying said application program so that all read requests by each said computer in executing said different portion are satisfied by reading only from the corresponding local memory of that computer executing said different portion and from no other computer, the local memory capacity allocated to said application program being identical among said plurality of computers, and the total memory capacity available to said application program is said local allocated memory capacity; and modifying said finalization routine to ensure collective deletion of corresponding objects in all said computers only when each one of said computers no longer needs to refer to their corresponding object.

38. A plurality of computers interconnected via a communication network and operable to ensure consistent initialization of an application program written to operate only on a single computer but running simultaneously on said computers, said computers being programmed to carry out the method as claimed in claim 10.

39. A plurality of computers interconnected via a communication network and operable to ensure consistent initialization of an application program written to operate only on a single computer but running simultaneously on said computers, said computers being programmed to carry out the method as claimed in claim 15.

40. A plurality of computers interconnected via a communication network and operable to ensure consistent initialization of an application program written to operate only on a single computer but running simultaneously on said computers, said computers being loaded with the computer program product as claimed in claim 36.

41. A plurality of computers interconnected via a communication network and operable to ensure consistent initialization of an application program written to operate only on a single computer but running simultaneously on said computers, said computers being loaded with the computer program product as claimed in claim 37.

42. A single computer configured for operating with a plurality of single computers in a multiple computer system and having at least one application program written to operate on only a single computer but running simultaneously on the plurality of single computers interconnected by a communications network; the single computer comprising:

a local independent memory structure defined in a local independent memory of the single computer and configured to provide execution of application program code of the application program including a plurality of code threads that are written with the intent to execute on and reference a single computer having a single processing unit or symmetric multiple processing units and the single independent local memory with a local memory capacity that is not shared with any other single computer of said plurality of single computers with the consequence that all read requests are satisfied locally from said independent local memory of said single computer and from no other computer;

the single computer configured for and executing a different portion of said at least one application program than the other computers of the plurality of single computers, and executing its portion simultaneously with the execution of different portions of the application program on the different other ones of said plurality of computers and, for each portion in said single computer, a plurality of objects are created in its independent local memory while a like plurality of identical objects are created in the independent local memory of the other computers, each object having a identical name; and means for collectively deleting all said identical objects on said single computer and on the other plurality of computers only when said single computer and each other one of said plurality of computers no longer needs to refer to their corresponding object.

43. The system as claimed in claim 42, wherein the communications network comprises the Internet.

44. The system as claimed in claim 42, wherein each said single computer includes a distributed run time means configured for communication with distributed run time means of other of the plurality of computers and with the distributed run time means of each said computer able to communicate with all other computers so that if a different portion of said application program running on one of said plurality of single computers creates an object in that single computer then the created object is propagated by the distributed run time means of said one computer to all the other computers via their own corresponding run time means.

45. A single computer configured for use with a plurality of different networked single computers that are interconnected via a communications link, the single computer and the plurality of different computers operating simultaneously to execute an application program written to operate on only a single computer, the application program having application program code including a plurality of code threads all intended to execute on and reference a single computer having a single processing unit or symmetric multiple processing units and a single independent local memory with a local memory capacity that is not shared with any other single computer of said plurality of single computers with the consequence that all read requests are satisfied locally from said independent local memory of said single computer and from no other computer;

said single computer simultaneously executes a first portion of said application program and other of said plurality of different networked single computers simultaneously executes a second and other different portion with said first portion;

said single computer, in operating said application program first portion, utilizes a named object only by using a local replica of the named object stored in independent local memory physically located in said single computer with a local memory capacity that is not shared with or accessible by any other of the plurality of different networked single computers; the contents of the independent local memory utilized by said single computer and by each said plurality of different networked single computers is fundamentally similar but not, at each instant, identical; and said single computer having and executing a finalization routine which deletes a non-referenced object only if said single computer and each one of said plurality of different networked single computers no longer needs to refer to their corresponding object.

46. A method of running an application program simultaneously on a single computer and simultaneously on a plurality of other single computers interconnected via a communications network, the application program written to operate only on a single computer and having application program code including a plurality of code threads all intended to execute on and reference a single computer having a single processing unit or symmetric multiple processing units and a single independent local memory with a local memory capacity that is not shared with any other single computer of said plurality of other single computers, said method comprising:

(i) simultaneously executing a first portion of the application program on the single computer and second and other different portions of said application program on different ones of said plurality of single computers and for each said first portion and second and other different portions creating a like plurality of identical objects in the single independent local memory of the single computer and in the corresponding single independent local memory of the other single computers, wherein the local memory capacity of the single computer is not shared with or accessible by any other single computer of said plurality of single computers such that all read requests are satisfied locally and not from any other computer, each object having a identical name; and (ii) deleting all said identical objects in the local memory of the single computer and collectively in the local memories of the other plurality of single computers only when said single computer and all of said plurality of other computers no longer need to refer to their corresponding object in their respective independent local memories.

47. In a single computer, a method of ensuring consistent finalization of an application program written to operate only on one single computer but different portions of which are to be executed simultaneously on the single computer and on each different one of a plurality of computers interconnected with each other and with the single computer via a communications network, the application program having application program code including a plurality of code threads all intended to execute on and reference only one computer having a single processing unit or symmetric multiple processing units and only one independent local memory with a local memory capacity that is not shared with any other computer, said method comprising:

(i) scrutinizing said application program at, or prior to, or after loading on said single computer to detect each application program step defining a finalization routine instruction finalizing an object utilizing said single computer or one of said plurality of other computers in the application program, wherein for each said different portion of the application program a like plurality of identical objects are created in each single independent local memory of the corresponding computer including in the single independent memory of the single computer and with a local memory capacity that is not shared with or accessible by any other computer of said plurality of computers such that all read requests are satisfied locally and not from any other computer and each object having a identical name; and (ii) modifying said finalization routine to ensure collective deletion of corresponding objects in said single computer and in all said other plurality of computers only when said single computer and each one of said other plurality of computers no longer needs to refer to their corresponding object.

48. In a single computer wherein a first portion of a multi-portion multiple thread processing computer operation is executing in which different individual threads of different ones of the multiple portions of a single application program referencing objects are simultaneously being processed on said single computer and on each one of a different one of a plurality of other computers interconnected via a communications link; a method comprising:

defining a memory structure in which said referenced objects are defined in an independent local memory of said single computer physically associated with the processing threads of said first portion and have corresponding objects in the local independent memory of each other of said plurality of computers, the single independent local memory of the single computer having a local memory capacity that is not shared with any other of said plurality of other computers such that all read requests are satisfied locally and not from any other computer; and deleting all said identical objects in the local memory of the single computer and collectively in the local memories of the other plurality of single computers only when said single computer and all of said plurality of other computers no longer need to refer to their corresponding object in their respective independent local memories.

49. A multiple computer system having at least one application program each written to operate on only a single computer but running simultaneously on a plurality of single computers interconnected by a communications network; the system comprising:

a local independent memory structure defined for each of the plurality of single computers configured to provide execution of application program code of the application program including a plurality of code threads that are written with the intent to execute on and reference a single computer having a single processing unit or symmetric multiple processing units and a single independent local memory with a local memory capacity that is not shared with any other single computer of said plurality of single computers such that all read requests are satisfied locally and not from any other computer;

means for executing different portions of said at least one application program simultaneously on different ones of said computers and for each portion a like plurality of identical objects are created in each independent local memory of the corresponding single computer and each object having a identical name; and means for collectively deleting all said identical objects only when each one of said plurality of computers no longer needs to refer to their corresponding object.

50. A method of ensuring consistent finalization of an application program written to operate only on a single computer but different portions of which are to be executed simultaneously each on a different one of a plurality of single computers interconnected via a communications network, the application program having application program code including a plurality of code threads all intended to execute on and reference a single computer having a single processing unit or symmetric multiple processing units and a single independent local memory with a local memory capacity that is not shared with any other single computer of said plurality of single computers, said method comprising:

(i) scrutinizing said application program at, or prior to, or after loading to detect each application program step defining a finalization routine instruction finalizing an object utilizing one of said computers in the application program, wherein for each said different portion of the application program a like plurality of identical objects being created in each single independent local memory of the corresponding computer with a local memory capacity that is not shared with or accessible by any other single computer of said plurality of single computers such that all read requests are satisfied locally and from any other computer and each object having a identical name; and (ii) modifying said finalization routine to ensure collective deletion of corresponding objects in all said single computers only when each one of said single computers no longer needs to refer to their corresponding object.

51. A multiple computer system as in claim 1, wherein:

no local memory location in any of said single computers is accessible for read operations or write operations by any other one of said single computers, and the contents of the local memory are updated by a separate distributed run time means that communicates the updated contents over the communication network; and the communication network comprises the Internet communication network.

\* \* \* \* \*